United States Patent
Ghercioiu et al.

(10) Patent No.: US 7,860,582 B2
(45) Date of Patent: Dec. 28, 2010

(54) COMPACT MODULAR EMBEDDED DEVICE

(75) Inventors: Marius Ghercioiu, Austin, TX (US); Horea Hedesiu, Cluj-Napoca (RO); Silviu Folea, Cluj (RO); Gratian I. Crisan, jud Cluj (RO); Ciprian Ceteras, Baia Mare (RO); Ioan Monoses, Gherla jud Cluj (RO)

(73) Assignee: National Instruments Corporation, Austin, TX (US)

( * ) Notice: Subject to any disclaimer, the term of this patent is extended or adjusted under 35 U.S.C. 154(b) by 1892 days.

(21) Appl. No.: 10/875,054

(22) Filed: Jun. 23, 2004

(65) Prior Publication Data
US 2005/0289274 A1   Dec. 29, 2005

(51) Int. Cl.
G05B 15/00 (2006.01)
G06F 17/50 (2006.01)
G06F 13/00 (2006.01)
H05K 5/00 (2006.01)
G06F 15/16 (2006.01)
G06F 15/02 (2006.01)

(52) U.S. Cl. .............................. 700/1; 361/724; 716/7; 710/303; 709/208; 708/131

(58) Field of Classification Search ..................... 700/1; 708/131; 709/208; 710/303; 716/7; 361/724
See application file for complete search history.

(56) References Cited

U.S. PATENT DOCUMENTS

| | | | |
|---|---|---|---|
| 5,557,506 A * | 9/1996 | Wood et al. | 361/796 |
| 5,684,671 A * | 11/1997 | Hobbs et al. | 361/679.57 |
| 5,877,938 A * | 3/1999 | Hobbs et al. | 361/724 |
| 6,111,501 A * | 8/2000 | Honeyager et al. | 340/521 |
| 6,115,242 A | 9/2000 | Lambrecht | |
| 6,871,409 B2 * | 3/2005 | Robb et al. | 33/288 |
| 7,024,660 B2 * | 4/2006 | Andrade et al. | 717/124 |
| 7,388,742 B2 * | 6/2008 | Cargin et al. | 361/679 |
| 2002/0036894 A1 * | 3/2002 | Robbins et al. | 361/727 |
| 2008/0027587 A1 * | 1/2008 | Nickerson et al. | 700/284 |

OTHER PUBLICATIONS

Sandage et al, "A Novel Tool for Circuit-System Modeling" IEEE 1996 p. 373-376.*
Wang et al., "Virtual Instrumentation for Integrated Bearing Condition Monitoring" IEEE 1999. p. 667-672.*
Labview. Software Manual 1999 Edition p. 1-514.*
PC/104 Embedded Consortium, "PC/104 Specification," Version 2.5, Nov. 2003, 25 pages.

* cited by examiner

Primary Examiner—Albert DeCady
Assistant Examiner—Thomas Stevens
(74) Attorney, Agent, or Firm—Meyertons Hood Kivlin Kowert & Goetzel, P.C.; Jeffrey C. Hood; Mark S. Williams

(57) ABSTRACT

A compact modular embedded device. A base module includes a processor, a memory medium operable to store a bootloader for executing graphical programs, a bus, and a power input coupled to the processor, memory medium, and bus, for receiving power from a power source and providing the received power to the processor, memory medium, and bus. The base module can couple to a host computer via a transmission medium, receive a program from the host computer, and store the program in the memory medium. The base module may couple to extension modules via the bus in a stacked fashion, where the base module and the extension modules each include a respective substantially planar circuit board that when stacked are substantially parallel. Each extension module provides respective functionality for the device. The base module can execute the program to perform a function in conjunction with the extension modules.

35 Claims, 29 Drawing Sheets

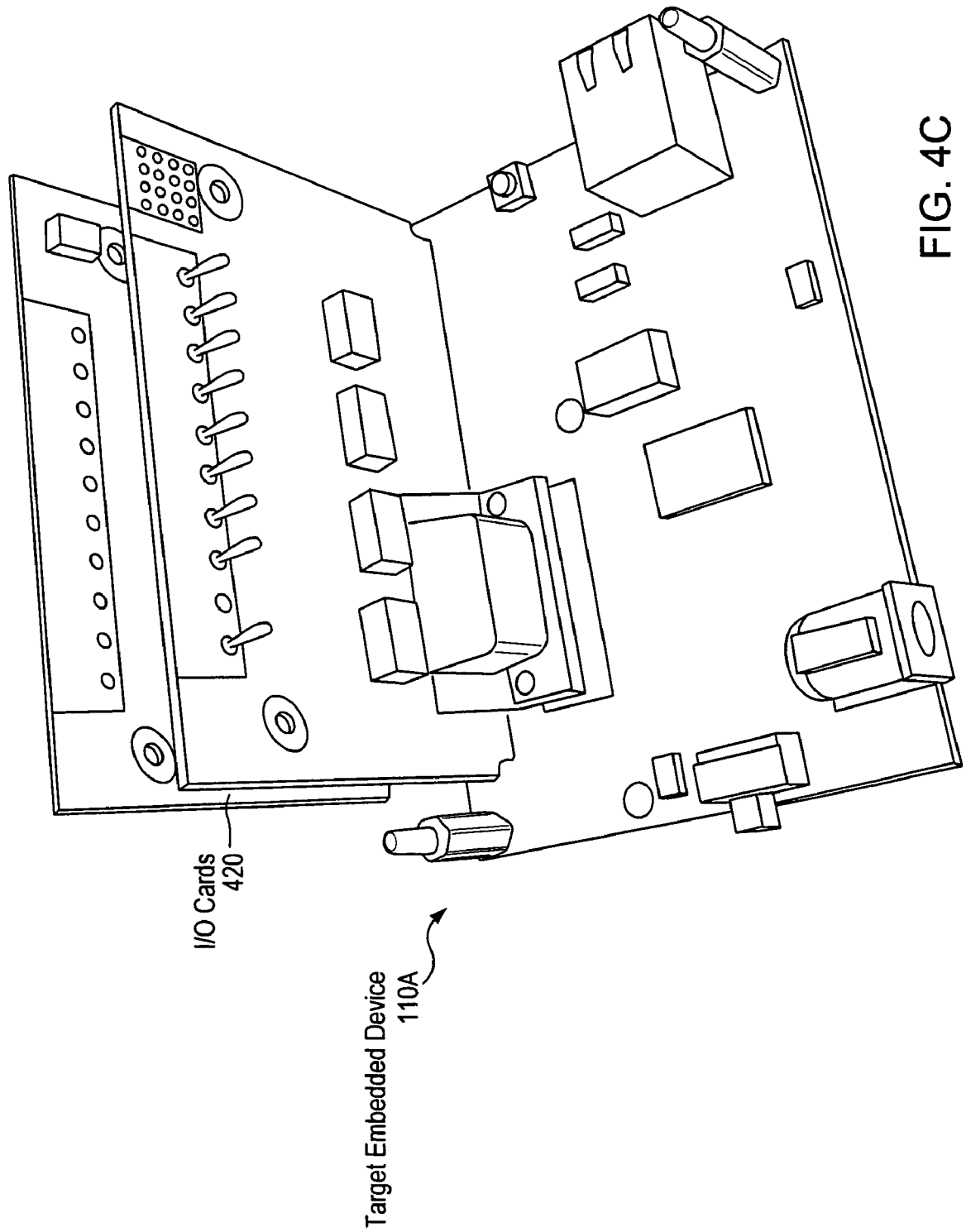

Module Stack

Power Module

RS232 Module

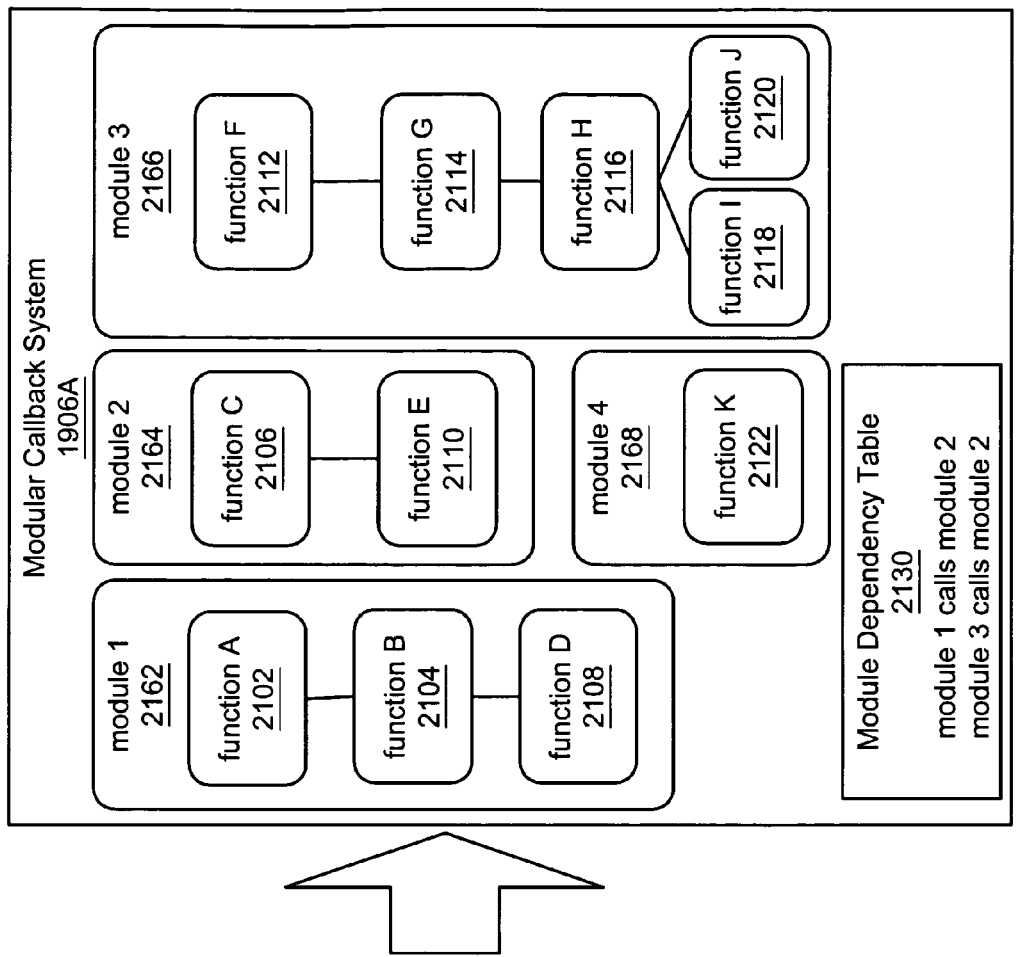
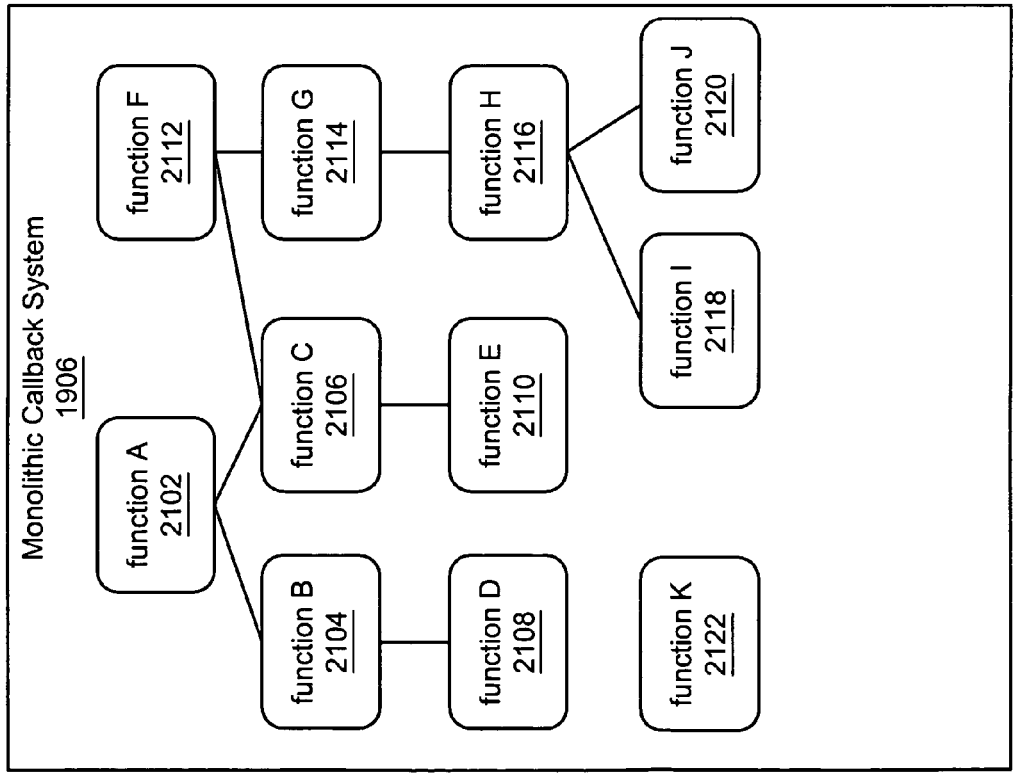
FIG. 21

COMPACT MODULAR EMBEDDED DEVICE

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

FIELD OF THE INVENTION

The present invention relates to the fields of embedded devices, and more particularly to an extensible compact modular embedded device.

DESCRIPTION OF THE RELATED ART

Embedded measurement and control systems have been developed for a wide variety of applications, such as automated manufacturing and remote data collection, among others. However, in many prior art systems it is often the case that the memory footprint of an application, e.g., a program, e.g., a graphical program, is too large to be stored and executed on an embedded device. This situation may be exacerbated by the fact that an execution system and/or operating system required to execute the application may also have a relatively large footprint in the target embedded device, thereby limiting further the applications which may be run on the device. While personal computers (PCs) or workstations are relatively inexpensive for the amount of computational power they provide, they are still generally more expensive and larger than the cheapest and smallest embedded systems. In the embedded arena today, there are many applications where flexibility in the selection of hardware components and hardware manufacturing cost are dominant factors in total system requirements. Requirements for system size and power consumption of some systems cannot be met by existing standard embedded hardware. Therefore, improved embedded hardware architectures are desired, to offer more modularity for a lower system cost.

In parallel with the development of modern embedded systems, increasingly sophisticated programming techniques and tools have been developed, such as object oriented programming, graphical programming with graphical programming languages, and so forth.

An exemplary graphical programming system is the LabVIEW graphical programming system provided by National Instruments Corporation. U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered a higher and more intuitive way in which to interact with a computer. A graphically based programming environment can be represented at a level above text-based high level programming languages such as C, Basic, Java, etc.

The method disclosed in Kodosky et al allows a user to construct a diagram using a block diagram editor. The block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

Therefore, Kodosky et al teaches a graphical programming environment wherein a user places or manipulates icons and interconnects or "wires up" the icons in a block diagram using a block diagram editor to create a graphical "program." A graphical program for performing an instrumentation, measurement or automation function, such as measuring a Unit Under Test (UUT) or device, controlling or modeling instruments, controlling or measuring a system or process, or for modeling or simulating devices, may be referred to as a virtual instrument (VI). Thus, a user can create a computer program solely by using a graphically based programming environment. This graphically based programming environment may be used for creating virtual instrumentation systems, modeling processes, control, simulation, and numerical analysis, as well as for any type of general programming.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program or VI, and may include other icons which represent devices being controlled. The front panel may be comprised in a single window of user interface elements, or may comprise a plurality of individual windows each having one or more user interface elements, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel may comprise front panel objects, e.g., the GUI, embedded in the block diagram.

During creation of the block diagram portion of the graphical program, the user may select various function nodes or icons that accomplish his desired result and connect the function nodes together. For example, the function nodes may be connected in one or more of a data flow, control flow, and/or execution flow format. The function nodes may also be connected in a "signal flow" format, which is a subset of data flow. The function nodes may be connected between the terminals of the various user interface elements, e.g., between the respective controls and indicators. Thus the user may create or assemble a graphical program, referred to as a block diagram, graphically representing the desired process. The assembled graphical program may be represented in the memory of the computer system as data structures and/or program instructions. The assembled graphical program, i.e., these data structures, may then be compiled or interpreted to produce machine language that accomplishes the desired method or process as shown in the block diagram.

Input data to a graphical program may be received from any of various sources, such as from a device, unit under test, a process being measured or controlled, another computer program, or from a file. Also, a user may input data to a graphical program or virtual instrument using a graphical user interface, e.g., a front panel as described above. The input data may propagate through the block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the user interface may be used merely to view the input and output, or just the output, and the input may not be interactively manipulable by the user during program execution.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, image processing/machine vision applications, and motion control, among others. For example, LabVIEW RT (real time) is a version of LabVIEW directed for use in and with real time embedded systems.

SUMMARY OF THE INVENTION

Various embodiments of a compact modular embedded device are presented. Recent technological progress such as complete systems on a chip, integrated low-power communication, compact low-power devices that interact with the physical world, remote programmability and interaction from/with host PCs by leveraging PC software, development tools, and system design knowledge, may facilitate compact modular devices of unprecedented size and functionality. For example, sensor interfaces may be constructed using commercial components on the scale of a square inch in size and a fraction of a watt in power, using one or more microcontrollers connected to various sensor devices, using $I^2C$, SPI, or device specific protocols, and to small transceiver chips, where, as is well known, sensors interact with various fields and forces to detect light, heat, position, movement, chemical presence, and so on. The sensor interface may be implemented at near microscopic scales as communication becomes integrated on-chip and micro-electrical mechanical (MEMS) devices make a rich set of sensors available on the same CMOS chip at extremely low cost. Sensor interfaces may be integrated into their physical environment, perhaps even powered by ambient energy, and used in many smart space scenarios.

The compact sensor interface mentioned above, and described below in detail, is but one example of a more general technology referred to herein as a compact modular embedded device, where small form factor modules, each providing a respective functionality, may be connected together, e.g., via stacking, to perform a desired function or set of functions. Some applications may require or benefit from embedded systems that have a modular architecture, thus, in one embodiment, the embedded device may comprise a modular compact sensor interface, where a base hardware module may store and execute a program, and where additional hardware modules may be added to the base module for added functionality as desired.

Thus, in one embodiment, the compact modular embedded device may be low-cost, battery powered, small with regard to current available technology, modular, self-contained, and substantially maintenance-free. In a preferred embodiment, the base module is capable of running a LabVIEW generated executable, and so LabVIEW programmability may facilitate easy programming and standalone operation of the device. Note that depending upon the particular components and extension modules used, the compact modular embedded device may comprise a general purpose computer, but with an extremely compact form factor.

The following describes various embodiments of such compact modular embedded devices.

In one embodiment, the compact modular embedded device may have a small form factor, e.g., between approximately 2 cm×2 cm and approximately 5 cm×5 cm, e.g., approximately 5 mm×3 cm×3 cm, 5 mm×4 cm×4 cm, etc., or smaller package, requiring substantial miniaturization, integration of hardware and software, and power (energy use) management.

The compact modular embedded device preferably includes a base module, also referred to as a CPU or processor module, as well as a bus that couples the base module to a number of extension modules. The base module includes a processor, a memory medium coupled to or embedded in the processor, and a bus coupled to the processor. The memory medium preferably stores a complete bootstrap environment and is further operable to store a program which is executable by the processor. The extension modules may include modules for power, serial communications, memory, radio, digital I/O, debugging/programming, and data acquisition, among others, although is should be noted that these extension modules are for example only, and are not intended to limit the functionality of the extension modules to any particular set of functions or capabilities. As noted above, in some embodiments, the device may comprise a general purpose computer. Further examples of extension modules are provided below.

In one embodiment, the compact modular embedded device comprises a stack of modules with a compact form factor, e.g., between approximately 2 cm×2 cm and 5 cm×5 cm in size, and containing the base module and one or more extension modules, e.g., to provide functions such as power, RS232, MIO, MMC, Bluetooth, Debug, Breadboard, Ethernet, GPS, DAQ, and so forth. In other words, the base module is operable to couple to one or more extension modules via the bus in a stacked fashion, where the base module and the one or more extension modules each comprise a respective substantially planar circuit board, where, when stacked, the respective circuit boards of the base module and the one or more extension modules are substantially parallel, and where each extension module provides respective functionality for the compact modular embedded device.

Thus, the compact modular embedded device may comprise a stack of module boards, with the bus running vertically up the stack, where physical connectors join the modules and preferably extend the bus through the various modules, i.e., vertically through the stack, thereby providing for communication (e.g., including power transmission) among the extension modules (and the base module). In one embodiment, the module boards are single faced, except for the power module, and the distance between consecutive modules in the stack is approximately 5 mm. Note that this form factor is meant to be exemplary only, that that other compact form factors are also contemplated, such as for example, 4-6 mm separation, and so forth.

Note that in one embodiment, the power module may be attached under the base or processor module, e.g., to facilitate the addition of a battery pack to the stack as a power source. In other embodiments, power may be provided through other means, including, for example, an A/C adaptor or power supply, photo-voltaic cells, wireless power transmission, and so forth. In one embodiment, in addition to a battery pack, a connector may also be provided for coupling to an external power supply, e.g., an A/C adaptor, e.g., for primary power, charging the batteries, etc. It should be noted that in various embodiments, different power modules may be attached, offering different power levels to the bus line.

In one embodiment, the compact modular embedded device may also include a small form factor chassis or enclosure for protection of the device components. For example, in one embodiment, the chassis may comprise a square "tube" into which the various modules may be stacked, and where the tube is just large enough to accommodate the device modules, although other types of chassis or enclosures are also contemplated.

As noted above, one exemplary application for compact modular embedded devices relates to sensors, e.g., remote sensing. In other words, in one embodiment, the compact modular embedded device may comprise a compact sensor interface. The compact sensor interface may include the base or processor module mentioned above, a power module, and various other extension modules, including at least one module that operates to receive data from a sensor. In one embodiment, one or more of the modules may include sensors, e.g., thermometers, motion detectors, chemical "sniffers", accelerometers, etc., and so the compact sensor interface may comprise a smart sensor. In one embodiment, the device may comprise a complete sensor/intelligence/communication system integrated into the small form factor device.

Note that embodiments of the invention implementing a compact sensor interface are not limited to any particular sensor, i.e., any type of sensor or sensors may be used. Exemplary sensors contemplated for use include any micro-electro-mechanical system (MEMS) sensors that combine sensing elements with electronics and/or mechanical elements on a silicon chip, due to their reduced size and/or power requirements. Note that in various embodiments, the sensors may be on-board, or may be coupled to the embedded device via on-board terminals. Of course, there are many applications for compact modular embedded devices besides a compact sensor interface, and the descriptions herein are not intended to limit the implementation, functionality, or application domain of compact modular embedded devices to any form, function, or application.

It should be noted that although some of the features described below apply specifically to embodiments of the compact sensor interface, some of the features or aspects described may also apply to various embodiments of compact modular embedded devices in general. It should be further noted that for embodiments of the compact modular embedded device directed at other applications, other features or attributes than those presented below may be desirable, and so may impose other constraints or requirements on the design. For example, in an embodiment where the compact modular embedded device is to be used in an aquatic environment, the device may be enclosed in a water-tight chassis or enclosure.

A small, flexible modular compact sensor interface is described below that expresses some of the key characteristics of the general class of this type of device, and that represents various internal interfaces using currently available components. Note that the embodiment described below uses the LabVIEW graphical program system, but that other types of programs and programming systems are also contemplated.

In one embodiment, the compact sensor interface may include the following attributes: self stacking modules with 80-pin multipurpose bus connectors to allow multiple modules to be added to the system without the burden of back-planes and cartridges; minimized size (e.g., approximately 1.5×1.5 in, 4×4 cm, etc.); low power consumption (typically 0.03 watts per module); a processing unit (CPU) board, which is programmable, e.g., from a graphical programming environment, and which preferably contains or stores a bootstrap program or environment; detailed downloadable LV/80 BUS specifications; and drivers, e.g., LabVIEW drivers, for internal interfaces such as SPI, I$^2$C, GPIO.

The processor module provides the CPU of the module stack, and is preferably operable to control the stack, implementing communication and control functions for stack modules, e.g., moving data between stack modules. The processor module also preferably serves as the base module for the device, and is preferably programmable, e.g., from LabVIEW Host, via wired and/or wireless communication. For example, in one embodiment, the processor module may run an executable generated from Host LabVIEW Embedded, and so may store and boot-up running the previously stored LabVIEW VI (graphical program) executable.

In one embodiment, the processor is an Atmel ARM processor (ARM7 type), specifically, the AT91FR40162. Various other components on the processor module may include a power regulator or transformer, that transforms received power to the correct voltage for the processor, e.g., 3V down to 1.8V, a remote 8-bit I/O Expander for I$^2$C bus (for "Plug and Play" functionality regarding expansion modules), a bus, e.g., implemented with two connectors, an on/off switch, and a 4-position switch for configuring the module, e.g., for specifying whether to auto-run the last loaded program upon boot-up, whether to wait for further programming, and so forth. The processor module may also include a real time clock (RTC), a JTAG for factory programming, an EEPROM for module addressing and configuration, reset circuitry, bus connectors, two on each side, and a power LED for power ON/OFF notification. In other embodiments, the clock may be embedded on the processor itself.

In this embodiment, the processor includes 2 MB of internal flash program memory and 256 KB of data SRAM memory, connected to the real time clock and an oscillator with programmable frequencies from approximately 300 KHz to approximately 68 MHz. The flash memory may operate at 10 MHz, and facilitate execution of programs directly from flash, resulting in approximately 33% lower CPU power consumption, but with a performance degradation of approximately 42.5%. Better performance may be obtained when some of the more frequently used functions (e.g., an FIR that is called again and again in a loop) are executed from internal RAM, with a performance increase of almost 50% and 40% less power consumption. However, in this embodiment, the amount of internal RAM is limited to roughly 64 Kbytes for applications, and so only a few functions may be able to run from RAM, e.g., the critical/frequently used functions.

In one embodiment, the processor module may include one or more counters/timers which may be exported to the bus for use by other modules. For example, in one embodiment, the processor module may include three 16-bit counters/timers, each comprising three lines exposed to the bus, e.g., counter0: GPIO1, GPIO2, and GPIO3 lines (where GP refers to "general purpose"), counter1: TIOA1, TIOB1, and TCLK1 lines, and counter2: TIOA2, TIOB2, and TCLK2 lines. In one embodiment, counter0 and counter2 may be used by the user, e.g., via breadboard modules, and counter2 used by an MIO module. It should be noted, however, than if an MIO module is not included, or doesn't require the use of counter2, that counter2 may also be accessed or used by other modules or by the user via breadboard modules.

The ARM7 internal 2M Flash memory location may be segmented in two partitions. Partition1 is 128 KB long, and is preferably pre-loaded with programs that provide infrastructure functionality for the module, e.g. a bootloader. Partition2 is 1.6 MB long, and is preferably available for application download and storage. Note that in preferred embodiments, the processor module can store one or more "executables" (e.g., VI executables), if desired—there is a switch that may be manually set for this task—and therefore can boot up with the executable. The boot-up sequence for this embodiment takes less than 1 sec. The ARM7 internal 256 KB RAM buffer may be used for program data. Note that in some embodiments, data storage (e.g., for datalogging) may be directed to an MMC module and not CPU Flash.

The modules listed below are example modules that may operate in conjunction with the base module to perform respective functions, e.g., specified by a program, e.g., a graphical program. Note that the base module is required for operation of the extension modules, and thus functions as a master module in the system.

Examples of extension modules contemplated include, but are not limited to, the following: a power module, operable to couple to the power source and provide power to the modular embedded device; a memory module, e.g., flash, RAM, ROM, and/or microdrive; a programming/debugging module; a serial communications module, e.g., RS232; a multi-function I/O module; a data acquisition (DAQ) module; a DSP (digital signal processing) module; a breadboard module, e.g., for prototyping and/or user-built modules; a wireless communications module, e.g., Bluetooth, 802.11b, etc.; an analog I/O module; a digital I/O module; a sensor module including one or more sensors; an LCD module, e.g., for display functionality; a keyboard and/or mouse module; an audio module; a speaker module; a modem telephone line module; a modem GSM module; a gyroscope module; an CAN module; a MultiMedia Card (MMC) module; a Compact Flash (CF) module; a camera module; a monitor interface module; an audio module; a speaker module; and an actuator module, i.e., including an electromechanical component that may operate to perform a physical or mechanical task, among others. Further examples of extension modules include modules for a monitor interface, Ethernet, counter/timer, relays 60V AC/DC and isolated source, RS485, AIO with ADC sigma-delta (type DMM), 2 IrDA, control 2 MPP motors, among others. Note that the modules described herein are meant to be exemplary only, and are not intended to limit the modules to any set of functions or implementations. In other words, extension modules may be developed to provide any functionality desired.

Note that in preferred embodiments, it should be possible to connect several modules of the same type in an application (ex: 2 AI modules for more AI channels). In another embodiment, multiple compact modular embedded devices, e.g., compact sensor interfaces, may communicate with one another to cooperatively perform a task, such as a distributed task.

The above description is directed at compact sensor interface embodiment, although it should be noted that this is but one exemplary application of the compact modular embedded device described herein, and that the systems and methods described are broadly applicable to any application domain where a small device with embedded intelligence is required.

The deployment of programs onto the embedded device may be performed in a number of different ways. For example, in a preferred embodiment, a program may be deployed to the device as an executable.

In a preferred embodiment, a user first selects a target, then creates programs or VIs in an appropriate development environment. For example, functions that are not supported by the target device may be omitted from the functions available to the programmer, i.e., the development environment may be specific to the target device. For example, the development environment may be LabVIEW Embedded Module, which is a subset of standard, i.e., "desktop", LabVIEW. Then an executable for that target is created from the programs or VIs. For example, the program or VIs may be translated into C code, and an off the shelf compiler and linker (e.g., gcc) is used to build the executable. After the executable is built it may be downloaded to the target from LabVIEW and subsequently run standalone (or debugged from LabVIEW). If the user is debugging then he/she can set breakpoints and probes, and step through the block diagram, and may also view the front panel update.

Note that the LabVIEW Embedded Module software may be designed and implemented so as to support as wide a range of targets as possible, including, for example, the ARM7 32-bit processor described above.

Thus, the compact modular embedded device may serve as a base for a wide variety of embedded applications, where the program and extension modules coupled to the base module determine the functionality of the device, and may be useful for any application that needs embedded intelligence and that benefits from a small form factor. Exemplary applications include, but are not limited to, measurement, communication, and storage, among others. Other application contemplated include, but are not limited to, inventory management and control, remote surveillance, security, automated manufacturing and control, machine vision, distributed computing, chemical detection, synthesis, and/or analysis, robotics, medical applications, entertainment, sensor interface, monitoring equipment, security, vehicular systems, data loggers, and low-power industrial control systems, and telecommunications, among others.

BRIEF DESCRIPTION OF THE DRAWINGS

A better understanding of the present invention can be obtained when the following detailed description of the preferred embodiment is considered in conjunction with the following drawings, in which:

FIG. 4C illustrates another example of an embedded target device, according to one embodiment;

FIG. 21 graphically illustrates componentization of a callback system, according to one embodiment;

Figure 1:
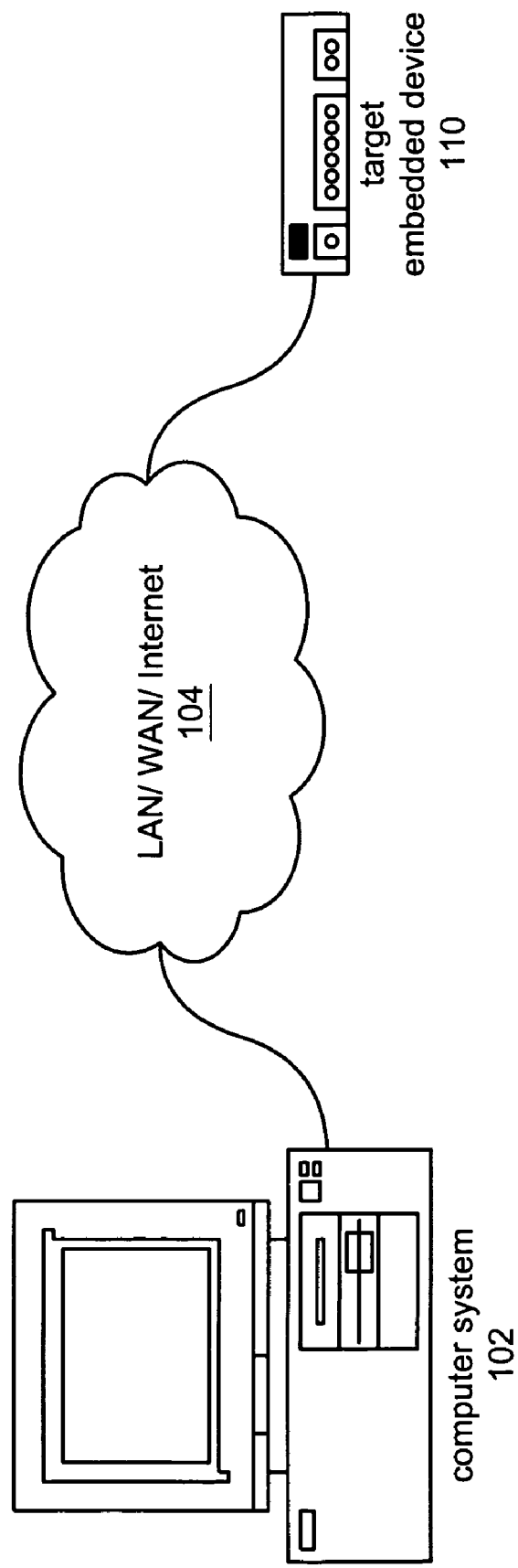
FIGS. 1 and 2 illustrate embodiments of a system for execution of a program in an embedded system.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. patent application Ser. No. 09/617,600 titled "Graphical Programming System with Distributed Block Diagram Execution and Front Panel Display," filed Jun. 13, 2000, and which issued as U.S. Pat. No. 6,802,053.

U.S. patent application Ser. No. 09/518,492 titled "System and Method for Programmatically Creating a Graphical Program," filed Mar. 3, 2000, and which issued as U.S. Pat. No. 7,159,183.

U.S. patent application Ser. No. 09/745,023 titled "System and Method for Programmatically Generating a Graphical Program in Response to Program Information," filed Dec. 20, 2000, and which issued as U.S. Pat. No. 7,210,117.

U.S. patent application Ser. No. 10/283,758 titled "Wireless Deployment/Distributed Execution of Graphical Programs to Smart Sensors", filed Oct. 30, 2002.

The LabVIEW graphical programming manuals, including the "G Programming Reference Manual", available from National Instruments Corporation, are also hereby incorporated by reference in their entirety.

Figure 2:
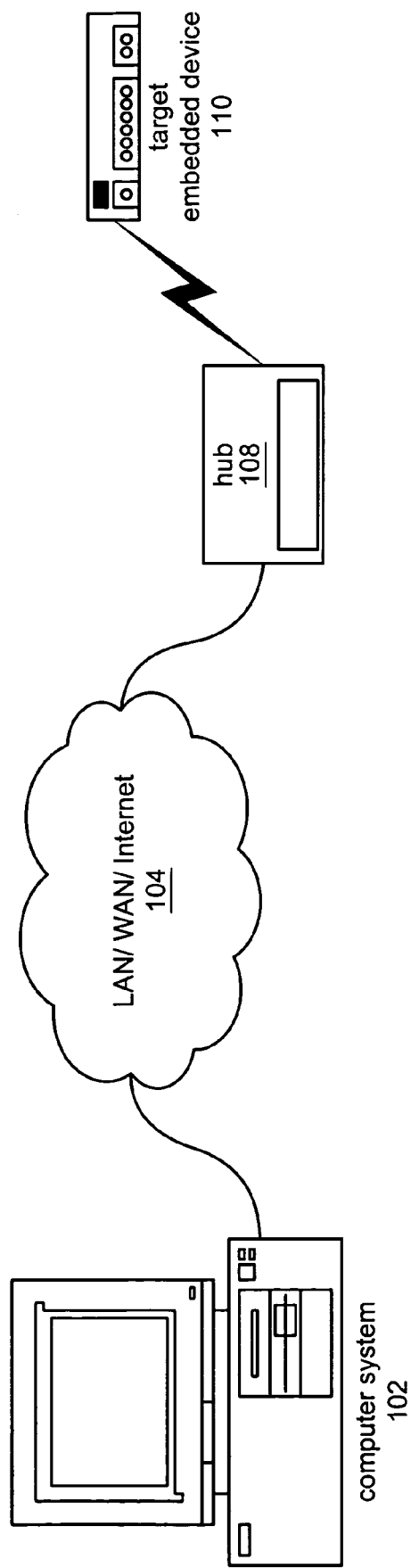

FIGS. 1 and 2—Embedded Systems

FIGS. 1 and 2 illustrate embodiments of an embedded system for executing programs. As shown in FIG. 1, the system may include a computer system 102 coupled through a network 104 (or other transmission medium) to an embedded device 110, also referred to as a target device 110. In other embodiments, such as illustrated in FIG. 2, the computer system 102 may be coupled to the target device 110 via an intermediate hub 108, which may communicate with the computer system 102 over the network 102, and which may communicate with the target device 110 via wireless means.

The computer system 102 may be any of various types of computer systems. Computer system 102 may include a processor, a memory medium, as well as other components as may typically be found in a computer system. The memory medium of the computer system may store a program development environment for creating programs. The computer system 102 is described in more detail below with reference to FIG. 3. As used herein, the term program is intended to include text-based or graphical instructions which are executable, compilable, and/or interpretable by a processor or programmable hardware element (such as a Field Programmable Gate Array (FPGA)) to perform a specified function or functions.

In one embodiment, the program development environment is a graphical program development environment for creating graphical programs. An exemplary graphical program development environment is the LabVIEW development environment offered by National Instruments Corporation. A user may create a program on a computer system, and computer system 102 may provide the program, e.g., after conversion to an executable, to target embedded device 110, optionally via hub device 108.

Target device 110 may include a processor and memory medium for executing programs, such as graphical programs. In one embodiment, the target device 110 executes programs, e.g., graphical programs, preferably in executable form, received from the computer system over the network 104. In another embodiment, the computer system 102 sends the program to the hub device 108 over the network 104, and the hub device 108 operates to deploy the programs to the target device 110 in a wireless fashion, and the program executes on target device 110. It should be noted that in various embodiments, the target device 110 may be implemented in different devices, such as, for example, a device with an ARM processor, as described below, a PXI chassis which includes an embedded device card, or any other processor based device suitable for embedded systems. One exemplary target device 110 is a smart sensor (e.g., a smart camera).

In one embodiment, the target device 110 may include a programmable hardware element, such as an FPGA. The target device 110 may be operable to receive a hardware configuration file, e.g., a netlist, which encodes a desired functionality, and to deploy the hardware configuration file to the FPGA, thereby configuring the FPGA to perform the desired functionality.

Target device 110 may be connected to computer system 102 by a network 104 as shown. The network may be comprised of any of the various types of networks including local area networks (LAN), wide area networks (WAN), etc. One example of a wide area network is the Internet. Target device 110 may also connect to computer system 102 through other communication mediums, such as a serial bus, e.g., USB or IEEE 1394, a parallel bus, or through wireless means. The wireless communication mechanism may comprise any of various types of wireless transmission, including Blue Tooth, IEEE 802.11 (wireless Ethernet), RF communication, and other types of wireless communications, such as, for example, communication via satellite, and cell towers, such as used for cellular telephone communication, among others. In various embodiments, the target device 110 may include or may be coupled to one or more sensors or actuators. For example, the target device may include a radio and may be coupled to a sensor via wireless means. In one embodiment, one or more of the sensors coupled to the target device 110 may be smart sensors, i.e., may include a processor and memory (and/or a programmable hardware element, such as an FPGA), and therefore may be operable to execute program code and/or receive commands from the target device 110 as a result of execution of the program code.

Embedded Devices

As mentioned above, in various embodiments of the present invention, an embedded device 110 may be coupled to the host computer 102. As used herein, the term "embedded device" refers to a small platform which includes dedicated hardware, and which includes a processor and memory (or FPGA) on which may be installed dedicated programs or software. An embedded device is typically designed to perform a defined task very well. In particular, an embedded device is typically not a device with general capabilities, such as a PC or PXI controller, for example, loaded with one or several plug-in boards, running a Microsoft OS with generous amounts of memory, system files, utilities, etc, that can be used as a measurement system, or as an office computer, or as a Web browser, etc. One example of an embedded system is an Internet remote camera, with dedicated hardware and software that implements the following tasks: acquiring images from the optical device, compressing the images as GIF or JPEG files, or perhaps as MPEG streams, and sending the images to a host computer upon request, using TCP/IP, HTTP, or multimedia streams.

Other examples of embedded devices include a measurement device with a specific type of measurement hardware and/or software for taking certain measurements, a control measurement device with a specific type of hardware and/or software for performing certain control operations, etc.

In the camera example, the end user does not care about how these tasks are implemented, but only wants a device that sends real-time images over the Internet. Embedded systems are often used as building blocks for more complicated applications. Thus, an embedded device generally includes both hardware and software. Additionally, embedded devices are generally built around a specialized hardware component, which is the "reason to exist" for these devices (like the camera in the above example). Other typical components include: a processor, such as an ARM processor, RAM and ROM memory, a storage medium, a display, one or more communication devices, and power and over-voltage protection components. Generally, flash memory is used for data storage in addition to RAM.

Figure 3:
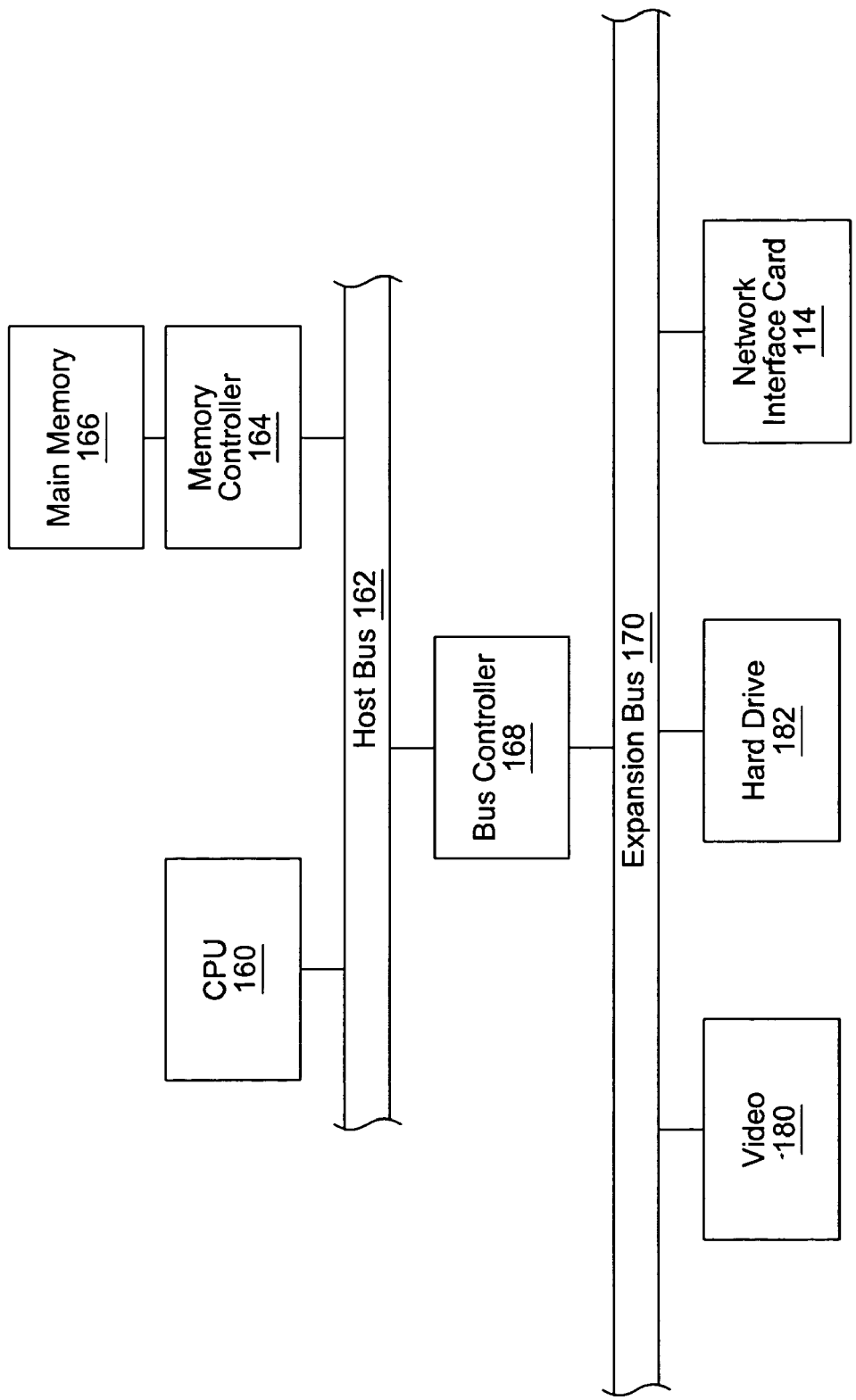
FIG. 3 is a block diagram of the computer system of FIGS. 1 and 2, according to one embodiment.

FIG. 3—Computer System Block Diagram

FIG. 3 is a block diagram for a computer system 102 suitable for implementing various embodiments of the present invention. More specifically, the computer system 102 may be operable to store and download to the target device 110 a graphical program that is configured to perform a specified function. Embodiments of a method for transmitting and executing the graphical program are described below. The computer system 102 may be any type of computer system, including a personal computer system, mainframe computer system, workstation, network appliance, Internet appliance, personal digital assistant (PDA), laptop computer, tablet computer, television system or other device. In general, the term "computer system" can be broadly defined to encompass any device having at least one processor that executes instructions from a memory medium. The computer may include at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others.

The computer system 102 may include a memory medium(s) 166 on which one or more computer programs or software components according to one embodiment of the present invention may be stored. For example, the memory medium may store a graphical program execution system, as well as one or more graphical programs, as described above. Also, the memory medium may store a graphical programming development environment application used to create and/or execute such graphical programs. The memory medium may also store operating system software, as well as other software for operation of the computer system.

The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution.

As FIG. 3 shows, the memory medium 166 may be coupled to the host bus 162 by means of memory controller 164. The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices, such as a network interface card 114, a video display subsystem 180, and hard drive 1102 coupled to the expansion bus 170.

In the present application, the term "graphical program" or "block diagram" is intended to include a program comprising graphical code, e.g., two or more interconnected nodes or icons, wherein the interconnected nodes or icons may visually indicate the functionality of the program. The nodes may be connected in one or more of a data flow, control flow, and/or execution flow format. The nodes may also be connected in a "signal flow" format, which is a subset of data flow. Thus the terms "graphical program" or "block diagram" are each intended to include a program comprising a plurality of interconnected nodes or icons which visually indicate the functionality of the program.

A graphical program may also comprise a user interface or front panel. The user interface portion may be contained in the block diagram or may be contained in one or more separate panels or windows. The user interface of a graphical program may include various graphical user interface elements or front panel objects, such as user interface controls and/or indicators, that represent or display the respective input and/or output that will be used by the graphical program or VI, and may include other icons which represent devices being controlled. The user interface or front panel may be comprised in a single window of user interface elements, or may comprise a plurality of individual windows each having one or more user interface elements, wherein the individual windows may optionally be tiled together. As another example, the user interface or front panel may comprise user interface or front panel objects, e.g., the GUI, embedded in the block diagram. The user interface of a graphical program may display only output, only input, or both input and output. Further, in some embodiments the user interface operates as a front panel, wherein the user can interactively control or manipulate the input being provided to the graphical program during program execution and can view resulting output.

Examples of graphical programming development environments that may be used to create graphical programs include LabVIEW, DasyLab, and DiaDem from National Instruments, VEE from Agilent, WiT from Coreco, Vision Program Manager from PPT Vision, SoftWIRE from Measurement Computing, Simulink from the MathWorks, Sanscript from Northwoods Software, Khoros from Khoral Research, SnapMaster from HEM Data, Vis Sim from Visual Solutions, ObjectBench by SES (Scientific and Engineering Software), and VisiDAQ from Advantech, among others. In the preferred embodiment, the system uses the LabVIEW graphical programming system available from National Instruments.

Figure 4A:
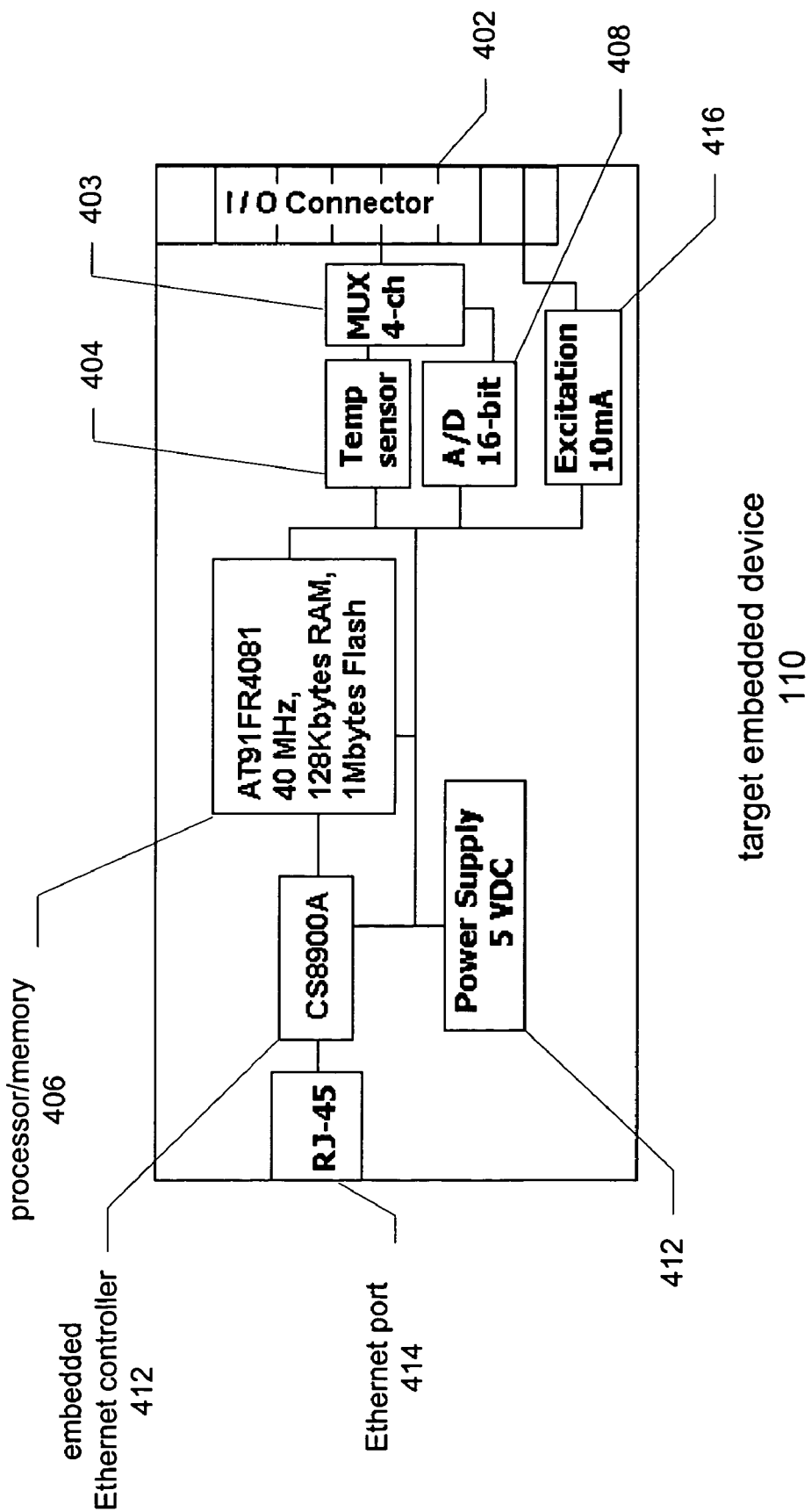
FIG. 4A is a hardware layout of an embedded target device, according to one embodiment.

FIG. 4A—Embedded Device Hardware Configuration

FIG. 4A illustrates a hardware configuration of one embodiment of a target embedded device, as shown in FIGS. 1 and 2. It should be noted that the embodiment shown is intended to be exemplary only, and is not meant to limit the target embedded device to any particular architecture, components, size, or form.

In the embodiment shown in FIG. 4, the target embedded device 110 may include an I/O connector 402 coupled to a 4-channel multiplexer (MUX) 403, connected to a 4-channel 16-bit ADC 408, a temperature sensor 404, a 10 mA excitation component 414, a micro-controller with internal flash program memory and data SRAM 406, and Ethernet port 414. In this embodiment, power is provided by a 5 volt DC power supply 412. The processor 406, an ATMEL ARM Thumb AT91FR4081, has a high-performance 32-bit RISC architecture with high-density 16-bit instruction set and very low power consumption. By combining the micro-controller, featuring 136 Kbytes on on-chip SRAM and a wide range of peripheral functions, with 8 Mbits of Flash memory in a single compact 120-ball BGA package, the Atmel AT91FR4081 406 provides a powerful, flexible, and cost-effective solution to the minimal embedded control application. Significant board size reduction is also noted as a benefit.

Figure 4B:
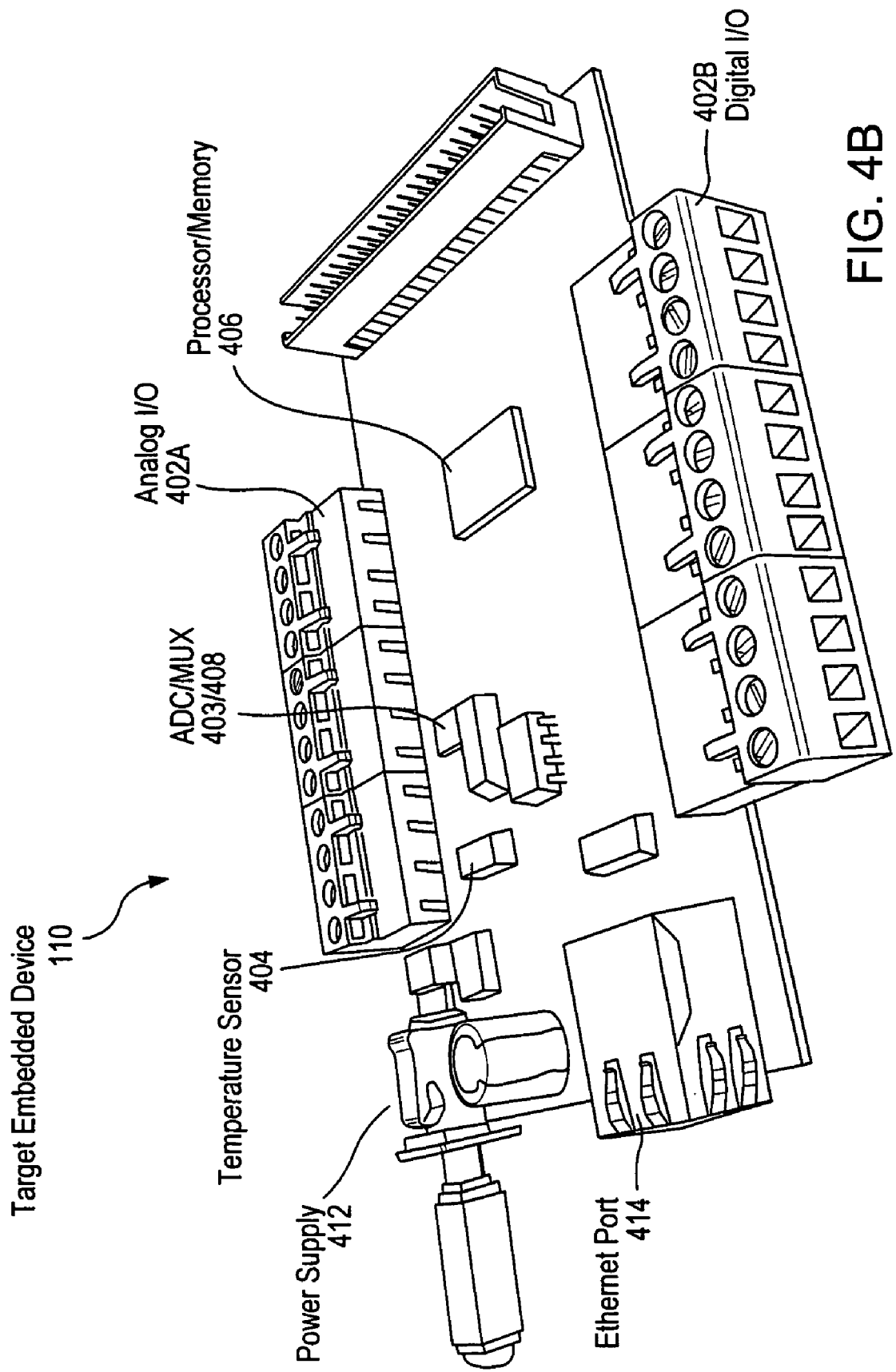
FIG. 4B illustrates the embedded target device of FIG. 4A, according to one embodiment.

FIG. 4B—Embedded Device Hardware

FIG. 4B illustrates the embedded hardware of FIG. 4A, according to one embodiment. As FIG. 4B shows, the hardware components included in the target embedded device 110 facilitate an extremely compact form factor. Note that in this embodiment, there are actually two I/O connectors, specifically, an analog I/O connector 402A, and a digital I/O connector 402B, as shown in FIG. 4B.

FIG. 4C—Another Example of Embedded Device Hardware

FIG. 4C illustrates another embodiment of the embedded target device 110, denoted as embedded target device 110A. As FIG. 4C shows, in this embodiment, substantially all of the functionality included on the board is modular. For example, different I/O cards 420 may be selected and plugged-in depending on the type of sensors required by the application. In this embodiment, components which may be provided by additional modules (e.g., cards) have been remove, such as the temperature sensor 404 and the ADC 408. In this embodiment, a micro-controller with internal 1 MB of flash program memory and 128 kb of data SRAM is connected via SPI (serial peripheral interface) to an analog small form-factor DAQ slot, and is further connected via a digital bus to a digital small form-factor DAQ slot. This embodiment may be particularly suited for smart sensing, computing, and control, due to the design emphasis on modularity.

Figure 5:
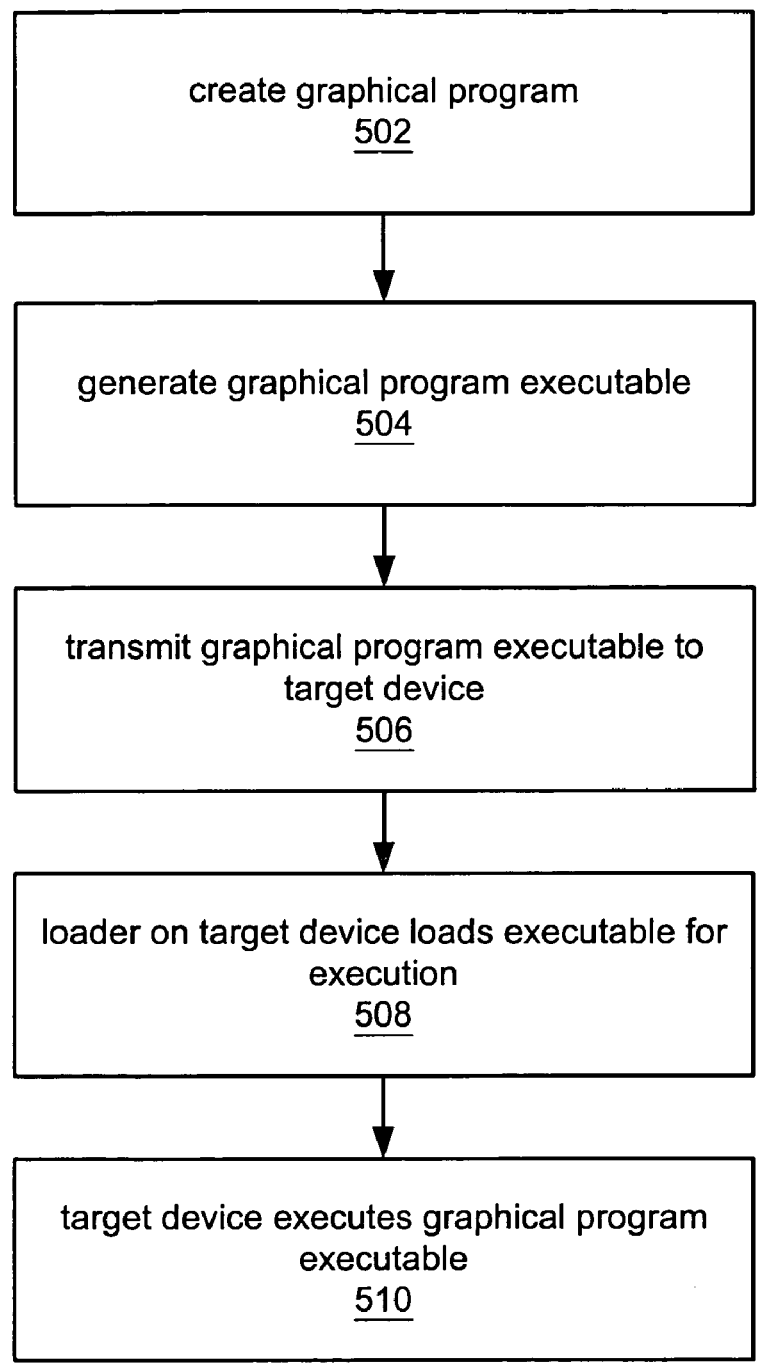
FIG. 5 flowcharts one embodiment of a method for deploying and executing a program on an embedded device.

FIG. 5—Method for Deploying and Executing a Graphical Program

FIG. 5 flowcharts one embodiment of a method for creating, deploying, and executing a graphical program on an embedded device. More specifically, a method is described for creation and deployment of programs on the target device 110. It is noted that in various embodiments, some of the steps may be performed in a different order than shown, or may be omitted. Additional steps may also be performed. As shown, this method may operate as follows.

In one embodiment, the user first may create a program that is operable to execute within the target embedded device, as indicated in 502. In creating the program, the user may be aware of the one or more sensor devices 120 which will be acquiring data in the system. The user may include code in the program which is operable to execute on the target device, and which operates to provide instructions to one or more of sensor devices 120 to direct sensor devices 120 to acquire data at certain times or based on certain detected events. In one embodiment, the user may create a graphical program on computer system 102. As noted above, a graphical program may comprise graphical code, i.e., two or more interconnected nodes or icons which visually represent operation of the program. In creating the program, the user may place icons within the graphical program representing each of the respective sensor devices 120 that are being used. The user may also include graphical code in the program which operates to provide instructions to the respective sensor device icons, i.e., by connecting other graphical nodes to the sensor device icons in the graphical program. Thus, the graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also optionally include a user interface portion or front panel portion. Where the graphical program includes a user interface portion, the user may assemble the user interface on the display. As one example, the user may use the LabVIEW graphical programming development environment to create the graphical program.

As described below, the block diagram may be intended to execute on the target device 110. The user interface code may remain on the host computer 102 and may execute on the host computer 102 to present the user interface on the host computer 102 during execution of the block diagram on the target device 110. The user may interact with the user interface presented on the host computer 102 to provide input to and/or view output from the block diagram executing on the target device 110.

In another embodiment, the graphical program may be created in step 502 by the user creating or specifying a prototype, followed by automatic or programmatic creation of the graphical program from the prototype. This functionality is described in U.S. patent application Ser. No. 09/587,602 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument. For example, in an embodiment where the instrument is an image acquisition device (e.g., a smart camera), the graphical program may implement an image processing function.

Once the program has been completed, then in step 504, the graphical program may be converted to, or used to generate, an executable program, referred to as an "executable", as is well known in the art or programming. Thus, in some embodiments, the program actually deployed onto the embedded target device may be a converted program. In one embodiment, where the graphical program includes a block diagram and a user interface, only the block diagram portion may be used in generating the executable, and the user interface may remain as code that executes on the host computer 102.

Then, in 506, the executable may be transmitted to the target device 110, e.g., over a network (or other transmission means). In other words, the user may cause the computer system to send the executable over the network 104 (or other communication medium) to the target device 110.

The target device 110 may thus receive the executable, and a loader program on the target device 110 may load the executable, as indicated in 508.

Finally, as shown in 510, the target device 110, e.g., the loader on the target device 110, may execute the executable. In alternative embodiments, the converted program deployed to the device may not simply be an executable, but may be a program combined with an execution engine, described below in detail.

In one embodiment, the target device 110 may send output data (e.g., acquired data or execution results) to the host computer 102. The data may be transmitted to the computer 102 over the network 104, e.g., through wired or wireless means. The target device 110 may send the output data through one or more intermediate devices, such as a hub device 108. The host computer system 102 may display the received data in a GUI, and/or may otherwise process the received data to generate a certain result. In one embodiment, the user constructs a GUI or front panel as part of the process of creating the graphical program, and this GUI code is executed on the computer system 102 to present the GUI on the display of the computer system 102.

In one embodiment, in executing the program received from the computer system, the target device 110 may be directed by the program to provide certain commands to respective ones of sensor devices 120 to cause the sensor devices to acquire data and provide this acquired data to the target device. Examples of the types of commands that may be implemented by sensor devices 120 include, but are not limited to, single/multiple point read, writes (e.g., for configuration) start, and stop, among others. In one embodiment, the target device 110 may execute the program upon reception of the executable program from the host computer 102. In another embodiment, after the executable program has been transferred to the target device 110 and saved in Flash or RAM memory on this device, the user may send a command to the target device 110 over the network 104 invoking execution of the program by the target device 110. In an exemplary embodiment, the execution of the program results in some data being acquired or generated. These data may then be sent (e.g., over the network 104 or other communication medium) to the host computer system 102, e.g., for display and/or analysis. In other embodiments, the acquired data may be sent to other systems. For example, in one embodiment, the target device 110 may use web server program 604 to publish the acquired data to a website, where a system with a web browser may then access the data. In another embodiment, the target device may send the data to one or more other systems coupled to the network 104 (e.g., the Internet). Thus, the target device may send the acquired data to any networked devices, as desired.

In an alternate embodiment, described below in detail, the base module may store an execution engine, e.g., a graphical program execution engine, in which case the program, e.g., the graphical program, may not require conversion to an executable prior to deployment to the target device. In one embodiment, the execution engine may be a minimal execution engine or system, and may be deployed prior to sending the program to the target device 110. In another embodiment, the target device 110 may already have the execution system installed.

Compact Modular Embedded Devices

Various recent technological progress such as complete systems on a chip, integrated low-power communication, compact low-power devices that interact with the physical world, remote programmability and interaction from/with host PCs by leveraging PC software, development tools, and system design knowledge, may facilitate compact modular devices of unprecedented size and functionality. For example, sensor interfaces may be constructed using commercial components on the scale of a square inch in size and a fraction of a watt in power, using one or more microcontrollers connected to various sensor devices, using $I^2C$, SPI, or device specific protocols, and to small transceiver chips. As is well known, sensors interact with various fields and forces to detect light, heat, position, movement, chemical presence, and so on. The sensor interface may be implemented at near microscopic scales as communication becomes integrated on-chip and micro-electrical mechanical (MEMS) devices make a rich set of sensors available on the same CMOS chip at extremely low cost. Sensor interfaces may be integrated into their physical environment, perhaps even powered by ambient energy, and used in many smart space scenarios.

The compact sensor interface mentioned above, and described below in detail, is but one example of a more general technology referred to as a compact modular embedded device, where small form factor modules, each providing a respective functionality, may be connected together to perform a desired function or set of functions. Some applications may require or benefit from embedded systems that have a modular architecture. For example, in one embodiment, the embedded device may comprise a modular compact sensor interface, where a base hardware module may store and execute a program, e.g., a graphical program, or portions thereof, and where additional hardware modules may be added to the base module for added functionality as desired. The following describes various embodiments of such compact modular embedded devices. In one embodiment, the present invention may comprise a complete sensor/intelligence/communication system integrated into a small form factor, e.g., between approximately 2 cm×2 cm and approximately 5 cm×5 cm, e.g., approximately 5 mm×3 cm×3 cm, 5 mm×4 cm×4 cm, etc., or smaller package, requiring substantial (evolutionary and revolutionary) advances in miniaturization, integration of hardware and software, and power (energy use) management.

Note that embodiments of the invention implementing a compact sensor interface are not limited to any particular sensor, i.e., any type of sensor or sensors may be used. Exemplary sensors contemplated for use include any micro-electro-mechanical system (MEMS) sensors that combine sensing elements with electronics and/or mechanical elements on a silicon chip, due to their reduced size and/or power requirements. Note that in various embodiments, the sensors may be on-board, or may be coupled to the embedded device via on-board terminals. Of course, there are many applications for compact modular embedded devices besides compact sensor interface, and the descriptions herein are not intended to limit the implementation, functionality, or application domain of compact modular embedded devices to any form, function, or application.

Figure 6:
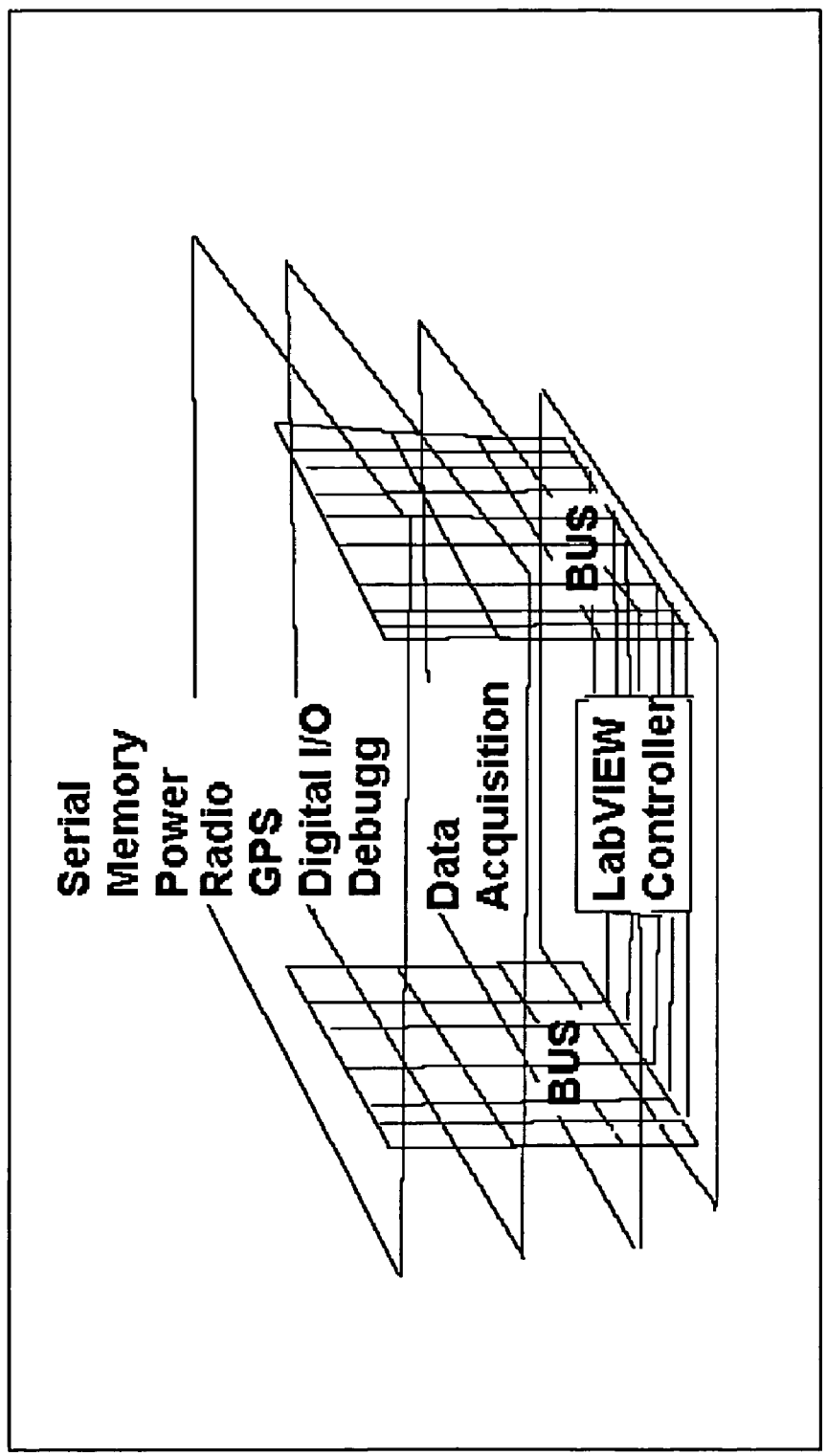
FIG. 6 illustrates a modular compact sensor interface with extension modules, according to one embodiment.

FIG. 6—A Compact Modular Embedded Device

FIG. 6 illustrates one embodiment of a compact modular embedded device. As FIG. 6 shows, the compact modular embedded device preferably includes a base module, also referred to as a CPU or processor module, labeled "LabVIEW Controller" in FIG. 6, as well as a bus that couples the base module to a number of extension modules. The base module includes a processor, a memory medium coupled to or embedded in the processor, and a bus coupled to the processor. The memory medium preferably stores a bootloader and is further operable to store a program which is executable by the processor via the bootloader. In an alternate embodiment, described below, the memory medium may store a program execution engine, e.g., a minimal execution engine, which operates to execute the program. The extension modules shown in FIG. 6 include modules for serial communications, memory, power, radio, GPS (global positioning system), digital I/O, debugging/programming, and data acquisition, although is should be noted that these extension modules are for example only, and are not intended to limit the functionality of the extension modules to any particular set of functions or capabilities.

The compact modular embedded device may serve as a base for a wide variety of embedded applications, where the program and extension modules coupled to the base module determine the functionality of the device, and may be useful for any application that needs embedded intelligence and that benefits from a small form factor. Exemplary applications include, but are not limited to, measurement, communication, and storage, among others.

In one embodiment, the compact modular embedded device may be low-cost, battery powered, small with regard to current available technology, modular, self-contained, and substantially maintenance-free. In a preferred embodiment, LabVIEW programmability may facilitate easy programming and standalone operation of the device.

Device Description

In one embodiment, the compact modular embedded device comprises a stack of modules with a compact form factor, e.g., approximately 4 cm×4 cm in size, and containing the base module and one or more extension modules, e.g., to provide functions such as power, RS232, MIO, MMC, Bluetooth, debugging, breadboard, Ethernet, GPS, DAQ, and so forth. In other words, the base module is operable to couple to one or more extension modules via the bus in a stacked fashion, where the base module and the one or more extension modules each comprise a respective substantially planar circuit board, where, when stacked, the respective circuit boards of the base module and the one or more extension modules are substantially parallel, and where each extension module provides respective functionality for the compact modular embedded device.

Thus, the compact modular embedded device may comprise a stack of module boards, with at least a portion of the bus running vertically up the stack, thereby providing for communication (e.g., including power transmission) among the extension modules. In one embodiment, the module boards are single faced, except for the power module, and the distance between consecutive modules in the stack is approximately 5 mm. Note that this form factor is meant to be exemplary only, that that other compact form factors are also contemplated, such as for example, 3×3 cm boards with 4 or 6 mm separation, 5×5 cm boards with 5 mm separation, and so forth.

Figure 7:
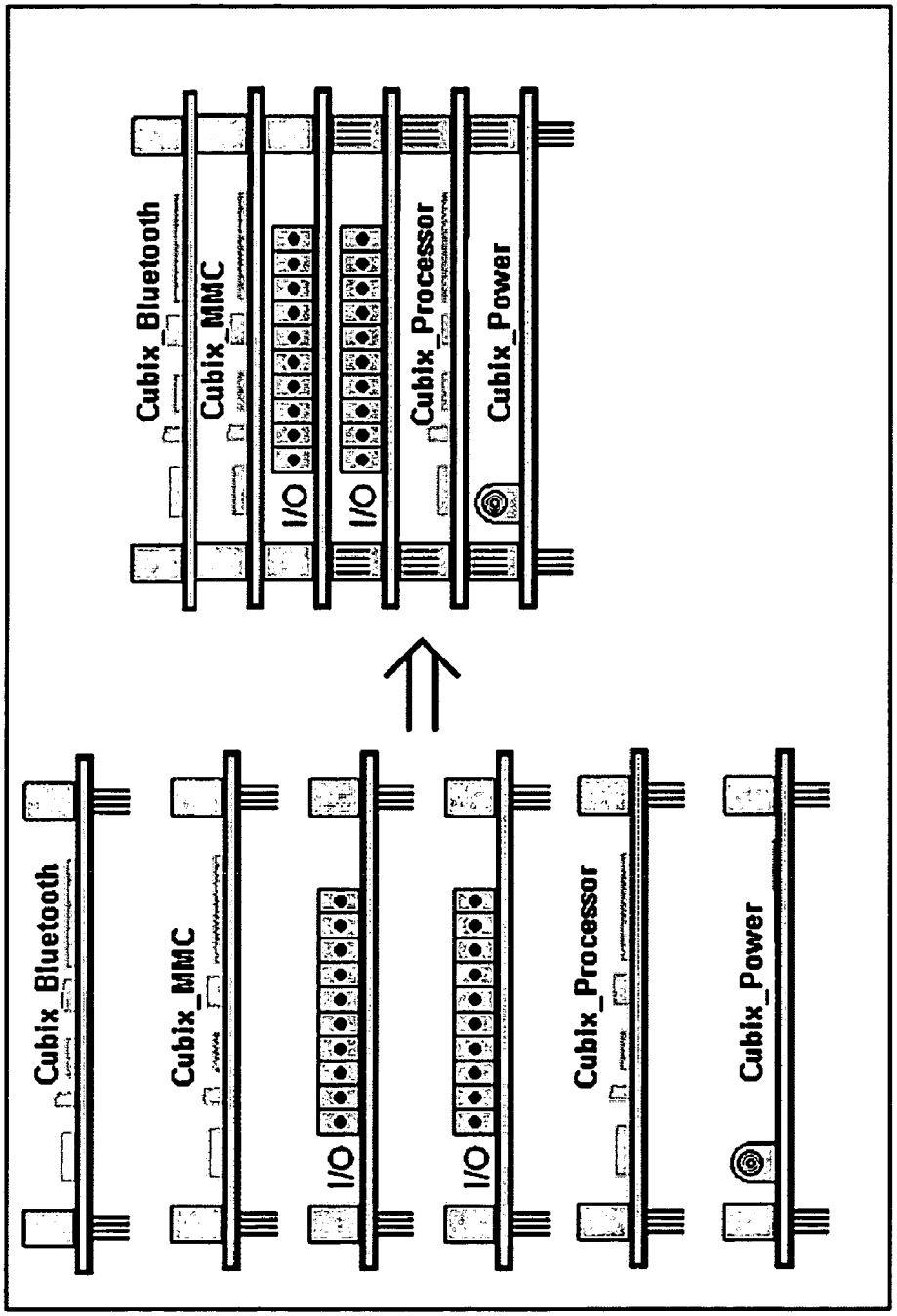
FIG. 7 illustrates a schematic diagram of a base module for the modular compact sensor interface, according to one embodiment.

FIG. 7—Example Module Stack

FIG. 7 illustrates an example compact modular embedded device module stack, according to one embodiment. As FIG. 7 shows, in this embodiment, the compact modular embedded device includes the base module, labeled "Cubix_Processor", a power module, labeled "Cubix_Power", two I/O modules, an MMC (MultiMedia Card) module, labeled "Cubix_MMC", and a wireless communication module, in this case, a Bluetooth module, labeled "Cubix_Bluetooth". Note that the modules shown are meant to be exemplary only, and are not intended to limit the number, function, or implementation of the extension modules to any particular set. For example, instead of, or in addition to, the Bluetooth module, an 802.11 wireless Ethernet module may be included in the module stack.

As FIG. 7 also shows, the various modules may be connected or stacked to form a compact modular embedded device with the desired feature set. Note that the physical connectors that join the modules also preferably extend the bus through the various modules, i.e., vertically through the stack. Note that in the embodiment shown, the power module is attached under the base or processor module, e.g., to facilitate the addition of a battery pack to the stack as a power source. In other embodiments, power may be provided through other means, including, for example, an A/C adaptor or power supply, photo-voltaic cells (i.e., solar array), fuel cells, wireless power transmission, and so forth. Further details regarding exemplary embodiments of the modules are provided below.

Figure 8:
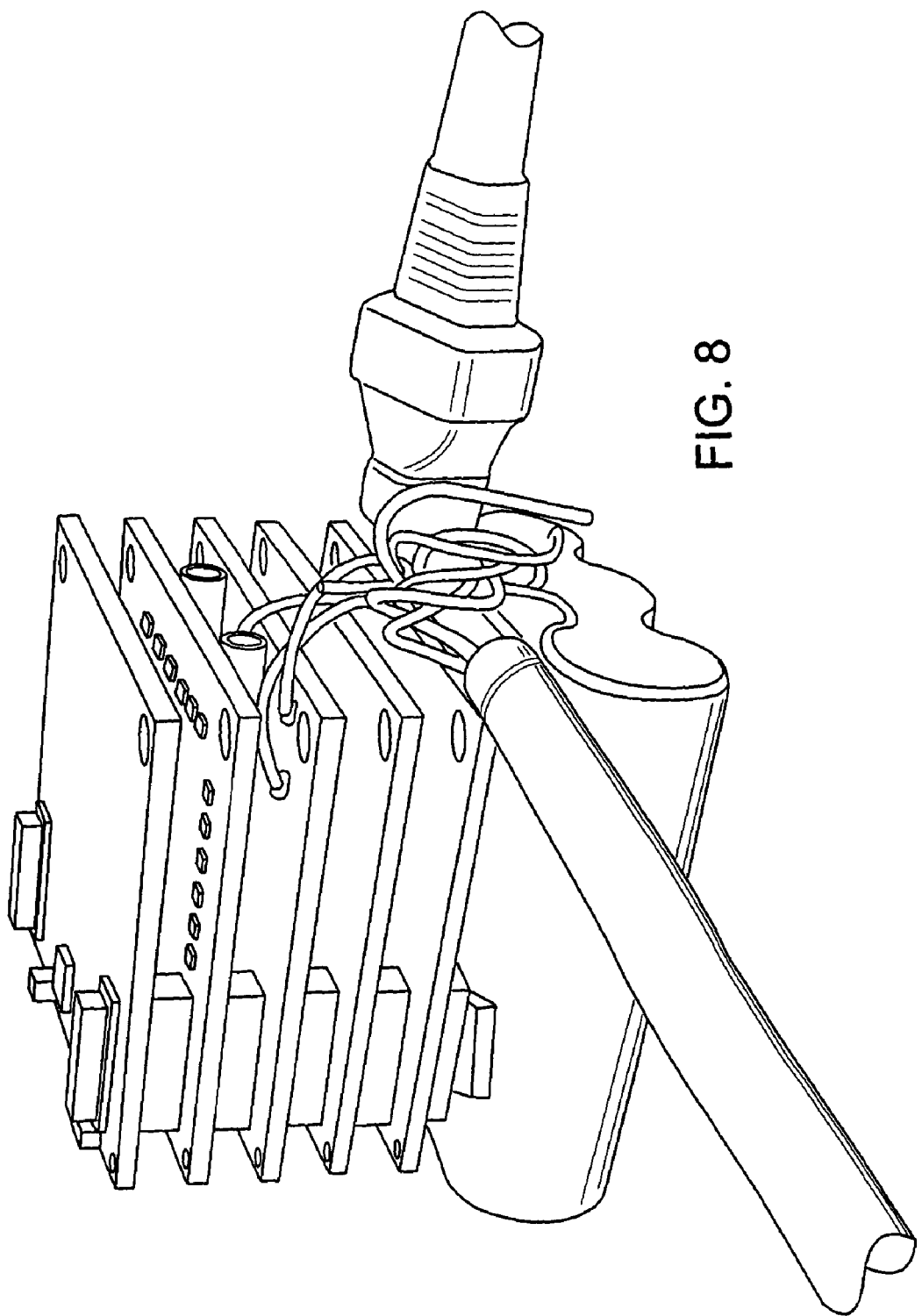
FIGS. 8 and 9 illustrate examples of a compact modular embedded device, according to one embodiment.
Figure 9:
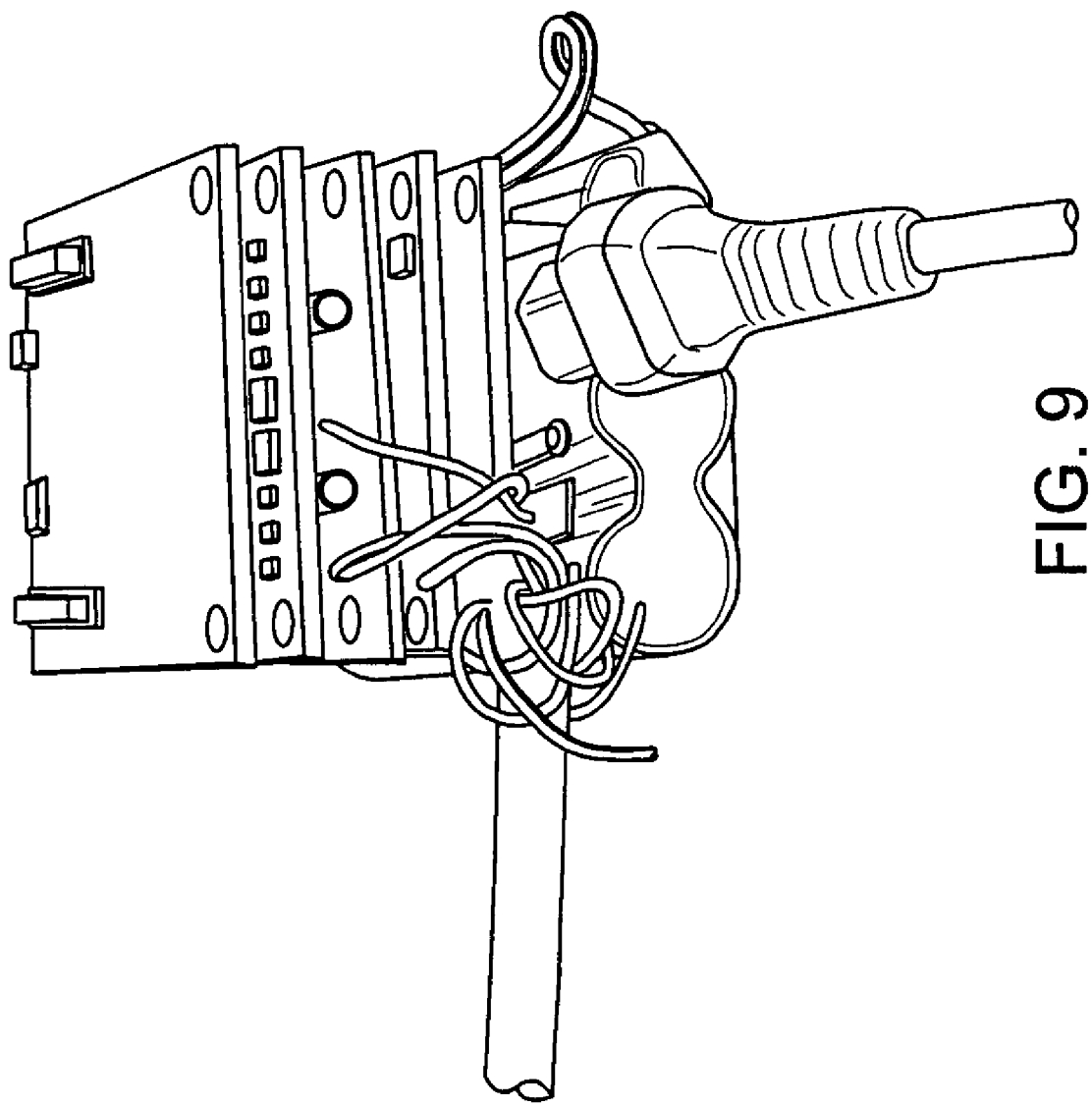

FIGS. 8 and 9—Examples of a Compact Modular Embedded Device

FIGS. 8 and 9 illustrate example embodiments of a compact modular embedded device. As FIG. 8 shows, in this embodiment, a 5-module stack is powered by a battery pack, located on the bottom of the stack.

FIG. 9 illustrates the compact modular embedded device of FIG. 8, where the size of the device is indicated by the human hand also shown. As FIG. 9 also shows, although the battery pack is included, a connector is also provided for coupling to an external power supply, e.g., an A/C adaptor (not shown), e.g., via the cable at the bottom of the figure, for primary power, charging the batteries, etc.

In one embodiment, the compact modular embedded device may also include a small form factor chassis or enclosure for protection of the device components. For example, in one embodiment, the chassis may comprise a square "tube" into which the various modules may be stacked, and where the tube is just large enough to accommodate the device modules, although other types of chassis or enclosures are also contemplated.

FIGS. 10-18—Example Application: Compact Sensor Interface

One exemplary application for compact modular embedded devices relates to sensors, e.g., remote sensing. In other words, in one embodiment, the compact modular embedded device may comprise a compact sensor interface. The compact sensor interface may include the base or processor module mentioned above, a power module, and various other extension modules, including at least one module that operates to receive data from a sensor. In one embodiment, one or more of the modules may include sensors, e.g., thermometers, motion detectors, chemical "sniffers", accelerometers, etc., and so the compact sensor interface may comprise a smart sensor.

Definition

In one embodiment, the modular compact sensor interface is a sensing/control/automation device designed to be low-cost, low-power, small form-factor, modular design for data acquisition, analysis, and transmission, self-contained, substantially maintenance-free, and useful in any place that requires embedded intelligence.

FIGS. 10-18, described below, illustrate embodiments of a compact sensor interface based on the compact modular embedded device described above. It should be noted that although some of the features described below apply specifically to embodiments of the compact sensor interface, some of the features or aspects described may also apply to various embodiments of compact modular embedded devices in general. It should be further noted that for embodiments of the compact modular embedded device directed at other applications, other features or attributes than those presented below may be desirable, and so may impose other constraints or requirements on the design. For example, in an embodiment where the compact modular embedded device is to be used in an aquatic environment, the device may be enclosed in a water-tight chassis or enclosure.

In one embodiment, the primary mode of operation for the compact sensor interface may not be to manage the flow of information from place to place, or to perform large amounts of processing, but rather to sleep most of the time, accept a wake-up command, acquire data/analyze/respond, and then go back to sleep mode.

Sensor Interface Characteristics

In a preferred embodiment, requirements that shape the design of a modular compact sensor interface may include:

Small physical size and low power consumption: At any point in technological evolution, size and power generally constrain the processing, storage, and interconnect capability of the basic device, and so reducing the size and power required for a given capability are typically driving factors in the hardware design. At a system level, these capabilities may be limited and scarce, and so preferred solutions may be austere and efficient. Additionally, modular hardware generally requires modular power selection, i.e., the possibility of selecting the right power supply board that is suitable for the desired hardware configuration and application requirements.

Modularity, extensibility, diversity in design and usage: In one embodiment, the moment a sensor interface is attached to a certain sensor, it may be desirable that the sensor interface be application specific, rather than general purpose, and carry only the hardware support actually needed for that particular application. As there is a wide range of potential applications, the variation in physical devices is likely to be large. Thus, for any particular sensor, it may be desirable for the user or developer to easily assemble only the hardware and software components required to implement or synthesize the application. Thus, the compact sensor interface may require an unusual degree of hardware and software modularity that is preferably also very efficient. A generic development and deployment environment may be needed which allows specialized applications to be constructed from a spectrum of modules without extensive or large interfaces. Moreover, in a preferred embodiment it may be possible to migrate components across the hardware/software boundary as technology evolves, and to design and implement new modules for new applications without having to redesign the processor or CPU board or the extension modules. Note that the customizability of the device allows for substantial cost savings, given that only components that are required for a given application need be included in the device.

Robust Operation: The sensor interface may be largely unattended, and expected to be operational a large fraction of the time, and so maintenance needs should be minimized.

Flexibility: The possibility of programming the processor board from a general development environment, e.g., LabVIEW, offers application flexibility in software. In order to support this design in hardware, a flexible hardware design is desired that is modular and interchangeable.

Reusability: Sensors that are used in an application may be used again in other applications by simply changing the DAQ modules and providing or creating new VIs or (sub)programs for the application.

A small, flexible modular compact sensor interface is described below that expresses some of the key characteristics of the general class of this type of device, and that represents various internal interfaces using currently available components. The compact sensor interface preferably includes a base or processor (CPU) module and extension modules, as described above with respect to the more general compact modular embedded devices. Note that the embodiment described below uses the LabVIEW graphical program system, but that other types of programs and programming systems are also contemplated. Note also that many of the attributes described for the sensor interface also apply generally to the compact modular embedded device.

In one embodiment, the compact sensor interface may include the following attributes:

Self-stacking modules with 80-pin multipurpose bus connectors (e.g., digital lines) to allow multiple modules to be added to the system without the burden of backplanes and cartridges.

Minimized size (e.g., approximately 1.5×1.5 in, 4×4 cm, etc.).

Low power consumption (typically 0.03 watts per module).

A processing unit (PU) board programmable from Graphical Programming Environment.

Detailed downloadable LV/80 BUS specifications.

LabVIEW drivers for internal interfaces such as SPI, I²C, GPIO.

Applications of the technology described herein include sensor interface, monitoring equipment, security, vehicular systems, data loggers, and low-power industrial control systems, among others.

Device Description

The modular compact sensor interface has a modular design containing two types of modules:

1) Base Module (Processor or CPU Module): e.g., a processor board (ARM) that runs a small bootloader.

2) Extension Modules: Examples of extension modules include (but are not limited to):

Power supply board;

Communication board (10/100 Ethernet, Bluetooth, ZigBee, serial, etc.);

10/100 Ethernet: may be implemented using the 8-bit parallel bus;

2×RS232: 2 serial ports/software handshaking (1 for FPP, the other for external communication). Additional UARTs may be implemented using dedicated chips connected to the parallel bus (ex. 16550 UART—this chip usually also implements hardware handshaking);

RS485: may be implemented using an external hardware controller;

CAN: may be implemented using a software/hardware controller;

DAQ boards: AI, AO, DIO, etc.;

Counter Timer: the bus may be modified to include an internal counter/timer from the processor or CPU. Additional counters/timers may be added through external hardware on dedicated modules;

Flash storage, e.g., for data logging: may be available through MMC/SD card modules; and Debug module: a module with LEDs may indicate various states of the device.

Note that other extension modules are also contemplated. In other words, extension modules may be developed to provide any functionality desired. More detailed descriptions of embodiments of some of these modules are provided below.

General Considerations

The information provided below is intended to describe exemplary embodiments of the present invention, but is not intended to limit the design, function, or architecture to any particular form or function.

In one embodiment, the maximum number of extension modules may be limited, e.g., to 6—a limitation imposed by the physical dimension and number of lines in the communication bus. It may be possible to connect several modules of the same type in an application (ex: 2 AI modules for more AI channels). Note that in other embodiments, e.g., where size is not a critical issue, more (than 6) extension modules may be allowed.

Each module may contain I/C (identification/configuration) circuitry (EEPROM+I/O port) that may be accessed by the processor module or board (e.g., the CPU card) via an I²C configuration bus. In one embodiment, module I/C circuitry may store module information (e.g., type of module, parameters, e.g., calibration for AI, etc.).

In one embodiment, module circuitry may be controlled via an I/O port. For example, the user may be able to plug several modules together, use high level (LabVIEW) tools on the host to auto detect, and test functionality without having to write an application. In one embodiment, programs, e.g., LabVIEW VIs, may be provided for module auto detection and configuration, so the user may determine what types of modules are connected and their slots/levels. For example, the detection sequence of VIs may return the following information:

slot 0—power module battery 700 mA LiMH (reserved address: 1)

slot 1—CPU module, processor AT91FR40162, (reserved address: 0)

slot 2—ADC/DAC module . . .

slot 3—ADC/DAC module . . .

. . .

slot 5—Bluetooth module . . .

slot 6—Debug module . . . (reserved address: 2)

In one embodiment, the program deployed to the base module may include an auto-detect portion, executable to detect the one or more extension modules when coupled to the base module. In other words, when the program is executed, the extension modules connected to the base module may be detected automatically by the program. The auto-detect process or portion of the program may determine the respective locations of the extension modules in the stack for correct execution of the program.

Module Descriptions

Figure 10:
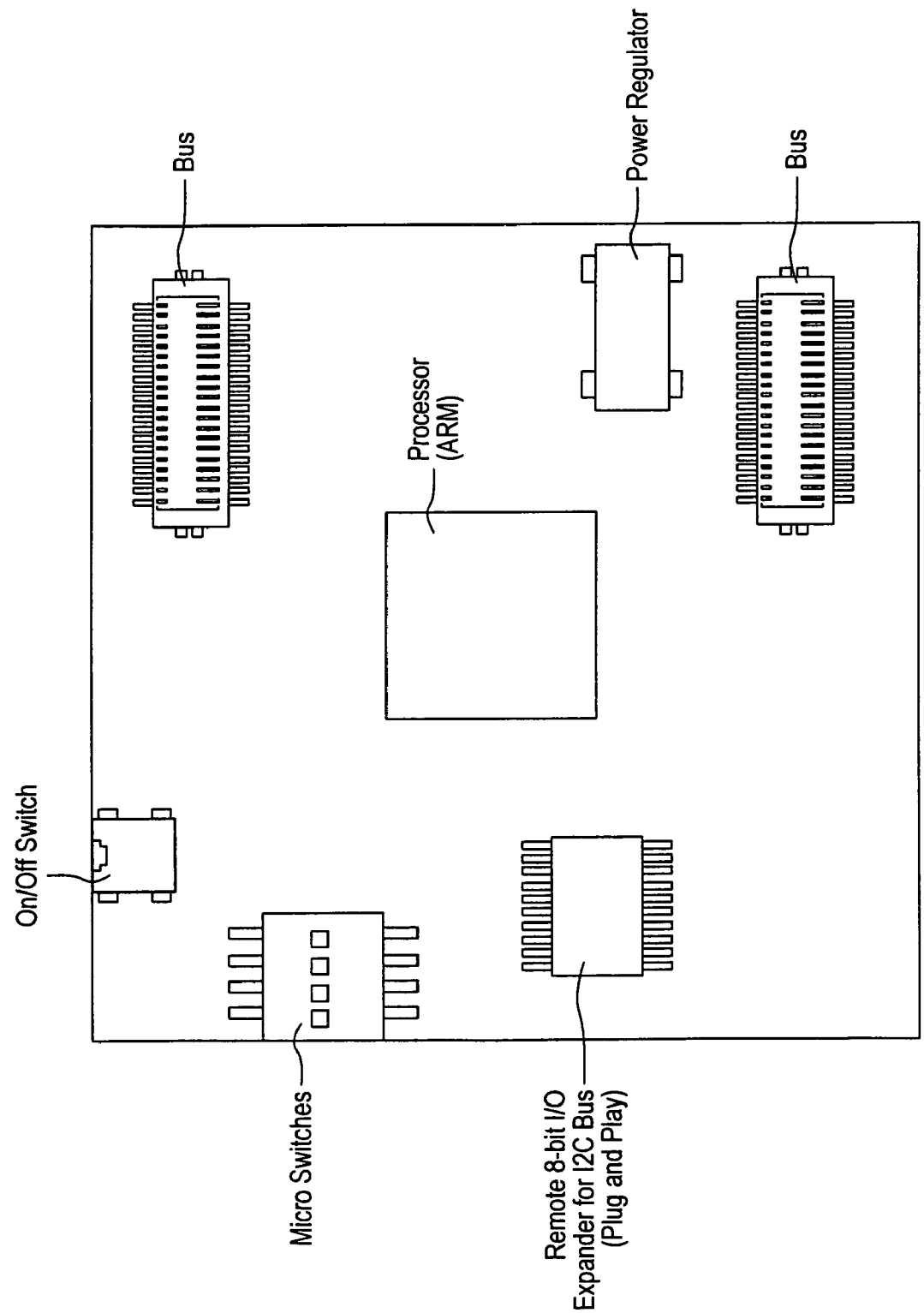
FIG. 10 illustrates one embodiment of a processor module.
Figure 11:
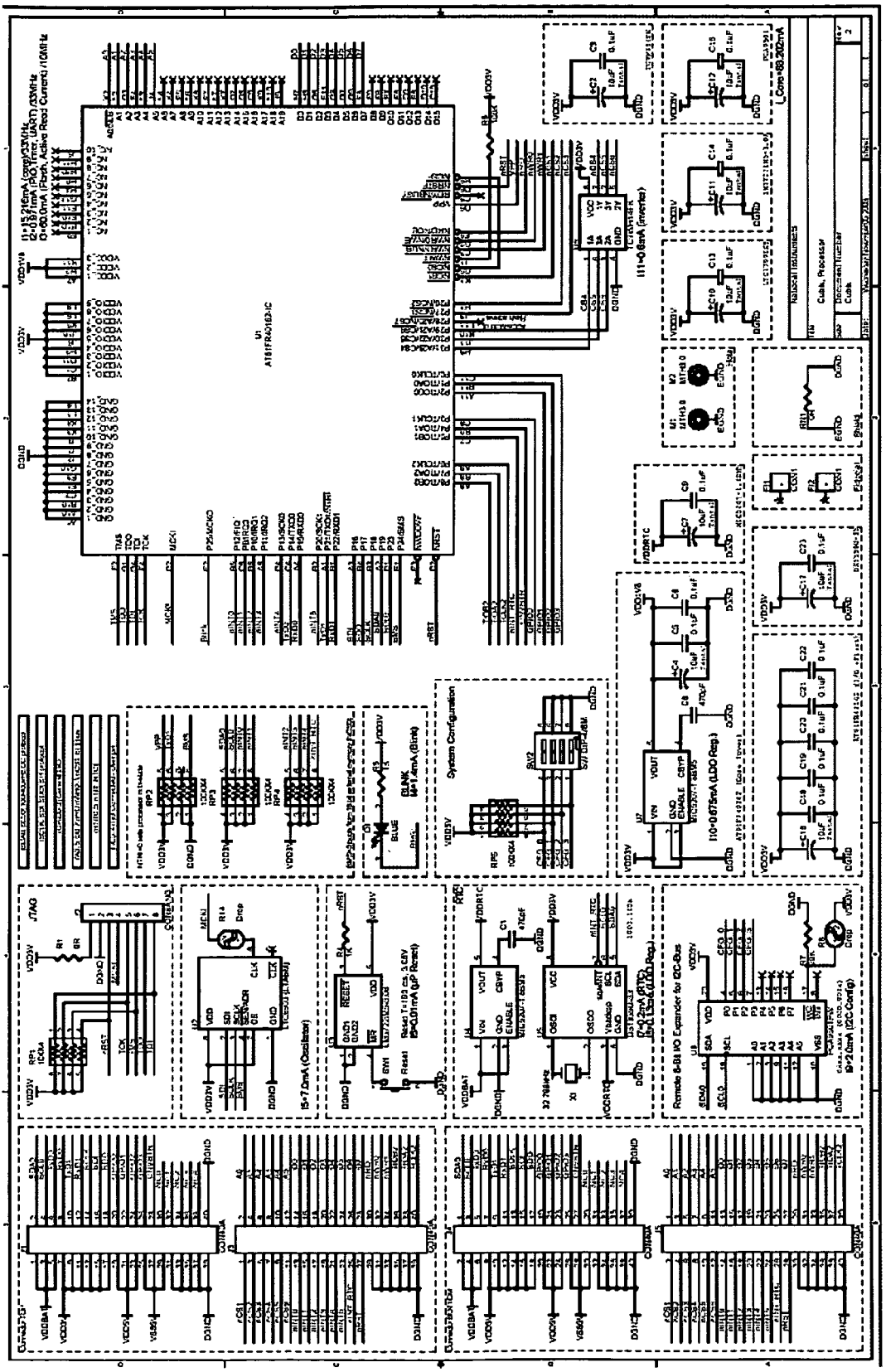
FIG. 11 illustrates a schematic diagram of the processor module of FIG. 10, according to one embodiment.

FIGS. 10 and 11—Processor (CPU) Module

The processor module provides the CPU of the module stack, and is preferably operable to control the stack, implementing communication and control functions for stack modules, e.g., moving data between stack modules. The processor module also preferably serves as the base module for the device, and so is also referred to as the base module. The processor module is preferably programmable, e.g., from LabVIEW Host, via wired and/or wireless communication. As mentioned above, the processor module also preferably is capable of storing and booting-up running the previously stored program, e.g., LabVIEW VI (graphical program).

FIG. 10 illustrates one embodiment of the processor module. FIG. 11 provides a schematic diagram of the processor module of FIG. 10. As FIG. 10 shows, the processor module includes a processor, which in this embodiment is an Atmel ARM processor (ARM7 type), specifically, the AT91FR40162, described in more detail below. As FIG. 10 also shows, various other components on the processor module include a power regulator or transformer, e.g., a 32C31 power regulator, that transforms received power to the correct voltage for the processor, e.g., 3V down to 1.8V, a remote 8-bit I/O Expander for I²C bus (for "Plug and Play" functionality regarding expansion modules), e.g., a PCA 9501, a bus, here shown implemented with two connectors, an on/off switch, and a 4-position switch for configuring the module, e.g., for specifying whether to auto-run the last loaded program upon boot-up, whether to wait for further programming, and so forth. The processor module may also include a real time clock (RTC) with external crystal at 32.768 Khz, a JTAG for factory programming, an EEPROM for module addressing and configuration, reset circuitry, bus connectors, two on each side, and a power LED for power ON/OFF notification. In other embodiments, the clock may be embedded on the processor itself.

The processor module size is preferably approximately 4 cm×4 cm, and power consumption for a LV VI running continuously is 100 mA with processor running at 33 MHz, or 50 mA with the processor running at 10 MHz. Note that other form factors and power usages are also contemplated.

In this embodiment, the processor includes 2 MB of internal flash program memory and 256 KB of data SRAM memory, connected to the real time clock and an oscillator with programmable frequencies between approximately 300 KHz and approximately 68 MHz. The flash memory shown operates at 10 MHz, and facilitates execution of programs and VIs directly from flash, resulting in approximately 33% lower CPU power consumption, but with a performance degradation of approximately 42.5%. Better performance may be obtained when some of the more frequently used functions (e.g., an FIR that is called again and again in a loop) are executed from internal RAM, with a performance increase of almost 50% and 40% less power consumption. However, in this embodiment, the amount of internal RAM is limited to roughly 64 Kbytes for applications, and so only a few functions may be able to run from RAM, e.g., the critical/frequently used functions.

In this embodiment, processor frequencies may be generated by the oscillator, which, as noted above, may produce frequencies between approximately 300 KHz, and approximately 68 MHz, where the maximum frequency is 68 MHz.

In a preferred embodiment, the processor module (i.e., the base module) includes a plurality of digital lines which may be configured or specified to provide various resources for the device.

For example, in one embodiment, the processor module may include one or more counters/timers which may be exported to the bus for use by other modules. For example, in one embodiment, the processor module may include three 16-bit counters/timers, each comprising three (digital) lines exposed to the bus, e.g., counter0: GPIO1, GPIO2, and GPIO3 lines (where GP refers to "general purpose"), counter1: TIOA1, TIOB1, and TCLK1 lines, and counter2: TIOA2, TIOB2, and TCLK2 lines. In a preferred embodiment, counter0 and counter2 are for use by the user, e.g., via breadboard modules, described below, and counter2 is used by an MIO module, also described below. It should be noted, however, than if an MIO module is not included, or doesn't require the use of counter2, that counter2 may also be accessed or used by other modules or by the user via breadboard modules.

In preferred embodiments, embodiment, the processor (base) module may include one or more digital lines that comprise or correspond to digital lines or pins of the processor. For example, the ARM7 processor described herein provides 80 digital lines for use. As is well known, different processors may have various digital lines which are define in hardware and/or various digital lines which are software-defined. However, hardware-defined digital lines, for example, maybe defined as RS232 port, SPI port, etc., and so those lines are reserved by the processor only for RS232, SPI, etc., and cannot be used with other communication protocols. In contrast, software-defined digital lines included in preferred embodiments of the present invention may be software-defined to implement whatever buses and protocols are needed.

Thus, software-defined digital lines included in preferred embodiments of the present invention may be software-defined to implement whatever buses and protocols are needed in accordance with the program and extension modules used in the application, such as, for example, one or more of SPI, I²C, CPIO, and Parallel buses and protocols, among others.

For example, the program deployed to the device, e.g., the converted program, may include configuration information specifying the one or more communication buses, and the base module may execute the (converted) program to configure at least one of the one or more digital lines to implement the one or more communication buses based on the configuration information. In one embodiment, this configuration information may be in the form of drivers stored on the host computer, where one or more of the drivers may be linked into the executable during creation of the executable.

For example, in one embodiment, a driver program, installed in the host computer, contains drivers that define communication protocols on the processor lines, thus, many drivers defining many different protocols may be stored on the host computer. While all of these drivers may be available for use, generally, only a subset is included in the executable (or the converted program) as required based on the particular application. Generally, the developer or user writes or otherwise creates the program (e.g., on the host computer or elsewhere), which is then compiled and linked with the necessary drivers, where some of the drivers are executable to configure the processor lines for different buses used by the extension boards that are utilized by the application. Thus, all of the software-specified buses and protocols required by the device/application are preferably included in the compiled, linked and created executable that is then downloaded onto the target device. In one embodiment, the resulting executable includes an Init section where the various specified bus drivers run and configure the digital lines of the processor for the communication buses required by the application. Thus, only those drivers/protocols/buses that are needed are deployed and used.

Note that for a given application, once the processor lines are allocated to different buses, e.g., depending upon the program and the extension modules, the lines may not generally be changed, since the extension modules (and program) will rely on these specifications to operate. For example, if the extension modules connect to processor lines SCL0, SDA0, and expect these lines to drive the I²C bus, then SCL0 and SDA0 should remain so specified for I²C.

Thus, the ability to define or configure digital lines via software provides substantial flexibility regarding inter- and extra-module communications of and with the device.

Software

The ARM7 internal 2M Flash memory location is segmented in two partitions. Partition 1 is 128 KB long, and is preferably pre-loaded with programs that provide infrastructure functionality for the module, e.g., the bootloader. Partition 2 is 1.6 MB long, and is preferably available for application (VI) download and storage. Note that in preferred embodiments, the processor module can store the "VI executable", if desired—there is a switch that may be manually set for this task—and therefore can boot up with the executable. The boot-up sequence for this embodiment takes less than 1 sec.

The ARM7 internal 256 KB RAM buffer may be used for program data. Note that in some embodiments, data storage (e.g., for datalogging) may be directed to an MMC module and not CPU Flash.

The modules described below are example modules that may operate in conjunction with the base module to perform respective functions, e.g., specified by a program, e.g., a graphical program. Note that the base module is required for operation of the extension modules, and thus functions as a master module in the system.

Figure 12:
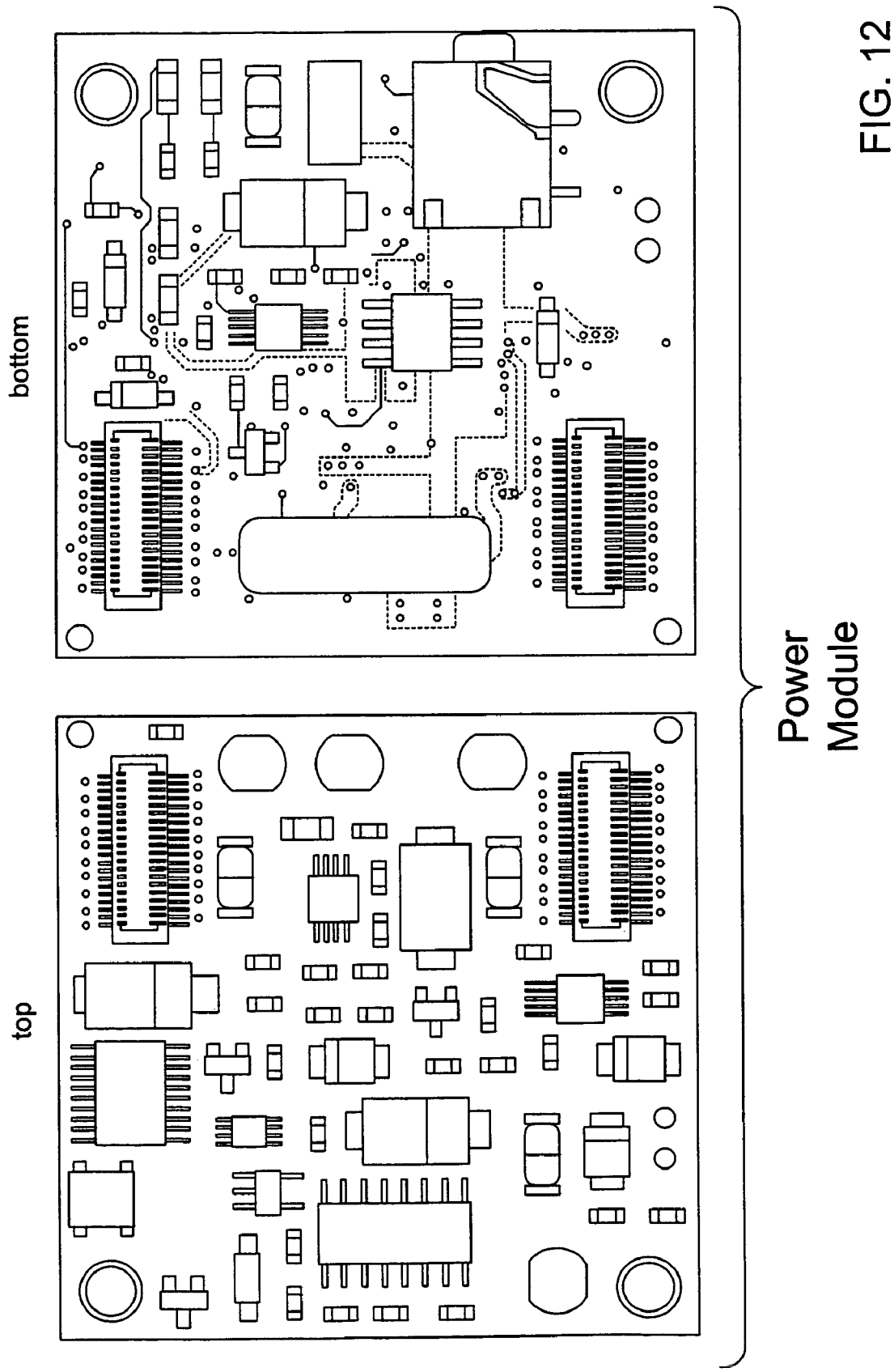
FIG. 12 illustrates one embodiment of a power module.

FIG. 12—Power Module

FIG. 12 illustrates a power module, according to one embodiment. The inclusion of a separate module for power supply allows the possibility for users to build their own power supplies for their own applications. Thus, the power module concept preferably covers a broad spectrum of power needs, e.g., an industrial application that uses a 25V power source, a sensor application that uses a battery that is recharged from solar cells, etc.

In one embodiment, the power module may comprise a battery power module that contains a charger and generates 3.0V and +/−5.0V to bus power lines. For example, in the embodiment of FIG. 12, the power module takes power from a 3.6V battery and generates (via a charger) power levels of 3.0V and +/−5V on some of the bus lines. In one embodiment, schematics and Gerber files may be made available to OEMs for reference. Note that in the present embodiment, the power module is the only board with two faces or functional surface, e.g., with a top and a bottom surface with components.

Module Stack Power Consumption

Power consumption with the processor executing an application program (e.g., a LabVIEW VI) continuously but with no wireless transmission is approximately 85 mA with the processor running at 33 MHz, and 35 mA with processor running at 10 MHz.

The following indicates typical power consumption versus processor speed:

|  | 303 kHz | 3.03 MHz | 30.3 MHz | 68 MHz |
|---|---|---|---|---|
| Power + Processor: | 8.6 mA | 11.0 mA | 35.5 mA | 57.3 mA |
| Full stack (8 modules): | 44.3 mA | 47.0 mA | 58.7 mA | 92.8 mA |

It is estimated that wireless transmission may add 60 mA in Tx and 30 mA in Rx, and so in an application that performs continuous data acquisition with wireless Bluetooth transmission, a set of of-the-shelf rechargeable 3.6V/1200 mAh batteries may last for approximately 8 hours with the processor running at 33 mHz, and 12 hours with the processor running at 10 MHz. In one embodiment, modules may be provided that use 110V. However, due to size constraints this may only be possible if an external adapter from 110V to 4.5V-7.5V, 500 mA is used.

Figure 13A:
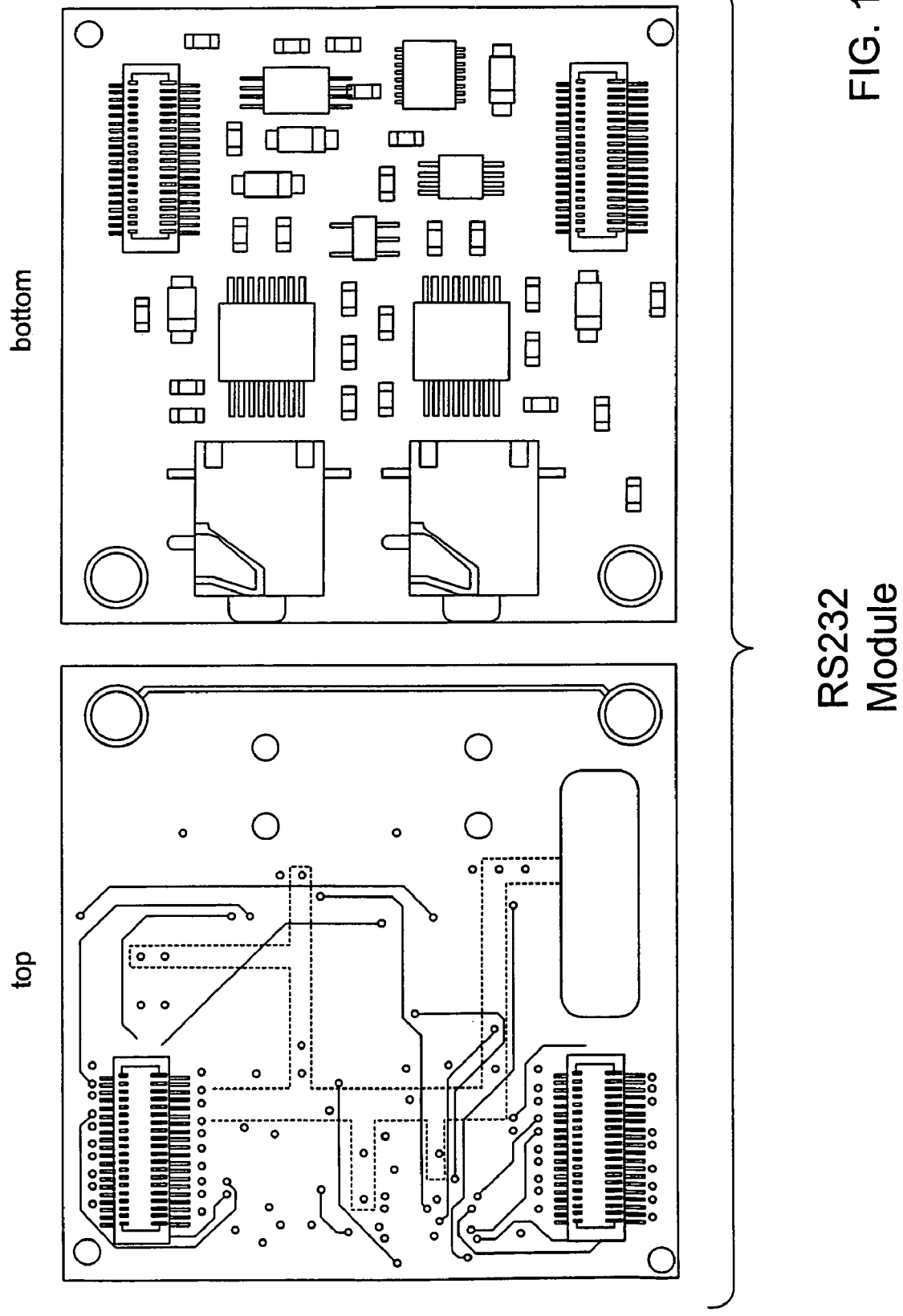
FIGS. 13A and 13B illustrate one embodiment of an RS232 module and serial port, respectively.
Figure 13B:
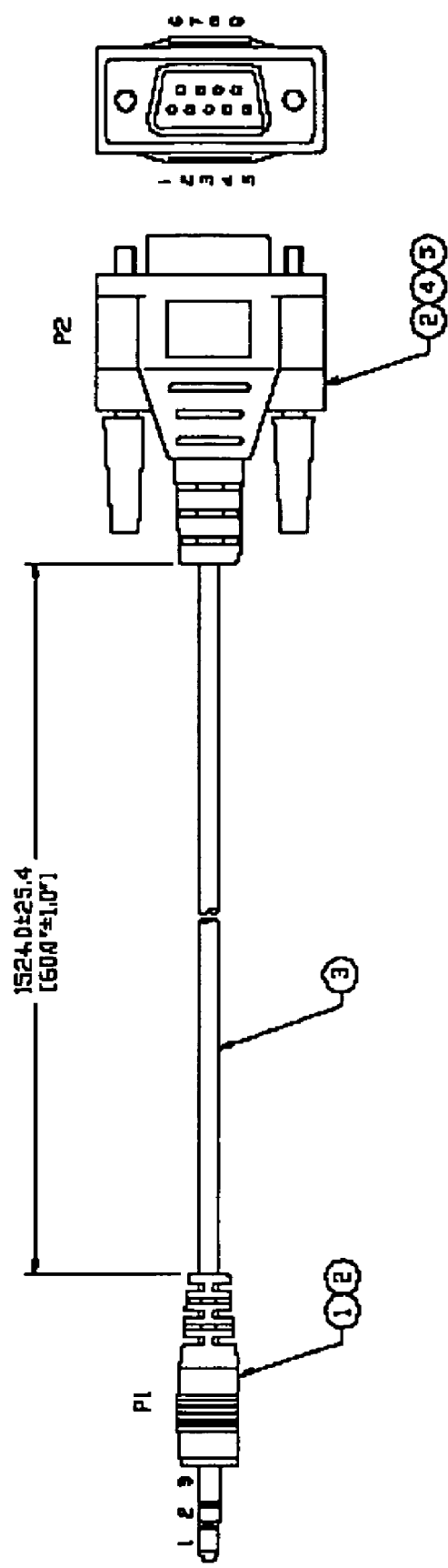

FIGS. 13A and 13B—RS232 Module

In many applications, serial communications functionality may be desirable. In one embodiment, an RS232 module may be included in the compact sensor interface. FIG. 13A illustrates one embodiment of an RS232 module that provides two RS-232 serial ports with software handshaking for FPP (National Instrument Corporation's Front Panel Protocol with Host Computer), or/and communication with external serial devices.

Note that additional UARTs may be implemented by using dedicated chips connected to the parallel bus on the device, such as, for example, a 16550 UART chip, which usually also implements hardware handshaking.

In one embodiment, the RS232 module may be used to program modules in the stack. Note that once the modules have been programmed, if the application does not implement serial communication with an external device, the RS232 board may not be necessary in the field, and so may be omitted.

In one embodiment, the RS232 board exposes two serial ports populated with a 2.5 mm stereo plug on the compact sensor interface (stack) side, and a DB9 female connector on the device side. FIG. 13B illustrates one embodiment of such a serial port. It should be noted, however, that the serial port hardware shown is meant to be exemplary only, and is not intended to limit the serial port to any particular form or function.

In other embodiments, the serial communications module may use or implement other protocols. For example, in one embodiment, an RS485 module may be implemented, e.g., using a hardware controller component. As another example, a CAN module may be implemented, e.g., using a software/hardware controller.

FIG. 14—MIO Module

Figure 14:
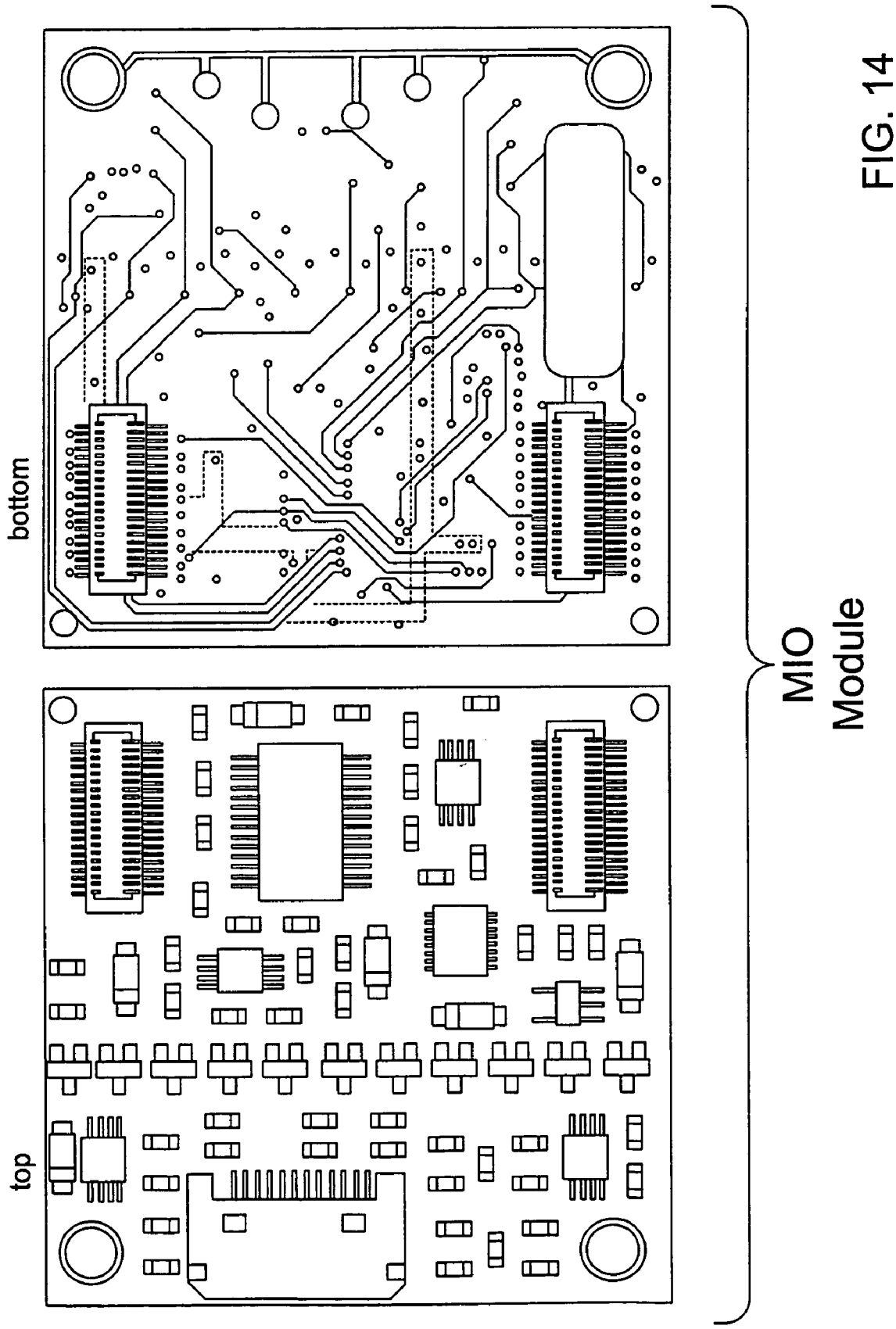
FIG. 14 illustrates one embodiment of a multi-function I/O module.

In one embodiment, a multi-function I/O (MIO) module may be included in the compact sensor interface, where the MIO module may operate to acquire data, e.g., may perform a measurement operation or task. FIG. 14 illustrates one embodiment of an MIO module. In this embodiment, the MIO module includes an analog to digital converter (ADC), e.g., a 14 bit ADS7871, with 4 channels specified as single-ended, unipolar 0 . . . . Vref, with Vref software selectable between 1.15V, 2.048V, and 2.5V, and with 2 channels specified as differential bipolar +/−Vref, with Vref software selectable between 1.15V, 2.048V, and 2.5V. Although this ADC is able to perform at frequencies up to 48 KHz, in some embodiments, bus limitations may limit the scan rate to approximately 10 ksp/sec.

In one embodiment, the ADC may be externally triggered, e.g., from a start trigger and/or a scan clock. For example, in one embodiment, a trigger line may be specified in, or added to, the bus, e.g., a line from one of CPU timers that may act as a common start trigger/scan clock line for all MIO modules plugged in the stack. This line may also be linked to an external trigger signal as desired.

As mentioned above, the processor (e.g., the ARM7 processor described above) may include 256 Kb RAM. In one embodiment, this RAM may provide a temporary buffer for storing data, e.g., 1000-2000 data points, acquired by the MIO module.

In one embodiment, the MIO module may also include a digital to analog converter (DAC), e.g., a 16-bit DAC8532, with 2 channels at +/−2.5V with a maximum frequency of 93 kHz. Of course, in other embodiments, other DACs may be used as desired.

In the embodiment shown, the MIO module also includes 4 DIO lines (e.g., CMOS with Low=0V, High=3.3V, TTL with Low=0V, High=5V, etc.). In one embodiment, input/output software for the MIO module may be configurable, e.g., via the serial module described above.

In one embodiment, the MIO module may include one or more counters/timers, e.g., for use in data acquisition or generation. Alternatively, in another embodiment, the MIO module may not have any counters/timers on-board, but may use a counter from another module. For example, in a preferred embodiment, the MIO module may use one of the three counters provided by the processor, e.g., counter2, accessing the counter via the bus, described below.

As described above with respect to the processor module, each counter/timer from the processor preferably includes three lines, e.g., TIOA2, TIOB2, and TCLK2, which may be used by the MIO module with TIOA Capture Mode comprising general purpose input, and Waveform Mode comprising general purpose output; with TIOB Capture Mode comprising general purpose input, and Waveform Mode comprising general purpose input/output, and TCLK comprising external clock input. The three lines may form 16-bit timer counter channel that can be programmed to perform a wide range of functions, including, for example, frequency measurement, event counting, interval measurement, pulse generation, delay timing and pulse width modulation, among others.

FIG. 15—MMC Module

Figure 15:
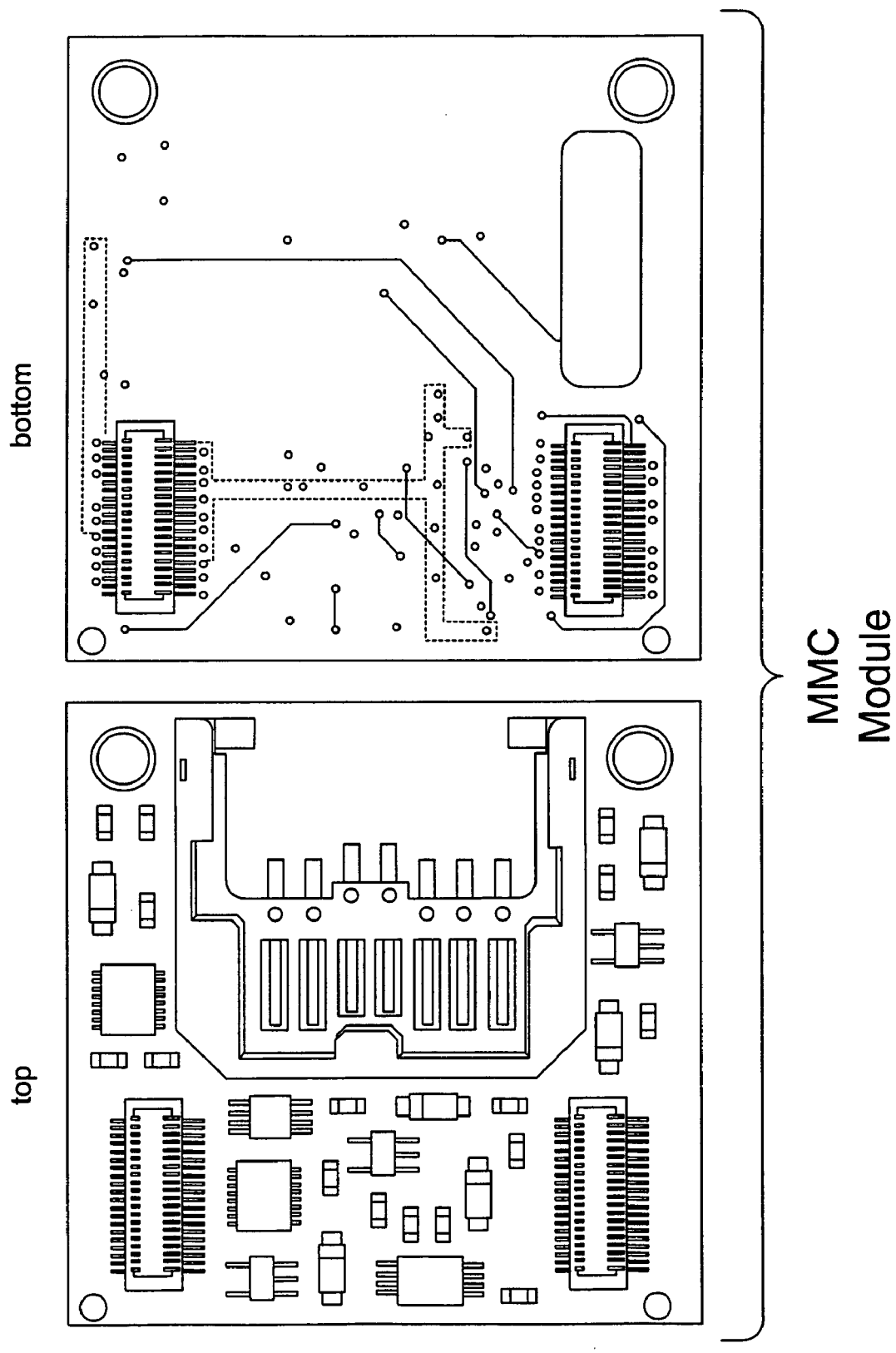
FIG. 15 illustrates one embodiment of a MultiMedia Card module.

In one embodiment, the compact sensor interface may include a MultiMedia Card (MMC) module for performing file storage and retrieval operations for the device. For example, in one embodiment, the MMC module may include an MMC connector and circuitry to control an MMC off-the-shelf card. FIG. 15 illustrates an MMC module, according to one embodiment. Of course, other formats and protocols are also contemplated, such as, for example, an SD-card module, a CF-card module for data storage, and so forth. MMC cards are generally available in sizes of 64 MB, 128 MB, 256 MB. Note that in this embodiment, the MMC module does not contain the MMC card itself, and so a user may need to provide the MMC card.

Figure 16:
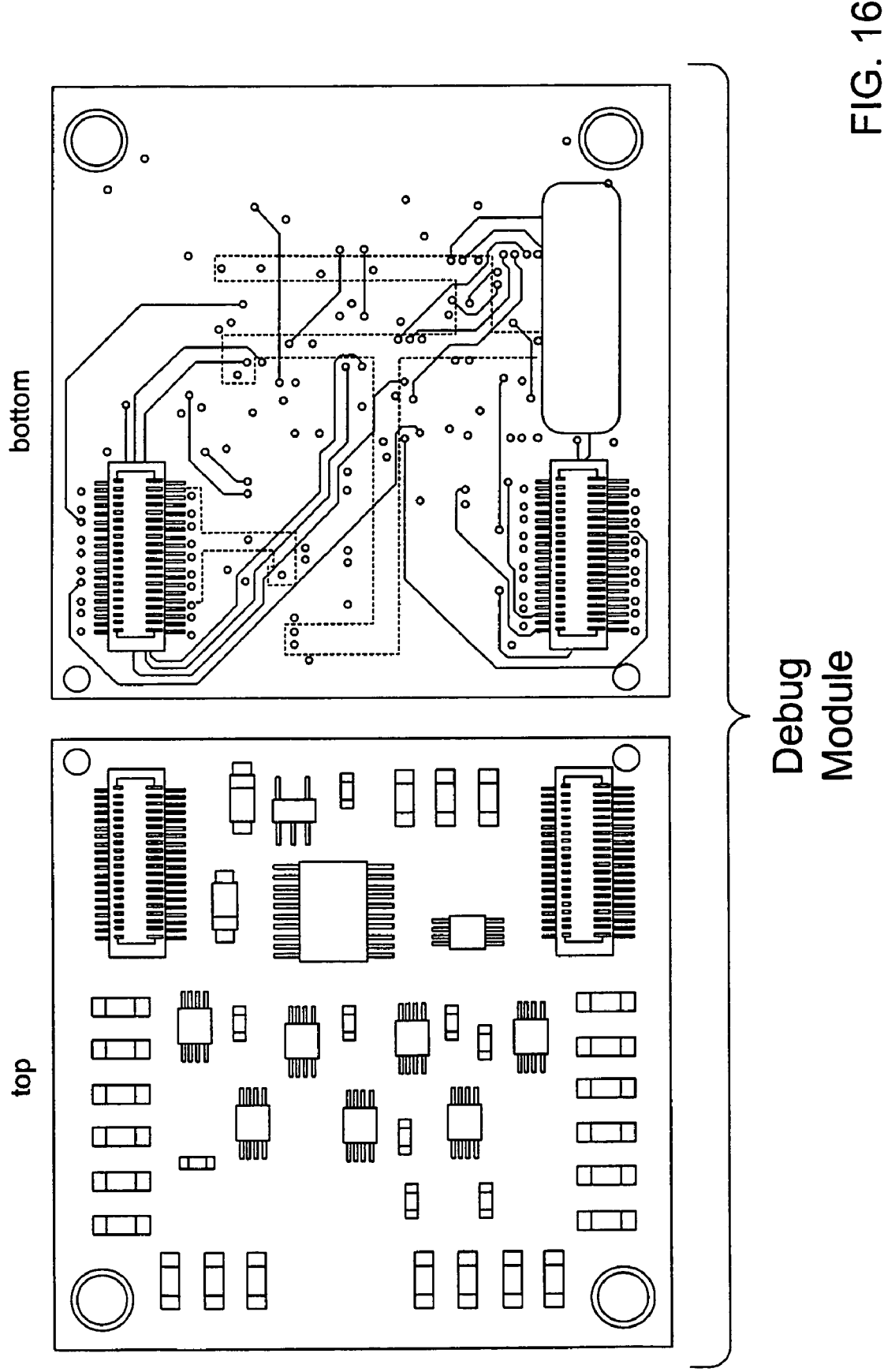
FIG. 16 illustrates one embodiment of a debug module.

FIG. 16—Debug Module

In one embodiment, the compact sensor interface may include a debug module to facilitate development of software and/or hardware for the device. FIG. 16 illustrates one embodiment of a debug module. In this embodiment, the debug module includes LEDs on all the bus lines (described below) for debugging communication, and so may be useful for debugging bus communications or any bus digital line manipulations.

In one embodiment, the debug module may include a UART0, a UART1 (ON/OFF via switch), and I/C circuitry (EEPROM+I/O port), as are well known in the art. In one embodiment, the debug module may be a programming/debug module, where the module also supports program development for the device.

Figure 17:
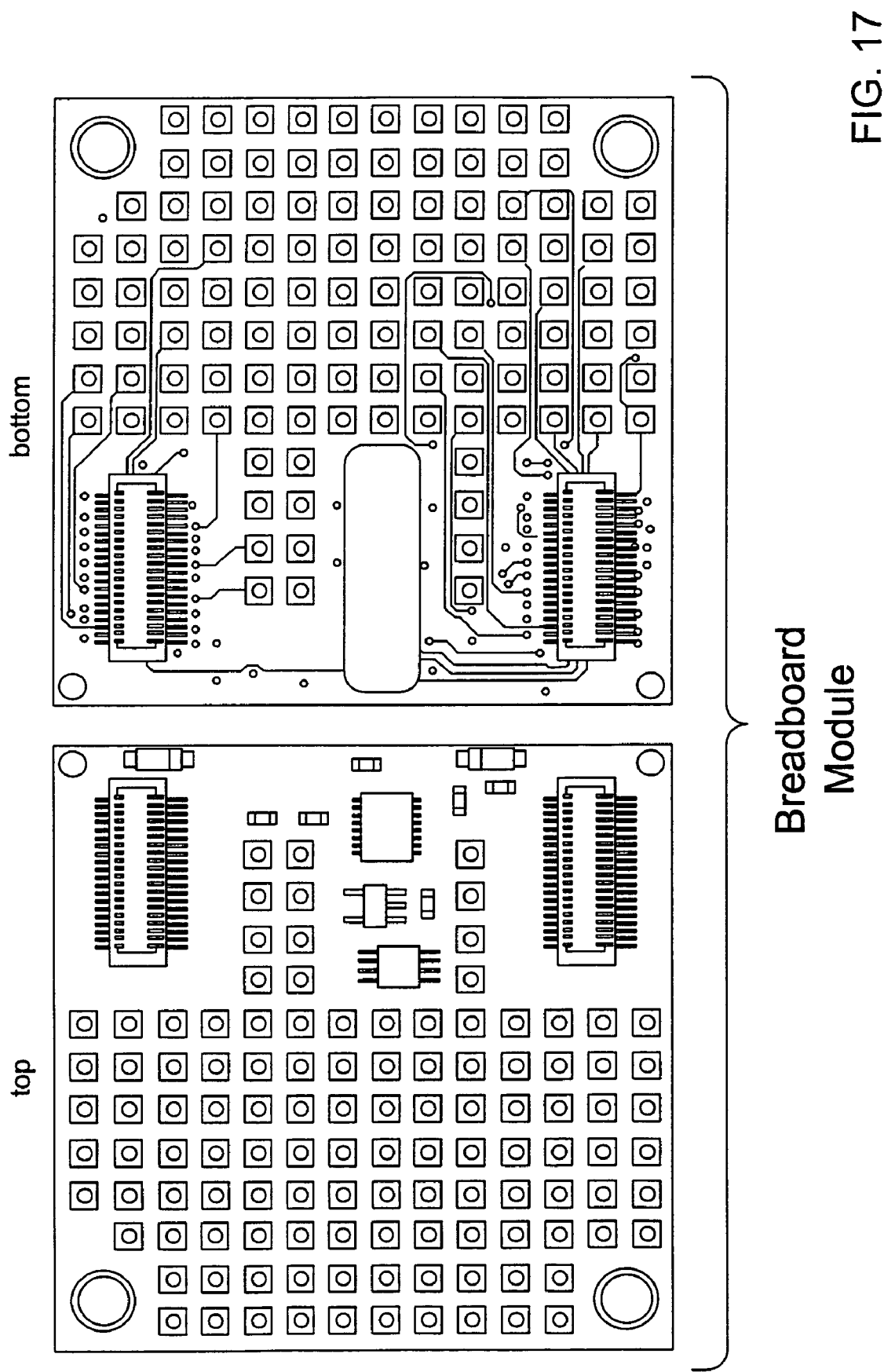
FIG. 17 illustrates one embodiment of a breadboard module.

FIG. 17—Breadboard Module

In one embodiment, the compact sensor interface may include a breadboard module for facilitating development of the device, one embodiment of which is presented in FIG. 17. In a preferred embodiment, the breadboard module may be equipped with a bus interface and a breadboard area for prototyping. The breadboard module may be used for prototyping custom modules, implementing auxiliary functionality needed by other modules, and so forth. As FIG. 17 shows, the breadboard area is effectively a blank board which the developer or user may use to implement any features desired. For example, as noted above, the MIO module may access timer/counter lines on the bus via the breadboard module. Custom modules may be prototyped by adding various components to the breadboard (with respective connections to the bus), e.g., and modified in an iterative fashion until the desired functionality is implemented. The debug module described above may be particularly useful in this process.

Wireless Module

In many applications, e.g., remote sensor applications, wireless communication functionality may be useful or necessary, and so in one embodiment, a wireless module may be included in the compact sensor interface. In one embodiment, the wireless module may comprise a Bluetooth module that incorporates the baseband and it is connected via UART to the processor module. Other implementations may contain radios such as ZigBee, 802.11b, etc. In a preferred embodiment, I/C circuitry (EEPROM+I/O port) may also be included in the wireless module.

In one embodiment, the Bluetooth module may be a "serial cable replacement" type module that has a data throughput of 750 MB/sec and contains the RFCOM profile, allowing the radio to run an embedded stack, obviating the need to occupy the processor module with communication commands.

DIO Module

In one embodiment, a digital I/O (DIO) module may be included in the compact sensor interface for digital communication functionality. In one embodiment, the DIO module may include port 8 I/O lines controlled via $I^2C$, as well as I/C circuitry (EEPROM+I/O port), e.g., for programming the DIO lines.

Sensor Module

As mentioned above, in one embodiment, a sensor module may be included that includes one or more sensors onboard, e.g., for detecting and/or measuring phenomena such as temperature, motion, chemicals, light, sound, images (e.g., an onboard camera), etc.

Further Example Modules

Further examples of extension modules include respective modules for LCD display, Ethernet (wired and/or wireless), counter/timer, relays 60V AC/DC and isolated source, RS485, CAN, gyroscope, analog I/O, e.g., with ADC sigma-delta (type DMM), 2 IrDA, control 2 MPP motors, modem telephone line, GPS, and modem GSM, a memory module, e.g., flash, RAM, ROM, and/or Microdrive; data acquisition (DAQ); DSP (digital signal processing); audio; speaker; a modem telephone line; a Compact Flash (CF); a camera; control; and monitor interface, among others. In one embodiment, a module may include an actuator. In other words, an actuator module may be included that comprises an electro-mechanical component that may operate to perform a physical or mechanical task. Note that the modules described herein are meant to be exemplary only, and are not intended to limit the modules to any set of functions or implementations.

Note that in preferred embodiments, it should be possible to connect several modules of the same type in an application (ex: 2 AI modules for more AI channels). In another embodiment, multiple compact modular embedded devices, e.g., compact sensor interfaces, may communicate with one another to cooperatively perform a task, such as a distributed task.

Bus

As described above, the compact sensor interface preferably includes a bus for inter-module communication and power distribution. As also described above, the bus may extend vertically through the module stack, thereby coupling all of the modules in the device.

In one embodiment, the following bus lines may be defined for the device (although other lines may be defined or specified as desired):

Power/Ground Lines:
   3 lines from battery max. 100 mA—VDDBAT;
   6 lines+3V max. 300 mA—VDD3V;
   3 lines+5V max. 150 mA—VDD5V;
   3 lines−5V max. 150 mA—VSS5V; and
   11 lines GND—DGND.

Configuration/Module Selection and Interrupt Lines:
   5 lines for extension module selection—nCS0 . . . nCS4;
   5 interrupt lines (one/module)—nINT0 . . . nINT4;
   1 line CONFIG select (used in conjunction with extension module selection lines to select the config chips)—nCS_Cfg;
   1 line interrupt from configuration chips (can be used for slow interrupts detection)—nINT_Cfg; and
   1 line RTC interrupt (wake-up signal)—nINT_RTC.

Serial Bus Lines:
   2 serial ports with software handshaking—4 lines—TxD0, RxD0, TxD1, RxD1.

I²C Bus Lines:
   I²C bus common for configuration and control/data transfer to/from modules—2 lines—SCL0, SDA0 (maximum frequency of 400 Khz).

SPI Bus Lines:
   3 lines SPI—SCLK, SDI, SDO;
   In one embodiment, the user may program SPI and I²C ports directly from within LabVIEW, e.g., VIs may be provided so that the user may build modules that include a part with an SPI interface, and may write drivers for the modules entirely in LabVIEW.

Trigger/Scan Clock
   1 trigger line linked to CPU timer/counter line TIOA1—CNVSTR;
   (other external triggers can be implemented using not connected lines from bus NC0 . . . NC4).

Timer/Counter Lines:
   One or more timer/counters from the processor, each comprising 3 lines—e.g., TIOAn, TIOBn, TCLKn (or GPIO1, GPIO2, GPIO3), and where each timer/counter may be exported to the bus and accessed by a breadboard module, MIO module, etc., as described above;
   16-bit timer counter channel that can be programmed to perform a wide range of functions including frequency measurement, event counting, interval measurement, pulse generation, delay timing and pulse width modulation, etc., e.g., where the channel comprises the 3 lines for a particular timer/counter, for example, with the following modes of operation;
   TIOA Capture Mode: General purpose input/Waveform Mode: General purpose output;
   TIOB Capture Mode: General purpose input/Waveform Mode: General purpose input/output;
   TCLK External Clock Input.

Trigger/Scan Clock Lines:
   1 trigger line linked to CPU timer/counter line TIOA1-CNVSTR;

(other external triggers may be implemented using the unconnected lines from the bus NC0 . . . NC4).

Parallel Bus
   8 lines data—D0 . . . D7;
   6 lines addresses—A0 . . . A5;
   3 control lines—nRD, nWR0, nWR1; and
   3 chip select lines—nCS1P, nCS2P, nCS3P.

Other Lines
   1 line RESET from CPU module—nRST;
   2 GPIO lines—GPIO0, GPIO1;
   5 not connected (for user inter-module connections)—NC0 . . . NC4.
   Note that the above bus definition is intended to be exemplary only, and is not intended to limit the number of bus lines or their definitions to any particular number or functionality.

Figure 18:
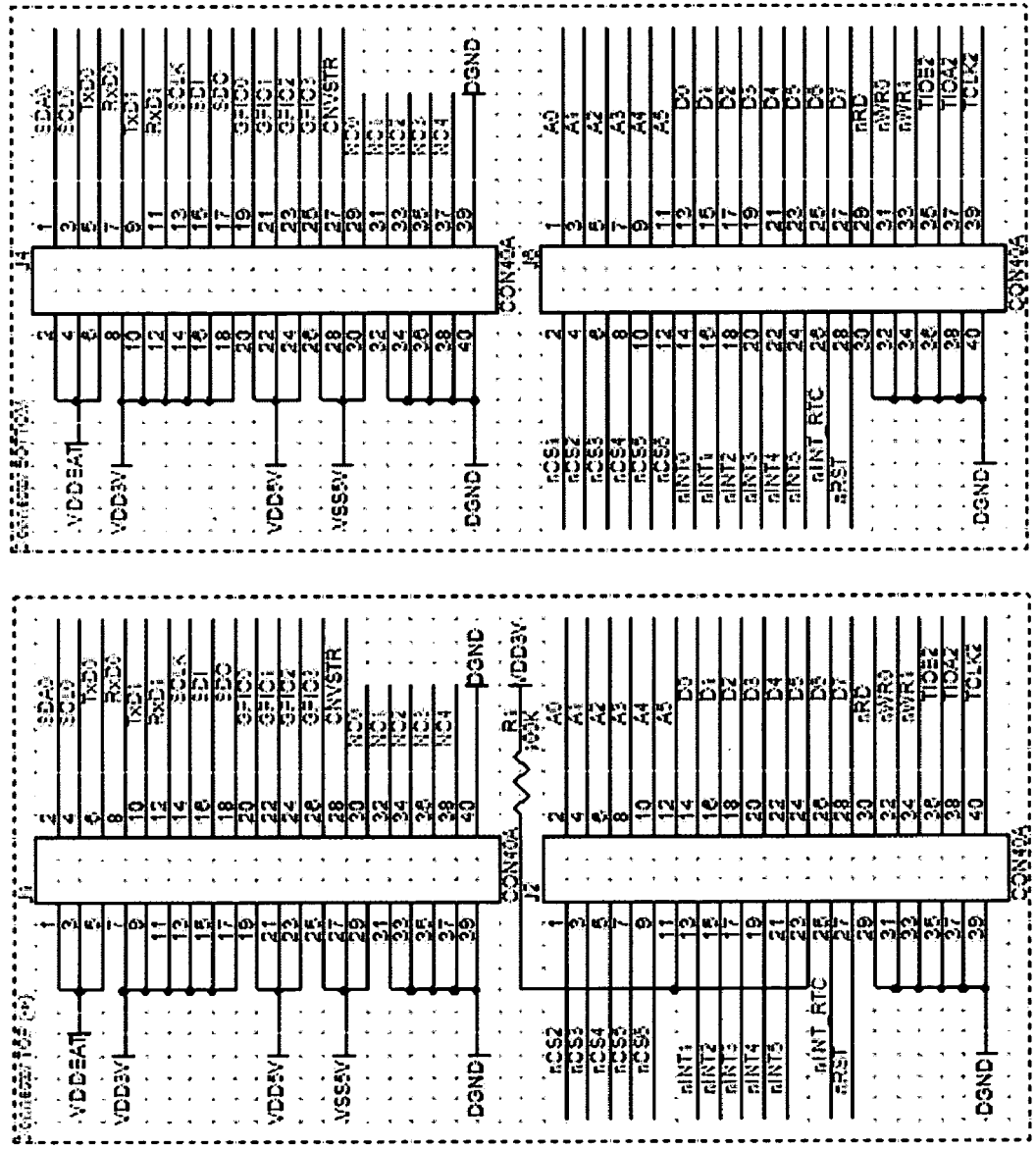
FIG. 18 illustrates a bus layout, according to one embodiment of the present invention.

FIG. 18—Bus Layout
   FIG. 18 illustrates an exemplary layout for the bus described above with reference to FIG. 17. Note that in one embodiment, any bus line may be used with the exception of chip selects (nCS1 . . . nCS6) and interrupts (nINT0 . . . nINT5). These bus lines are preferably reserved for module addressing. Chip select and interrupt lines may be shifted on the top layer of each extension module as described in the above diagram, e.g., where nCS2 becomes nCS1 . . . nCS6 is connected to VDD, NINT1 becomes nINT0 . . . nINT5 is connected to VDD.

Thus, in one embodiment, several modules may be coupled together, and a high level tool, e.g., a LabVIEW tool, on the host used to auto detect the modules and test functionality without requiring the user to write an application. For example, as noted above, programs, e.g., LabVIEW VIs, may be provided for module auto detection/configuration. These programs may be included in the user's application to determine what types of modules are connected in which slots/levels.

The above description was directed at compact sensor interface embodiment, although it should be noted that this is but one exemplary application of the compact modular embedded device described herein, and that the systems and methods described are broadly applicable to any application domain where a small device with embedded intelligence is required. Other application contemplated include, but are not limited to, inventory management and control, remote surveillance, security, automated manufacturing and control, machine vision, distributed computing, chemical synthesis and/or analysis, robotics, entertainment, and telecommunications, among others.

Deployment
   The deployment of programs onto the embedded device may be performed in a number of different ways. For example, in a preferred embodiment, a program may be deployed to the device as an executable.
   In a preferred embodiment, a user first selects a target, then creates programs or VIs in an appropriate development environment. For example, functions that are not supported by the target device may be omitted from the functions available to the programmer, i.e., the development environment may be specific to the target device. For example, the development environment may be LabVIEW Embedded Module, which is a subset of standard, i.e., "desktop", LabVIEW. Then an executable for that target is created from the programs or VIs. For example, the program or VIs may be translated into C code, and an off the shelf compiler and linker (e.g., gcc) is used to build the executable. After the executable is built it may be downloaded to the target from LabVIEW and subsequently run standalone (or debugged from LabVIEW). If the user is debugging then he/she can set breakpoints and probes, and step through the block diagram, and may also view the front panel update.
   Note that the LabVIEW Embedded Module software may be designed and implemented so as to support as wide a range of targets as possible, including, for example, the ARM7 32-bit processor described above.

Alternative Embodiment
   As noted above, in a preferred embodiment, the program is deployed to the target device as an executable. However, in an alternative embodiment, the base module of the device may store and execute a minimal execution engine, and the program may be converted to a flatfile that is deployed to the device and used to execute the program, e.g., via the execution engine.
   For example, once the program has been created, the graphical program flatfile may be generated, as described below with reference to FIG. 10. One embodiment of this is described in detail below in the section Example Process. In one embodiment, where the graphical program includes a block diagram and a user interface, only the block diagram portion may be used in generating the flatfile. The user interface may remain as code that executes on the host computer 102. Then, the flatfile may be transmitted to the target device 110, e.g., over a network (or other transmission means). In other words, the user may cause the computer system to send the flatfile 207 over the network 104 (or other communication medium) to the target device 110. The target device 110 may thus receive the flatfile 207, and a loader/linker program on the target device 110 may construct the combined program 202A based on the received flatfile 207. Further details of one embodiment of this process are provided below in the Dynamic Linking section and the Example Process section. Finally, the target device 110, e.g., the minimal execution system 205 on the target device 110, may execute the combined program 202A.

In the embodiments that use a flatfile, described in detail below, it is noted that only necessary acquisition and processing code is packaged and downloaded onto the embedded device (using the flatfile). An approach for generating this minimized code is described below with reference to FIGS. 19A-25C.

Figure 19A:
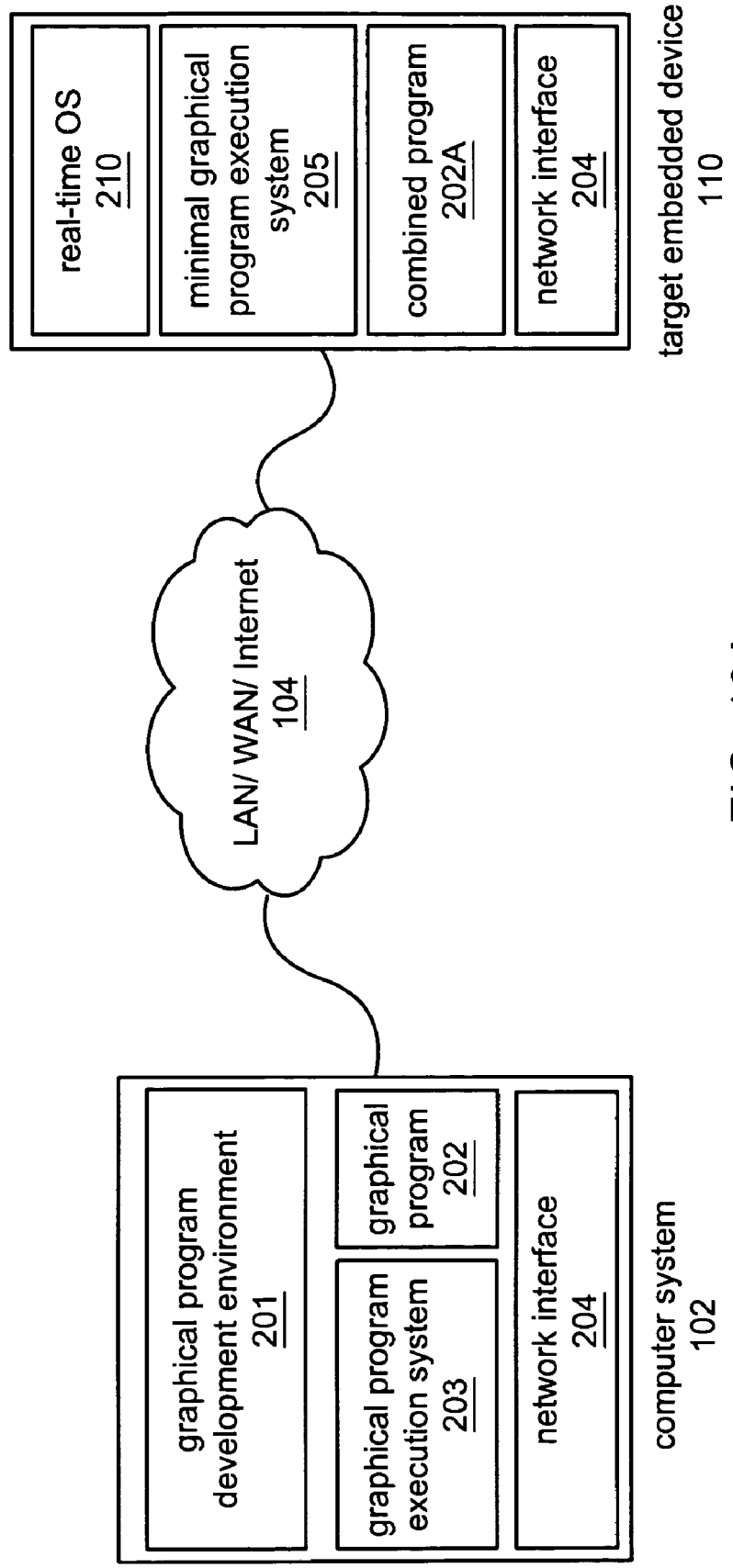
FIG. 19A is a block diagram of an alternative embodiment of the system of FIG. 1A, according to one embodiment.

FIG. 19A—Block Diagram of the Data Acquisition System

FIG. 19A is a block diagram of an alternative embodiment of the system of FIG. 1. In the embodiment shown in FIG. 19A, the computer system 102 includes a program development environment 201, e.g., a graphical program development environment, which facilitates development of programs, e.g., graphical programs, for implementing desired functions or operations, as well as a program execution system 203, also referred to as the execution system 203. The execution system 203 may be operable to execute programs developed with the program development environment 201 (or other program development environments).

As used herein, the term "execution system" may include at least one software program that is designed to execute a certain class of programs. For example, LabVIEW programs utilize an execution system (a LabVIEW graphical program execution engine) that executes in a system in order to execute LabVIEW graphical programs. In some embodiments, the programs, e.g., the graphical programs, may be used to generate executables, well known in the art, which may be loaded and executed directly, e.g., by a loader program, and so may not require an execution system.

As will be described in more detail below, in one embodiment, the execution system 203 may include a componentized or modular architecture, e.g., a componentized callback system, stored on the computer system for partial transfer to an external device, e.g., the target device 110. In other words, the functions of the execution system 203 may be organized into modular components which may be operable to be transferred entirely or in part to the target embedded device 110 to facilitate execution of programs on the target embedded device 110. In many of the embodiments described herein, the systems and methods are described in terms of graphical programs, although it should be noted that the invention is broadly applicable to other types of programs as well, e.g., text-based programs, etc., and is not intended to be limited to graphical programs.

As FIG. 19A also shows, the computer system 102 may also store one or more programs 202 (e.g., graphical programs, compiled executables, etc.) that are executable, e.g., either directly, or via the execution system 203 (or portions thereof), to perform specified functions or operations, as desired. In the embodiment shown, the graphical program 202 may be stored for transferal to the target embedded device 110 for execution.

As will also be described in more detail below, in an alternative embodiment, various components of the execution system 203 may be combined with respective portions of the graphical program 201 for transferal to the target device 110 for execution. In another alternate embodiment, the graphical program 201 may be provided from a first computer, and components of the execution system 203 necessary for execution of this graphical program may be provided from a second different computer system.

The computer system 102 may also include a network interface 204 for communicating over the network 104 with devices on the network 104. For example, the network interface 204 may be an Ethernet interface for communicating over the Internet 104. Further details of the computer system 102 are provided above with reference to FIG. 3.

In the embodiment of FIG. 19A, the target device 110 includes an operating system 210, e.g., a real-time operating system (OS), for managing program execution, managing device resources, and communications in embedded devices, as is well known in the art. Examples of real-time operating systems 210 include, but are not limited to, Linux, NetBSD, vxWorks, eCos, and Windows CE. Due to size and performance issues, the eCos real-time operating system may be particularly suitable for use in the embedded target device 110, although other real-time operating systems are also contemplated. The target device 110 may also include a target execution system (or "minimal execution system") 205, which preferably is a minimal embedded graphical program execution system 205, and which may include a subset of the execution system 203 stored on the computer system 102, mentioned above. The minimal execution system 205 may be optimized to minimize the memory footprint on the target device 110, as described below with reference to FIG. 5. In one embodiment, the minimal execution system 205 may comprise an execution system virtual machine. The minimal execution system 205 may facilitate execution of graphical program(s) 202 by the target device 110. More specifically, the graphical program 202 stored on the computer system 102 may be combined with one or more components of the componentized callback system of execution system 203 to generate a flatfile 207 which may be transferred to the target embedded device 110. The flatfile 207 may be directly executable by the target device 110.

Alternatively, the flatfile 207 may be used in constructing a combined program 202A on the target device 110, wherein the combined program 202A may be executed on the target device 110. The flatfile 207 and the combined program 202A are described in detail below. The target embedded device 110 may also include software for performing various functions related to the present invention, such as a program linker/loader, which in various embodiments may be comprised in the real-time OS, the minimal execution system 205, or may be stored and executed as a separate program. The structure and processing of the flatfile 207 according to one embodiment are described in detail below with reference to FIGS. 25A-25C.

Figure 19B:
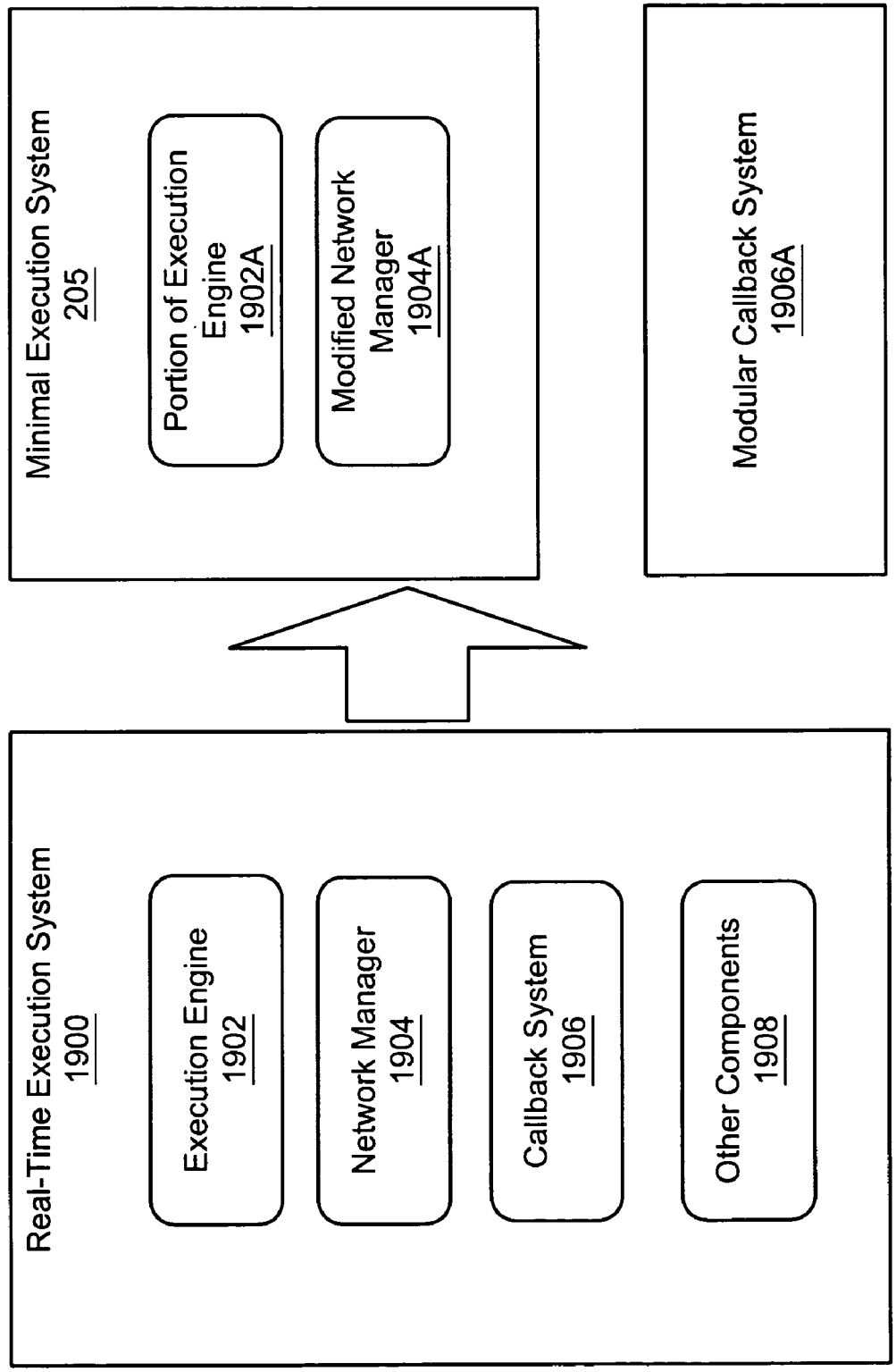
FIG. 19B illustrates a minimal execution system, according to one embodiment.

FIG. 19B—Minimal Execution System

FIG. 19B illustrates the determination of a reduced or minimal set of functionality needed to execute graphical programs. This minimal set is included in the minimal graphical program execution system 205 which is installed on the target embedded device 110, and which operates to execute the (combined) graphical program (via the graphical program flatfile 207) on the target device 110. The term "minimal" is not used in the strict sense of meaning the absolute smallest, but rather in the sense of meaning substantially the smallest given various practical considerations.

FIG. 19B compares a minimal graphical program execution system 205 with an un-optimized (for small memory footprint) graphical program execution system 1900. As FIG. 19B shows, the graphical program execution system 1900 may include an execution engine 1902, a network manager 1904, a callback system 1906, and other components 1908. In a typical graphical program execution system, there may be as many as (or more than) 30 components, and so the execution system may be quite large. Such a system may operate under a real-time OS, such as Linux, which has a size of roughly 1.5 MB (mega-bytes). In this typical graphical program execution system, the amount of available memory may be quite large, and hence there is typically no need to reduce the size of the graphical program execution system.

In contrast, the target device may have a limited memory size, e.g., due to power and/or cost constraints. In addition, a real-time OS 210 for the embedded target device 110, such as eCos, may only be 50 KB in size, and so the execution engine is preferably scaled down accordingly to run on the embedded device 110 under the embedded real-time OS 210. This may be accomplished by modifying or removing various subsystems of the execution system 1900 that are not required for basic execution. For example, in one embodiment, the minimal execution system may include only a portion of the execution engine 1902A, as shown, along with a substantially modified network manager 1904A. Other components may be omitted altogether. Thus, a minimal execution system 205 may be generated with greatly reduced size, and somewhat reduced functionality in order to fit on the embedded target device 110. The minimal execution system 205 may be the absolute smallest executable execution system 205, or simply a reduced version of the execution system 205 including a core set of functionality.

As FIG. 19B also shows, in one embodiment, the callback system 1906 may be omitted from the minimal execution system 205. Instead, the callback system 1906 may be replaced with a componentized or modular callback system 1906A which is stored on the host computer 102, and which may be transferred in part to the target device 110 depending on the needs of the particular graphical program. The componentization of the callback system 1906 is described below with reference to FIGS. 21 and 22.

Figure 20:
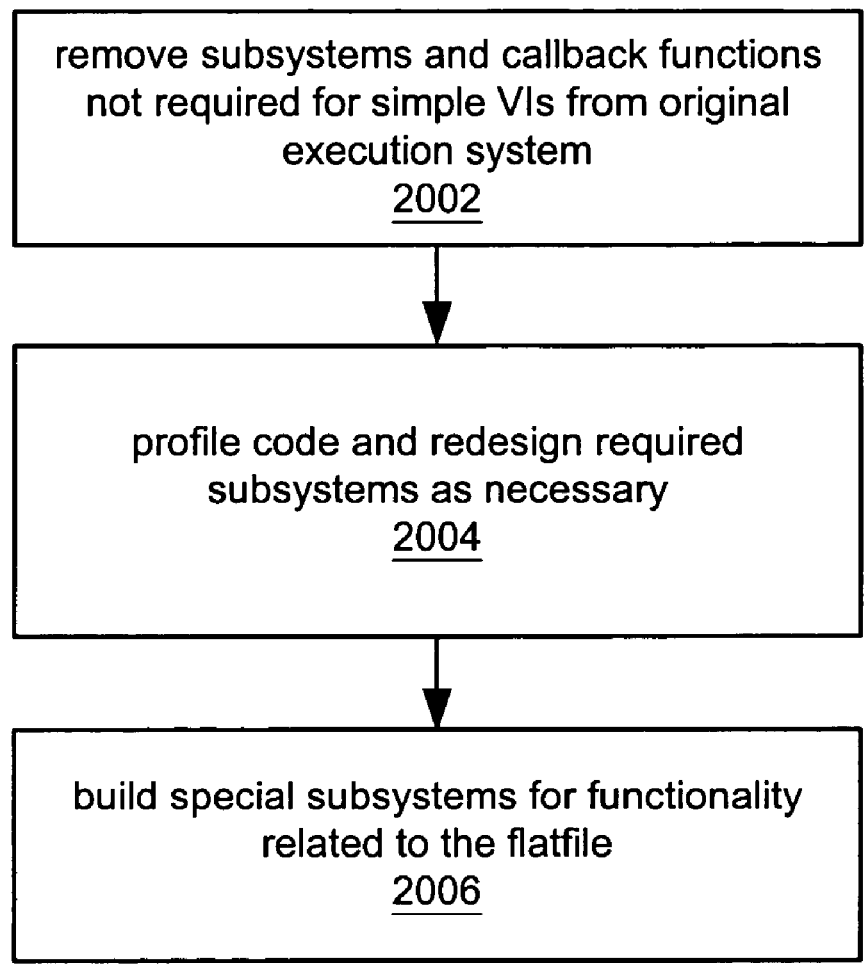
FIG. 20 flowcharts a method for creating the minimal execution system of FIGS. 19A and 19B, according to one embodiment.

FIG. 20—Method of Creating a Minimal Graphical Program Execution System

FIG. 20 flowcharts one embodiment of a method for creating a minimal graphical program execution system, as described above with reference to FIG. 19B. It is noted that in various embodiments, one or more of the steps may be performed in a different order than shown, or may be omitted. Additional steps may also be performed as desired.

As FIG. 20 shows, in 2002, the original graphical program execution system 1900, as described above in FIG. 19B, may be analyzed and pared down to the minimum set of functionality required to execute an extremely simple VI, e.g., a two integer addition (1+1=2) or a set of simple VIs. In one embodiment, this may include removing such subsystems as the web server, XML support, and the callback table. Then, all the functions that are named in the callback table (which are candidates for modularization and aren't required for the simple VIs) may be removed. Finally, a code coverage test may be perform in order to find and remove the functions that were not called in executing the simple VI (or a set of simple VIs). The resulting code comprises an initial version of the minimal execution engine 205.

Then, in 2004, the resulting code may be profiled to determined how much code memory and RAM memory it occupies, and to decide which of the remaining subsystems are too large and should be redesigned. For example, for the system described above based on the ARM processor, a target memory footprint of 50K may require trimming those subsystems that are required and are too large in the original execution system. As an example, the network manager and type system may need to be redesigned if they were implemented with too large buffers in the original execution system.

Finally, in 2006, if the original execution system VI linker does not fit the design, special subsystems, e.g., VI2OBJ and FLATFILE systems, may be built. In other words, components for converting VIs to object files (VI2OBJ) and for generating the modules for the flatfile (FLATFILE) may be created. Further information regarding the generation of object files for VIs is provided below in the section titled VI Object Files.

Thus, in one embodiment, a minimal execution engine 205 may be constructed by removing all but the minimum functionality required to execute a VI (graphical program), including most or all of the callback system 1906, leaving the portion of the execution engine 1902A and a modified network manager 1904A, as described above. Such a minimal execution system 205 may then be suitable for loading and executing on an embedded device 110. In one embodiment, the minimal execution system may comprise an execution system virtual machine.

It should be noted that the process described above with reference to FIGS. 19 and 20 may also be applied to operating systems, such as a real-time operating system (OS). In other words, an operating system may be optimized, modularized, and/or modified to minimize the footprint on the target device 110. For example, the operating system may be analyzed to determine a minimal kernel or core functionality necessary for the OS to operate. For example, in one embodiment, the minimum functionality may include a simple Basic I/O Service (BIOS) and/or a minimum communication service, such as a TCP/IP service, as is well known in the art. As another example, the minimum functionality may include a simple downloading capability or functionality, e.g., a download protocol. Thus, in various embodiments, the minimum functionality may include one or more of: a simple BIOS, a minimum network communications protocol (e.g., TCP/IP), and/or a minimum download capability. In another embodiment, the minimum functionality may include a hardware and/or software checking capability. Other functions or services of the OS, such as I/O, memory management (e.g., trash collection, etc.) etc., may be modularized or partitioned such that subsets of the functions or services needed for a particular application or device may be determined and transmitted as needed. Thus, in one embodiment, a distributed, "on-demand" OS may be created which includes the kernel (or minimum functionality), and one or more transferable OS modules which provide additional OS functionality in a modular fashion. Thus, the minimum functionality may facilitate subsequent downloading of support libraries and executing kernel components, i.e., in one embodiment, the minimum functionality may be just enough to allow the device to download further basic OS capabilities, including portions of the kernel and/or the BIOS. In another embodiment, these further basic OS capabilities may be included with an application, as described in detail below.

Thus, in one embodiment, the OS kernel or core functionality may reside on the target device 110, and may be executable to perform basic OS functionality on the device. Then, based on analysis of the application (e.g., a graphical program and/or the desired task, and/or the target device), one or more OS modules may be selected to provide particular needed services. These OS modules may then be transmitted to the target device 110 and installed (e.g., by the kernel or other loader program) to augment the basic OS functionality provided by the kernel, after which the OS (now extended) may be operable to provide the additional OS services or functionality.

In various embodiments, the one or more OS modules may be transmitted alone, or along with or as part of the target application. For example, in one embodiment, the one or more OS modules may be included in a flatfile 207 (or other structure or file) along with modules from the graphical program, and possibly also with modules (components) of the modular callback system 1906A.

FIG. 21—Componentization of the Graphical Program Callback System

FIG. 21 illustrates the process of componentizing a monolithic graphical program callback system 1906 to generate the modular graphical program callback system 1906A, according to one embodiment. It should be noted that the callback system of FIG. 21 is a highly simplified model which is intended only to illustrate the process, and is not meant to represent an actual callback system.

As FIG. 21 shows, the monolithic graphical program callback system 1906 includes a plurality of functions A-K (702-722) with varying dependencies. In many prior systems, the functions are arbitrarily stored in many different files, which generally accumulate over time as the function library is developed. Thus, locating functions for linking and execution may be difficult and expensive, since functional dependencies may span numerous files in a substantially haphazard manner. As a result, when linking files for a particular application (graphical program), many unnecessary functions may be included due to the fact that they happened to be located in the same files as need functions, thus, the resulting memory footprint of the executable may be unnecessarily large.

The approach used herein to modularize the functions is to analyze the functional dependencies of the functions, and to group functions which operate relatively independently from other functions as a module. For example, as FIG. 21 shows, function A 2102 calls function B 2104 and function C 2106. Function B 2104 calls function D 2108, and function C 2106 calls function E. Thus, function A 2102 has a dependency on function B 2104, function C 2106, function D 2108, and function E 2110.

Similarly, function F 2112 depends on function G 2114, function H 2116, function I 2118 and function J 2120, as well as function C 2106 (and its child function E 2110). Note that function C 2106 (and its child function E 2110) is called by both function A 2102 and function F 2112. This dependency overlap may be resolved by grouping any function (with its children) which is called by multiple other functions as a separate module. Thus, a first module, module 1 2162, may include function A 2102, function B 2104, and function D 2108, as indicated in the modular callback system 1906A. Module 2 2164 includes function C 2106 and function D 2108, as shown. Module 3 2166 includes function F 2112, function G 2114, function H 2116, function I 2118 and function J 2120. Note that module 1 2162 and module 3 2166 both depend on module 2 2164 (since both function A 2102 and function F 2112 call function C 2106). This module dependency relationship may be maintained in a module dependency table 2130 or its equivalent. As FIG. 21 also shows, function K is independent of any other functions, and so has its own module, module 4 2168.

In one embodiment, each module may be stored in a separate file, greatly easing the task of a dependency checker when selecting modules/files needed by the graphical program 202, i.e., for inclusion in the flatfile 207. A method for performing this componentization is described below with reference to FIG. 22.

Figure 22:
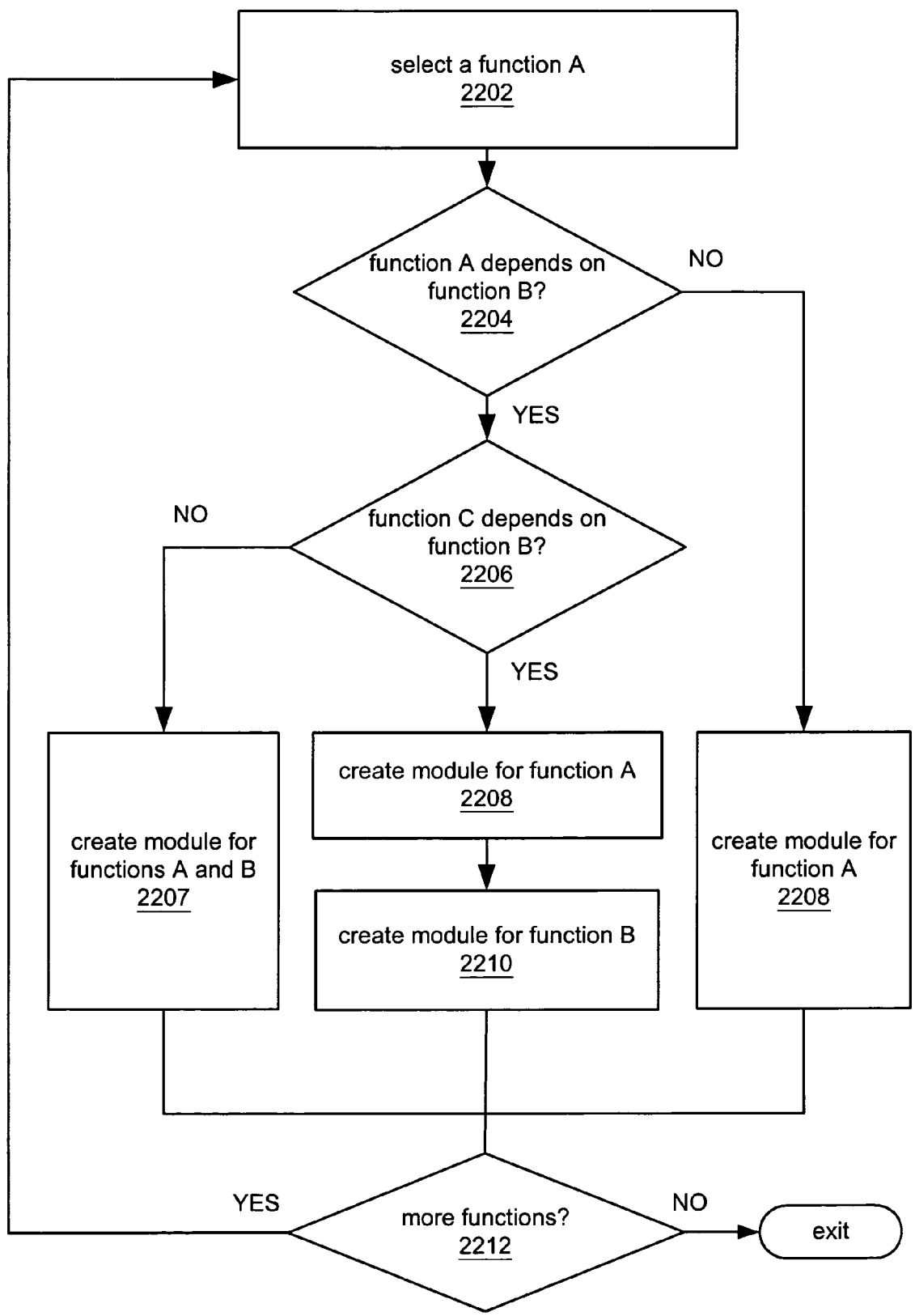
FIG. 22 flowcharts one embodiment of a method for componentizing a callback system to generate a modular callback system.

FIG. 22—Method for Componentizing a Graphical Program Execution System

FIG. 22 flowcharts one embodiment of a method for componentizing a graphical program execution system, such as, for example, LabVIEW RT. More specifically, as described above with reference to FIG. 21, the method componentizes or modularizes a set of functions (e.g., the function library) of the execution system, also referred to as the callback system of the execution system, by grouping functions in files or modules based on dependencies.

For example, in one embodiment, the original source code of the callback system includes a set of files that each contains functions that may call other functions, that may call other functions, etc., that belong to other files. If a function's dependencies extend into several files, it may be difficult or impossible for a dependency checker to identify and retrieve the function. To facilitate a dependency checker being able to select from the callback system source code only those functions that are needed by a particular application, an attempt may be made to place each function with it's dependencies into a single file. This "complete" function file (e.g., with *.cpp extension) may comprise a module. Thus, componentization of the graphical program execution engine may include the creation of modules, or *.cpp files, that completely (or almost completely) describe a function.

The following describes one approach for performing this componentization, using functions A, B, and C for illustrative purposes. It is noted that in various embodiments, one or more of the steps may be performed in a different order than shown, or may be omitted. Additional steps may also be performed as desired.

As FIG. 22 shows, each function may be analyzed with respect to its functional dependencies to determine whether to place the function in a separate module or in a module with another function. For example:

In 2202, a next function, e.g., function A, may be selected, such as from the callback system of the graphical program execution engine. Then, a determination may be made as to whether function A has dependencies, i.e., calls a function B, as indicated in 2204. If function A has no dependencies, i.e., does not call function B, then a module or file may be created for function A, as shown in 2208.

If in 2204 function A does call function B, then in 2206 a determination may be made as to whether function B is also called by another function, e.g., function C. In other words, the method may check to see if any other function has a dependency on function B. If no other function calls function B, then in 2207 a module or file may be created containing both function A and function B.

If in 2206 it is determined that function B is called by function C, then separate modules or files may be created for function A and function B, respectively, as indicated in 2208 and 2210. Said another way, if function B may be legitimately included in multiple modules (or files), then function B may be given its own module or file. It should be noted that in various embodiments, dependencies between modules may be stored either in the modules themselves or in some type of module dependency table or its equivalent.

Finally, in 2212, a determination may be made as to whether there are additional functions to analyze. If there are no more functions in the callback system, then the method may terminate or exit, as shown. Otherwise, the method may continue, selecting the next function in the callback system to analyze, as shown in 2202, and described above.

Thus, if function A calls function B, and function B is only called by function A, then a module or file containing function A's definition may also contain function B's definition. Under this scenario, the dependency checker will know that function A and function B are interrelated and part of the same file. If function A calls function B, and function B is also called by function C, then function A's module or file will not contain function B in its definition file, and so function B's definition may be included in a separate file (or module). And so, by using the method above, the functions of a callback system in a graphical program execution engine may be modularized to allow the dependency checker to find and retrieve only those modules or files that are needed by the application, where the modules or files are organized to minimize the number of unnecessary functions included in the graphical program flatfile.

Figure 23:
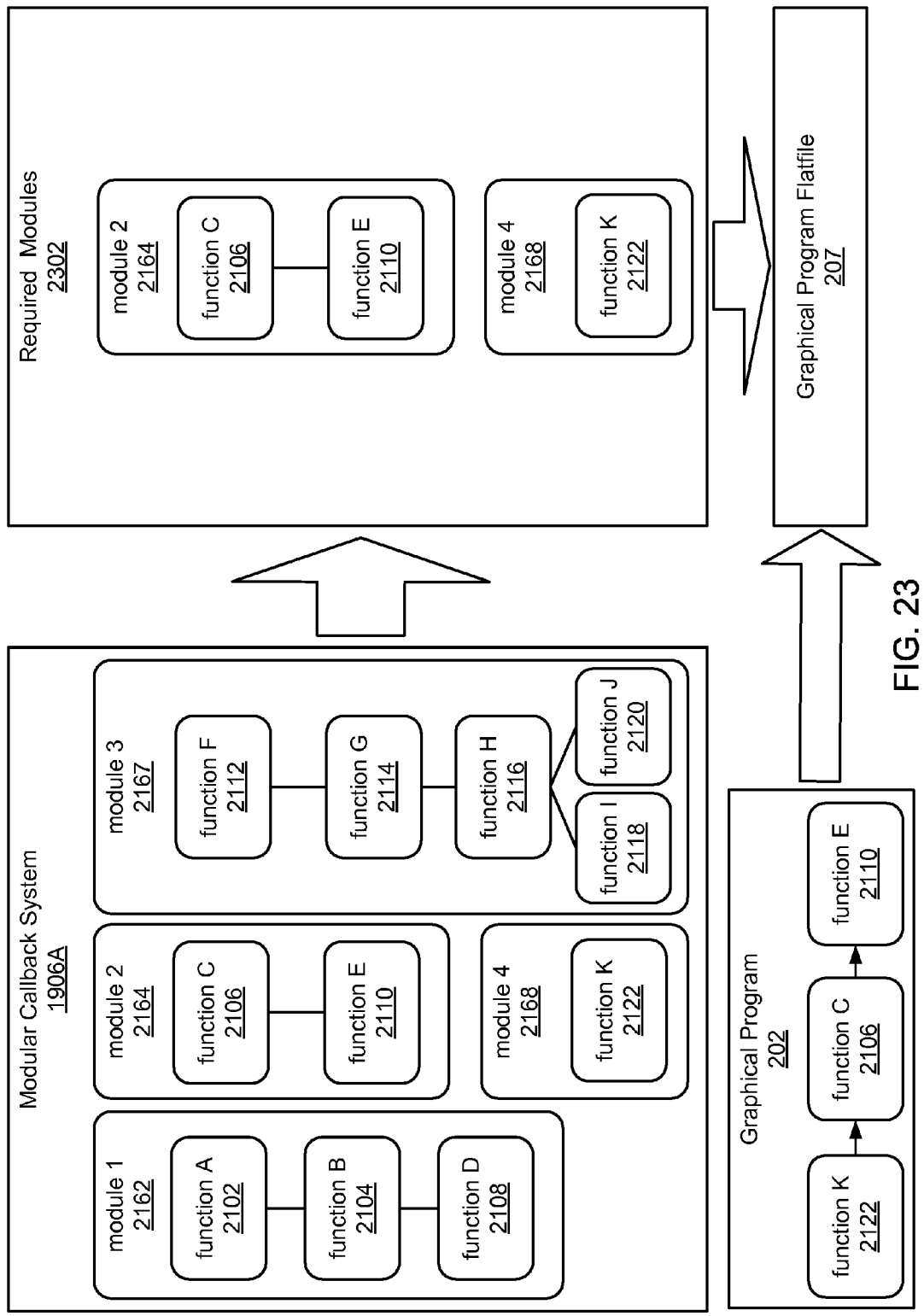
FIG. 23 illustrates a process of generating a flatfile from a program and the modular callback system, according to one embodiment.

FIG. 23—Generation of the Graphical Program Flatfile

FIG. 23 graphically illustrates the process of generating a graphical program flatfile 207 from graphical program 202 and the modular callback system 1906A. As FIG. 23 shows, a dependency checker program or process may analyze the graphical program 202 with respect to the modular callback system 1906A to determine required modules 2302. For example, in the embodiment shown, in the (extremely simple) graphical program 202, function K 2122 is executed, then function C 2106 (which calls function E 2110 implicitly) is executed. Finally function E 2110 is executed (explicitly). Thus, as is well known in the art, the graphical program not only indicates the functions called, but the sequence of execution, as well.

Figure 24:
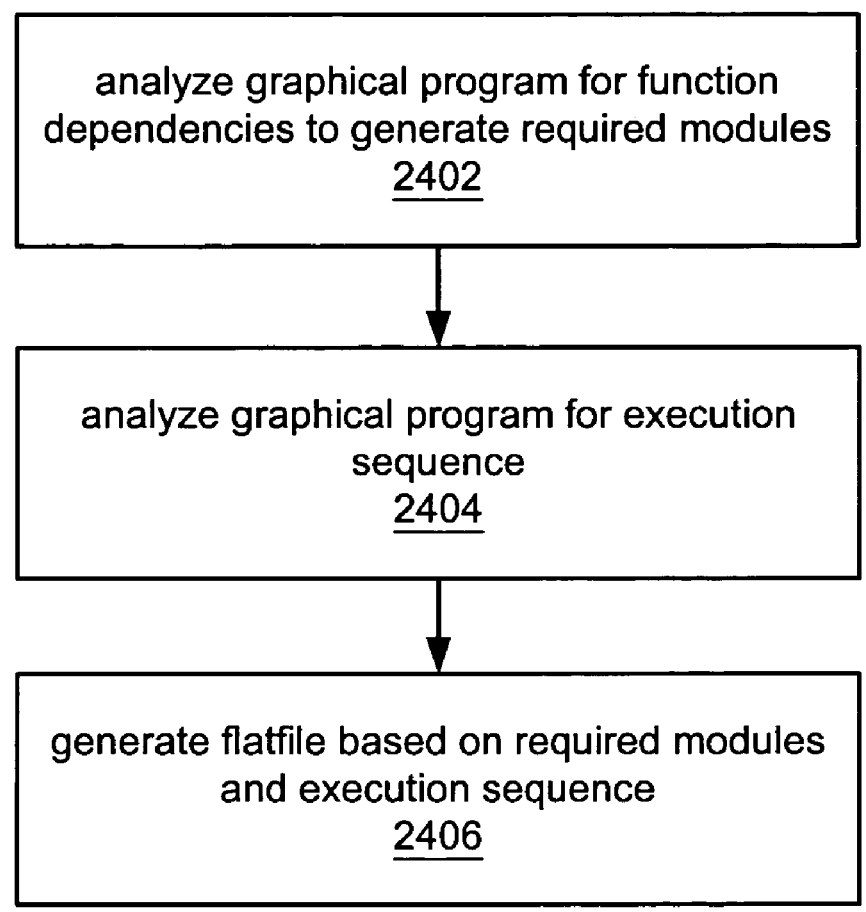
FIG. 24 flowcharts one embodiment of a method for generating the program flatfile.

The dependency checker may thus may determine that module 2 2164 and module 4 2168 are required by the graphical program. This information may then be used in conjunction with execution sequence information from the graphical program 202 to generate the flatfile, as indicated in FIG. 24. Further details of the flat file are provided below with reference to FIGS. 24 and 25A-25C.

VI Object Files

In the process of generating the flatfile for an application program, one or more object files may be produced, e.g., via a utility such as VI2OBJ or its equivalent. The reasoning behind this approach is due to the storage limitations of many embedded devices. For example, loading an entire VI to the target device 110 may require more RAM than is available on the device, and execution of VIs directly from flash may not be possible because there is not enough RAM memory to copy these VIs into RAM and execute from there. It should be noted that as used herein, the term "program" may refer to the original source code of a program (e.g., the graphical diagram and underlying code, or text source code, such as C code), to object code generated from the source code, or to executable machine code generated from the source or object code.

However, because the callback system modules (generated from C/C++ code), described above, must be loaded onto the target device 110, it is natural to implement a common mechanism for loading VIs and modules. Thus, a VI2OBJ linker/loader may be developed based on the idea that VIs can be saved, not in their native format, but as object files, such that an ordinary C linker may be used to process them—i.e. to transform them into shared objects that can be loaded at runtime into the target device 110. This approach may make generation of executables from VIs easy and straightforward when space is limited. VI2OBJ or its equivalent is a mechanism to transform a VI (ex: add_int.vi) into an object file (ex: add_int.o).

To describe the mechanism involved in transforming a VI to an object file, the general structure of a VI should be considered. Omitting irrelevant information, the six major components are:

1. Compiled code—executable binary code of a VI;
2. Data space—stores all the data that is required by the VI to run;
3. Data space type map—describes the data stored in the data space;
4. Connector panel—describes the inputs & outputs of a VI;
5. Front panel heap—hosts the controls, indicator & cosmetics etc.; and
6. Block diagram heap—hosts the nodes & wires that make up the block diagram.

Another important piece of information is the linkinfo, which describes connections made from a VI to various entities, e.g., subVIs, external functions etc.

Now, the above listed components may be reshaped into an object file based on the following considerations:

1. The generated object file may be processed by an ordinary C linker (the VI may be linked to other support modules and eventually used to generate the flatfile).
2. It may be desirable to use the original execution mechanism of VIs on the target device 110.
3. The overhead induced by the new loading mechanism should be minimized.
4. Additional processing required after the VI is loaded by target device 110, up to the point where it is ready to run, should be minimized.
5. The object file size should be minimized.

To minimize the object file size the front panel heap and the block diagram heap may be omitted from the VI, because they are not needed on the target device 110 at run time, i.e., they are only used on the host computer side at edit time. As is well known in the art, an object file is substantially a file comprising of blocks of information (e.g., code, data, etc.), symbol information, and relocation information. In one embodiment, the steps taken to create an object file from a VI may include:

1. placing the compiled code resulting from the VI into the section code of the object file, extracting the symbol information attached to the VI code, and adding relocation information for local and external function calls.
2. creating a data section for the object file containing initialized data, e.g., data space type map block of the VI, default data space, connector panel and VI InstrHandle structure (enabling some of the initialization for a VI on the host side), etc. Additionally, symbol information may be added to facilitate retrieval and use of information stored in this section.
3. creating a .bss section for un-initialized data and storing related symbol information there.
4. extracting patch information from the linkinfo block and storing this info in a data section (e.g., named linkdata). This information may include a set of symbol and relocations entries. The data section may be used to store links from the VI to other subVIs or external modules.
5. finally, calls may be generated for InitVI and UnInitVI functions (and stored in two special sections: .ctors and .dtors, of the object file). These functions may be responsible for VI initialization and disposal on the target device side.

Performing the steps described above may generate an object file that contains all the information needed by a VI to run, and that also includes symbol and relocation information used to connect this VI with other VIs or modules.

FIG. 24—Method for Generating the Graphical Program Flatfile

FIG. 24 is a high-level flowchart of one embodiment of a method for generating the graphical program flatfile 207, as illustrated in FIG. 23. As mentioned above, in various embodiments, one or more of the steps may be performed in a different order than shown, or may be omitted. Additional steps may also be performed as desired.

As FIG. 24 shows, in 2402, a graphical program 202 may be analyzed with respect to function dependencies to generate a list or collection of required modules. In other words, a dependency checker residing on the host computer system 102 may determine the functions used in the graphical program, then select modules from the modularized callback system 1906A which contain those functions to generate required modules 2302.

After (or before or during) the required modules 2302 are determined, the graphical program 202 may be analyzed to determine an execution sequence or order of the functions called by the program (or by other functions in the program 202), as indicated in 2404. In other words, the program flow for the graphical program 202 may be determined.

Finally, in 2406, the flatfile 207 may be generated based on the required modules 2302 and the execution sequence for the program. In one embodiment, the flatfile 207 may be generated by including the required modules 2302 in the flatfile 207 along with sequencing information and/or module dependency information. An exemplary structure and format of the generated flatfile 207 is presented below with reference to FIGS. 25A-25C.

In one embodiment, the flatfile 207 may be generated from an object file and a symbol map of the target executable (the graphical program). As an example, assume that the object file is named add_int.o (for adding two integers) and the flatfile name, will be add_int.flat.

First, a symbol map (named mb.sym) may be generated from the graphical program, e.g., by using a special tool, e.g., a symdump tool. The symbol map contains all the global symbols of the graphical program along with the sections where they belong, and their addresses relative to the beginning of the section. Section names of the graphical program may then be extracted (e.g., from mb.sym), and numbered, e.g., beginning with one. Section names of add_int.o may then be extracted and numbered, e.g., beginning with 100. Thus, symbol lookup may be done at the time of the flatfile creation.

Then, symbols may be extracted from mb.sym and add_int.o. Relocation information may be extracted from add_int.o. Relocation information in an object file may include the address where the relocation is needed and the symbol name for the relocation. In one embodiment, the relocation information in a flatfile may comprise tuples (clusters, structures, etc.) of {[address where the relocation is needed (uInt32)], [the target section (uint16)], [the target address relative to the start of the start section]}. Further information regarding relocation is provided below.

For every relocation in the add_int.o, the symbol name may be searched for in mb.sym and add_int.o, and, if the symbol is not found, then an error message may be generated and the method terminated. If the symbol is found, the relocation may be written to the flatfile, i.e., to add_int.flat.

Finally, each section's content may be written to the flatfile. In one embodiment writes to the flatfile 207 may be made in accordance with the formats for relocation, etc., for a flatfile, described below.

It should be noted that in a preferred embodiment, unlike DLLs (Dynamic Link Libraries), flatfiles are "targeted". In other words, flatfiles are generally built to be loaded by a specified program. Thus, a crash or error may occur if another program tries to load a flatfile that was not built for it. Also, in one embodiment, the version of the symbol map should match the version of the graphical program. This version compliance may be facilitated by using a "build timestamp" in the application and in the mb.sym, so verification of the "version match" is possible.

Relocation

Relocation refers to writing the code section of an application at a certain memory address and preparing the code for execution. Preparation includes modification of the code according to a relocation table such that at execution time the code is able to access the variables and functions that it needs for its task. Examples of relocation are presented below.

Relocating Code

A program, at compile time, is set to run at certain memory addresses, say Xtext for the code section and Xdata for the data section. However, when the program is dynamically load into the target device 110, it is very possible that these addresses are already occupied, or may not even exist on the target device 110. Therefore, the code and data sections of the program may be placed in different memory locations on the target device, say Ytext and Ydata.

For example, if the program contains the following C instruction:

i=0;

and the address of variable i is (Xdata+100) (an offset of 100, for example, with respect to Xdata)

After code compilation, the following assembly line of code may be produced:

mov [Xdata+100], 0 meaning "move the value 0 at address Xdata+100".

Now assuming that the code section is transferred to the target device 110, and Xdata becomes Ydata, the target device address of variable i is now (Ydata+100).

The process that corrects the instruction mov [Xd+100], 0 to mov [Yd+100], 0 is called relocation. The relocation process uses the Relocation Table to determine the address in the code section for the instruction (mov [Xd+100], 0).

and how this instruction needs to be changed.

In one embodiment, one or more of the following constraints may apply to the target device:

1. target flash should be large enough to be able to store the flatfile code, constructor, destructor and read-only sections.

2. target RAM should be large enough to store the flatfile data section and also the largest relocation table.

Relocating Data

The following is an example of relocation in the Data Section (.data). Assume that the program includes the following code sequence:

```
int i;
int *j=&i;
```
i is an un-initialized variable, so it may be stored in the un-initialized data (.bss) section. j is a variable that will contain the address of variable i, so after being initialized it may be stored in the data section. Because j will eventually have to contain the address of i, a relocation may be necessary in the data section to the address of j.

Figure 25A:
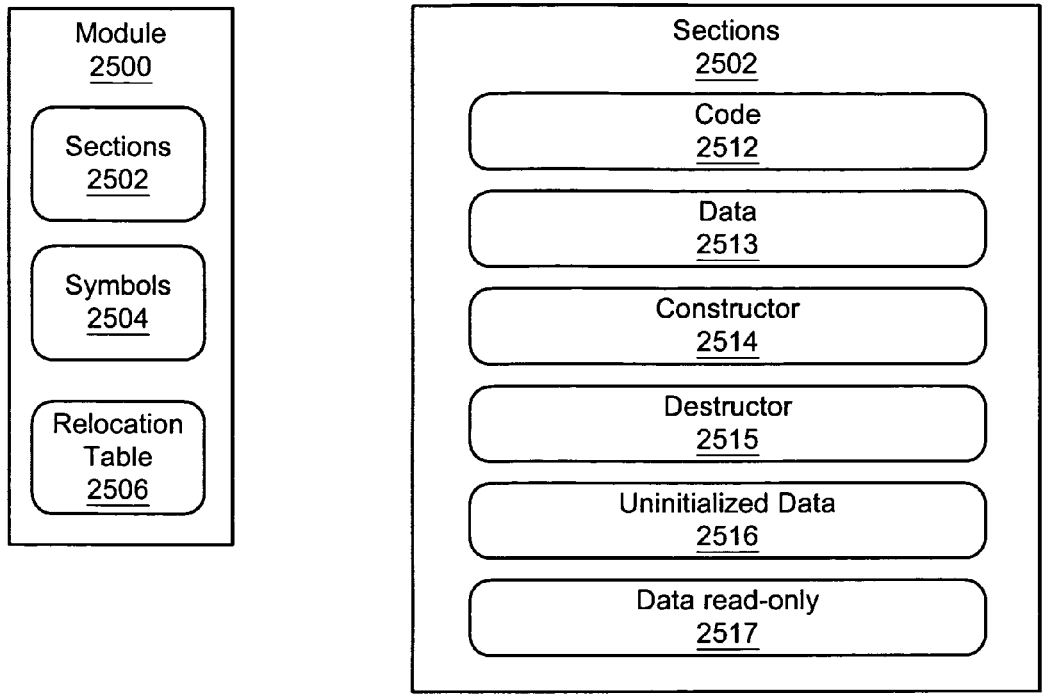
FIGS. 25A-25C illustrate the structure and deployment of the program flatfile, according to one embodiment.
Figure 25B:
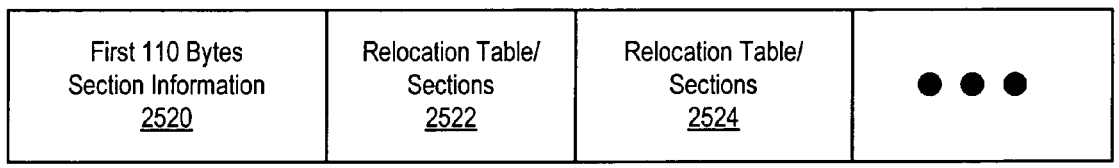
Figure 25C:
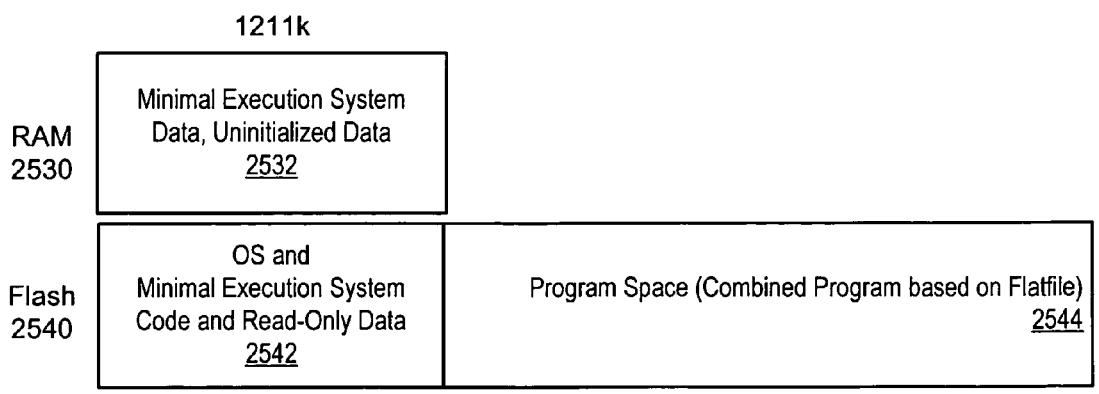

FIGS. 25A-25C—Structure and Deployment of the Graphical Program Flatfile

FIGS. 25A-25C illustrate the structure and deployment of the graphical program flatfile 207, according to one embodiment. FIG. 25A illustrates one embodiment of the contents of the modules used to build the flatfile 207. FIG. 25B illustrates the structure of the flatfile 207, according to one embodiment. Finally, FIG. 25C illustrates the deployment of the minimal graphical program execution system 205 and the constructed combined program 202A.

As FIG. 25A shows, in one embodiment, a module 2500, as referred to above with reference to FIGS. 20 and 21, may include three components: a sections component 2502, a symbols component 2504, and a relocation table 2506. In one embodiment, the module is a piece of C or C++ code contained in one or more C or C++ files. Every module may be compiled into an object file which contains the executable code and the data generated by the compiler for a specific module, along with symbolic and relocation information for that module, and other information, such as debug info, comments, etc.

The sections component 2502 may include six sections which represent various aspects of the module 2500, as shown in FIG. 25A. More specifically, the sections may include a code section 2512 which is the program code for the module, a data section 2513, a constructor 2514 for the module, a destructor 2515 for the module, a un-initialized data section 2516, and a data read-only section 2517 (i.e., for constants). A section may comprise a range of addresses with no gaps; all data in those addresses may be treated the same for some particular purpose. The symbols component 2504 includes the variables and function names for the module. A symbol is a name associated with a given address in a given section. The symbolic and relocation information from the object file of the graphical program can be used to determine the dependency relation between modules.

One characteristic of the object file is that it can be relocated, meaning that with appropriate processing, object file sections can by stored and executed at any memory address. As described in detail above, relocation is the process that makes an object file able to run at a given address. The information (table) that the relocation process uses is referred to as relocation information (or the relocation table) and is preferably included in the flatfile 207. Thus, the relocation table 2506, also referred to as an address table, provides the relative addresses for the symbols (variables and functions) with respect to the program on the host computer 102. This relocation information may be used by the target device to construct the combined program 202A, adding an address offset to the addresses in the relocation table 2506 to generate correct locations for the symbols in the context of the target device 110.

Thus, once the graphical program has been compiled to an object file, the object file may contain sections such as:

SectionA
　Relocation information for SectionA
　Symbol information for SectionA
　Debug information for SectionA SectionB
　Relocation information for SectionB
　Symbol information for SectionB
　Debug information for SectionB SectionC
　Relocation information for SectionC
　Symbol information for SectionC
　Debug information for SectionC etc. in no specific section order.

The information in each module 2500 may be included in the flatfile 207, as shown in FIG. 25B.

As FIG. 25B shows, the flatfile 207 may include an initial segment 2520 (reading left to right) which includes information regarding the module information in the flatfile 207. In one embodiment, this section may be about 100 bytes in size, and may include such information as the number of sections in the flatfile, the size of each section in bytes, and the type of each section, e.g., code 2512, data 2513, etc.

After this initial section information segment 2520, one or more module segments, referred to as flatobjects, may be included, as FIG. 25B shows. In one embodiment, each module segment may include the module information shown in FIG. 25A, i.e., each module segment may include relocation table 2506 and sections 2502 for a respective module 2500, as illustrated by exemplary segments 2522 and 2524.

FIG. 25C illustrates the deployment of the minimal execution system 205 and the combined program 202A on the target device 110. As FIG. 25C shows, the minimal execution system 205 may be divided between RAM 2530 and flash memory 2540 on the target embedded device 110. In the embodiment shown, the RAM 2530 is of size 128 k and stores data and un-initialized data 2532 for the minimal execution system 205. As FIG. 25C also shows, in this embodiment, 128 k of the flash memory is used to store the real-time OS (e.g., eCos) and the code and read-only data 2542 for the minimal execution system 205. The remainder of the flash memory 2540 may be used to store the combined program 202A which may be constructed based on the flatfile 207. It should be noted that the RAM 2530 may also be used to store data during execution of the combined program 202A.

Thus, the flatfile 207 may include module information for functions of the graphical program 202 and for functions included from the modular callback system. In other words, the functions (with variables) for the graphical program 202 have been combined with the execution system functions required to execute those graphical program functions. This module information also includes relative address information for re-locating the functions in the memory space of the target device 110. The flatfile 207 may be transmitted to the target device 110 where a flatfile loader may execute to receive the flatfile 207 and construct the combined program 202A. Further details of the process of constructing the combined program 202A from the flatfile are provided below with reference to FIG. 12.

Detailed Structure of Flatfile

The following describes one embodiment of flatfile structure or format in more detail. It should be noted that the following format is exemplary and it only intended for illustration purposes, i.e., is not intended to limit the structure or format of the flatfile to any particular design.

Flatfile:
　sec_nr (int32) Number of sections;
　sec_desc[sec_nr]—An array of sec_nr section descriptors. See the format of sec_desc below;

sec_content[sec_nr]—An array of sec_nr with section contents. See the format of sec_content below;

sec_desc:
    sec_size (uInt32)—the size of the section data;
    sec_type (uInt32)—type of the section. A combination of FO_SEC_READONLY, FO_SEC_HAS_CONTENT, FO_SEC_IS_CTOR_TABLE, FO_SEC_IS_DTOR_TABLE;
    number (uInt32)—a unique number for every section;

sec_content:
    rel_desc—relocations for this section. See bellow for rel_desc structure;
    section_data—the raw data of the section;

rel_desc:
    rel_nr (uInt32)—number of relocation in this relocation descriptor;
    rel_data[rel_nr]—an array of rel_nr relocations data—See bellow for the rel_data structure;

rel_data:
    addr (uInt32)—the relocation address, relative to current section start;
    target_sec (uInt16)—the section where the relocation should point;
    target_addr (uInt32)—the address relative to target section address where the relocation should point;
    rel_type (uInt16)—the type of the relocation.

Dynamic Linking of Flatfile to the Target:

As described above, in a preferred embodiment, the flatfile 207 may comprise a sequence of sections and relocation tables. The sections can be code, data, constructors, etc. When the flatfile is constructed on the host computer, the code in its sections is relative, meaning that the instructions described in this code do not have real target addresses for the variables but rather some generic addresses, e.g., with respect to the beginning of the program.

For example, the program may include an instruction:
    Move to variable I at address 10, the value 0 (I=0)

Now, as mentioned above in 1206, the flatfile may be transmitted to the target device, say, for example, in chunks of 4 kbytes. The very first transfer contains the initial 100 bytes 2520 that give information regarding the total number of sections, their type, and size, and the relocation tables that come with them, as described above with reference to FIG. 25B. Based on this information memory on the target device 110 may be reserved to accommodate these sections.

Now, the code:
    Move to variable I at address 10, the value 0 (I=0)

arrives at the Target. Based on the relocation table, it may be determined that the real target address of variable I is not 10 but rather 500 offset+10=510 because in the datav section of the target RAM all program variables are addressed with relative to address 500.

So at this time, when the flatfile is moved into the target device 110 the call to
    Move to variable I at address 510, the value 0 (I=0)

has been corrected. In other words, the offset (500) has been added to the address. In one embodiment, the call may not be executed immediately, but rather may be stored or written in a code section of the flash location 2540.

In one embodiment, after the entire flatfile has been transmitted to the target and processed, the constructed combined program may be executed. In another embodiment, the execution of the constructed combined program may occur as the flatfile is streamed to the target device 110, as described below.

Example Process

The following is a simple example of one embodiment of the above described processes. In this example, the user creates a VI on the host computer 102, named Delay.vi, and wishes to run this VI on the target device 110.

On the host computer 102, the VI is transformed into an object file named Delay.o. The modules required for running the VI are determined by a dependency checker executing on the host computer 102, producing the following list (for example):
    uClibc/memmove.o (from directory uClibc take file memmove.o)
    cookie/mbCookie.o
    occur/mbOccur.o
    uClibc/memcpy.o So at this point, the application VIs are converted into object files, and the required modules (that are also compiled into object files at this point) from the modular callback system 1906A are determined. Then, all the object files pertaining to the application (using an ordinary C linker) are lined into a single object file which becomes the "application object file". In other words, the following object files may be merged together:
    Delay.o
    uClibc/memmove.o
    cookie/mbCookie.o
    occur/mbOccur.o
    uClibc/memcpy.o thereby creating one single "application object file named" exampleVI.o. It is noted that in this example, the "application object file" may now be organized thusly:

All code sections (of type text) with related relocation, symbol and debug information from Delay.o, memmove.o, mbCookie.o, mbOccur.o, and memcpy.o are assembled into one big code section (of type text) with related relocation, symbol and debug information in the resulting exampleVI.o.

All data sections (of type data) with related relocation, symbol and debug information from Delay.o, memmove.o, mbCookie.o, mbOccur.o, and memcpy.o are assembled together into one big data section (of type .data) with related relocation, symbol and debug information in the resulting exampleVI.o All constructor sections (of type .ctors) with related relocation, symbol and debug information from Delay.o, memmove.o, mbCookie.o, mbOccur.o, and memcpy.o are assembled together into one big constructor section (of type .ctors) with related relocation, symbol and debug information in the resulting exampleVI.o.

All code destructor (of type .dtors) with related relocation, symbol and debug information from Delay.o, memmove.o, mbCookie.o, mbOccur.o, and memcpy.o are assembled together into one big destructor section (of type .dtors) with related relocation, symbol and debug information in the resulting exampleVI.o.

All read_only sections (of type .rodata) with related relocation, symbol and debug information from Delay.o, memmove.o, mbCookie.o, mbOccur.o, and memcpy.o are assembled together into one big read_only section (of type .rodata) with related relocation, symbol and debug information in the resulting exampleVI.o.

All un_initialized data sections (of type .bss) with related relocation, symbol and debug information from Delay.o, memmove.o, mbCookie.o, mbOccur.o, and memcpy.o are assembled together into one big un_initialized data section (of type .bss) with related relocation, symbol and debug information in the resulting exampleVI.o.

At this point, exampleVI.o contains:
  Code section
  Relocation info for Code section
  Symbol info for Code section
  Debug info for Code section
  Data section
  Relocation info for Data section
  Symbol info for Data section
  Debug info for Data section
  Constructor section
  Relocation info for Constructor section
  Symbol info for Constructor section
  Debug info for Constructor section
  Destructor section
  Relocation info for Destructor section
  Symbol info for Destructor section
  Debug info for Destructor section
  Read_Only section
  Relocation info for Read_Only section
  Symbol info for Read_Only section
  Debug info for Read_Only section
  (in no specific order).

However, a typical object file has a very complicated internal structure and thus may not be suitable for sequential processing (on the target device 110). Therefore, in order to be able to load, dynamically link, and sequentially process an object file on the target device 110, the object file may be processed into a different format called the flatfile, described above in detail.

The flatfile is an object file that has a much simpler structure than a regular object file, and therefore it may be processed "on the fly" or sequentially on the target device 110. In one embodiment, a utility, referred to as obj2flat, that transforms an object file into a flatfile, may be developed and used. Therefore, by running the obj2flat utility on exampleVI.o a single flatfile file named exampleVI.flat may be generated.

In one embodiment, the exampleVI.flat file may include:
  Section table
  Relocation Table for Code Section
  Code section
  Relocation Table for Data Section
  Data section
  Relocation Table for Constructor Section
  Constructor section
  Relocation Table for Destructor Section
  Destructor section
  Relocation Table for Un-initialized Data Section
  Un-initialized Data section
  Relocation Table for Read_Only Section
  Read_Only section Note1: for flatfiles the order of information is very important.

Note2: in converting exampleVI.o to exampleVI.flat, debug information may be omitted, while the symbol information may be used to create the relocation tables.

The section table gives information for every section regarding the number of sections, the size of each section in bytes, and the type of each section, as described above. The section table may be required to pre-allocate the memory for the sections. The idea is that in the relocation process, all section addresses must be known, and so allocation of memory for sections is preferably the first step performed on the target device 110.

Once the flatfile has been generated, exampleVI.flat may be transferred to the target device. In one embodiment, the target device has a network buffer in RAM that is 4K wide (although in other embodiment, the network buffer may be set to any size desired). Based on the size of this buffer, transfers of information from exampleVI.flat to target device RAM may be made in chunks of 4K.

The very first 4K piece of exampleVI.flat arrives via the network into RAM on the target device 110. This 4K of data contains the Section Table, Relocation Table for the Code Section, and some Code Section. The dynamic linker (or loader) that resides in Flash memory of the target device 110 may be a state machine with two run modes: read information, and process information.

Once the very first 4K transfer arrives in target device RAM, the dynamic linker enters read mode and starts reading the Section Table. When the Section Table is completely read, the dynamic linker enters processing mode and stores the Section Table in another location in target RAM, then executes the Flash memory allocations for the sections described in the Section Table. After finishing the allocations, the dynamic linker enters read mode, and reads the Relocation Table for Code Section. When the Relocation Table for Code Section is completely read, the dynamic linker enters processing mode and stores the Relocation Table for Code Section into target RAM at a different location than the 4K network buffer and the Section Table locations. Then it uses the information from the Relocation Table for Code Section to process the content of the Code Section that is already in the target RAM. When the entire portion of the Code Section currently in RAM has been processed, a new 4K transfer from exampleVI.flat into the network buffer takes place, overwriting the previous 4K information. Note that at this time, the Section Table and Relocation Table for Code Section have been saved into other target RAM locations, so the dynamic linker can proceed with processing of the Code Section by using information from the Relocation Table for Code Section. After the Code Section is completely relocated, the Relocation Table for Code Section may not be not needed anymore.

Next, the Relocation Table for Data Section is read into the 4K network buffer. When the Relocation Table for Data Section Code is completely read, the dynamic linker enters processing mode and stores the Relocation Table for Data Section into target RAM, overwriting the Relocation Table for Code Section. Then the dynamic linker uses the information from the Relocation Table for Data Section to process the content of the Data Section that is already in target RAM. When the entire portion of Data Section in RAM has been processed, a new 4K transfer from exampleVI.flat into the network buffer takes place, thereby overwriting the previous 4K information. Note that at this time, the Relocation Table for Data Section has been saved into target RAM, so the dynamic linker can proceed with processing of the Data Section by using information from the Relocation Table for Data Section.

These 4K transfers and dynamic linker read/process cycles may continue until the entire exampleVI.flat file has been transferred to the target device 110 and the combined program 202A has been constructed (in the flash program space 2544). After the entire exampleVI.flat file is completely transferred to the target device, the Section Table will not be not needed anymore, and so may be deleted, and the constructed combined program 202A may be run.

Thus, in summary, in one embodiment of the invention, the program that is created on the computer system 102 may require use of program execution system 205 to execute the program. For example, in one embodiment, the program is a graphical program and requires graphical program execution system 205 to execute the program. Due to the small footprint of target device 110, in one embodiment, the program execution system is configured in such a way so as to only transmit the minimum amount of a program execution system (i.e., a portion of the modular callback system 1906A) actually required by the program that is being executed. Thus, in one embodiment, the program execution system is partitioned into a (minimal) base execution system, and a plurality of components for presenting different functionality that can be performed by a program. The base portion of the program execution system is only capable of executing the very simplest commands. This minimal engine may comprise the smallest set of commands which allows the other components to be executed.

In one embodiment, when the program is developed by the user, a software program executing on the computer may operate to analyze the program to determine the functionality contained in the program. Once the functionality of the program has been identified, the program uses the functionality to determine which of the respective components of the program execution system are actually required by the program. In one embodiment, the method determines the functionality of the program, and uses the functionality to index into a data structure or look-up table to determine which program execution system components will be required to execute this program. When the program is then transmitted or deployed to target device 110, the computer system may operate to only provide the program execution system base portion and the respective components that are actually required to execute the program. Thus, the smaller amount of execution system code may be transmitted to the target device. This allows a smaller footprint for one or more of the target devices and/or the sensor devices. In other words, target device 110 may include a smaller processor and/or a smaller memory medium since a full program execution system is not required to be transmitted.

In one embodiment, after the software program analyzes the program to determine the functionality contained in the program, an execution system analysis program may determine which execution system components are required for execution of the program. A deployment program may then assemble the required components of the execution system and the program, for example, by interspersing the required execution system components and the program together according to the order of execution of the program. These interspersed program execution system components and program may then be assembled into a file (i.e., the flatfile 207), and respective portions of the file transmitted to the target device 110 for execution.

In one embodiment, the flatfile 207 may be received by the target device 110 and used to construct a combined program 202A including executable code from the program and executable code from the required execution system. This combined program 202A may then be executed by the embedded device 110. The combined program may also be stored in non-volatile memory of the embedded device for subsequent execution.

Streaming Execution

In one embodiment, successive portions of the file may be streamed to the target device 110 and/or sensor device 120 for dynamic execution. In other words, the target device may execute the program as it is streamed to the device. For example, the sensor device 120 may receive a first portion of the file comprising a first portion of a program to be executed at a first portion of the execution system components that are used for executing this first portion of the program. After this first portion of the program has been executed along with the first portion of the execution system components, the first portion of the program may be flushed or removed from the memory of the sensor device. In a similar manner, the execution system components that are no longer required may be also removed from the memory. However, execution system components that may be required by other portions of the program to be executed may be retained in the memory for execution. As discussed above, in one embodiment, the deployment program determines which execution system components may be required for a plurality of different portions of the program, and includes a variable or data structure or other indication with the execution system component to indicate that this component should not be flushed immediately after it has been executed, or others should be retained by target device 110 for execution with another part of the program.

After the first portion of each of the program execution components and the program has been executed, computer system 102 and/or target device 110 may then provide a second portion of the program interspersed with the second portion of the execution system components. The second portion of the file may be provided by the computer system to target device 110. Operation then proceeds as above. Thus, for example, computer system 102 may operate to provide respective portions of the deployment file to target device 110 for execution on an as needed basis, based on the memory availability or memory capacity of target device 110. Target device 110 may receive the program that it is supposed to execute along with the execution system components used by that portion of the program, execute the program under direction of the execution system components, and then receive further portions of the deployment file, and so forth. Thus, computer system 102 may essentially provide a stream of the program and its corresponding execution system components to the target device according to the order of execution of the program.

In an example application of the present system, the computer system 102, the target device 110, and/or the hub device 108, may operate to execute a radio server program which is operable to discover remote or wireless data acquisition devices that enter into and exit from the wireless communication space that is within the range of the target device. Thus, periodically, the radio server executing on the target device may send out a wireless communication signal to query the presence of respective data acquisition devices 120 that are within the wireless communication range of the computer system 102, target device 110, or hub 108. Any present data acquisition devices may respond to the queries to indicate its respective presence. The queries may be performed periodically, e.g., once permitted, once per hour, once per day, or at greater or lesser time frame granularities. For further information regarding wireless execution of the graphical program, please see U.S. patent application Ser. No. 10/283,758 titled "Wireless Deployment/Distributed Execution of Graphical Programs to Smart Sensors", filed Oct. 30, 2002, which was incorporated by reference above.

In another embodiment of the present invention, the target device 110 may include a programmable hardware element, such as an FPGA, in addition to, or instead of, a processor. For example, in an embodiment where the target device includes both a processor/memory and an FPGA, the graphical program may be compiled to a hardware configuration file on the host computer system 102, where the hardware configuration file is targeted at the FPGA on the target device 110. The host computer may transmit the hardware configuration file to the target device 110, where it may be stored, e.g., in a memory medium of the target device. The processor on the target device may then deploy the hardware configuration file onto the FPGA, after which the configured FPGA may execute to perform the desired function or operation.

In another embodiment, the target device may include two (or more) FPGAs. The host may stream the compiled hardware configuration file to the target device in portions which are each suitable for deployment and execution by respective ones of the FPGAs. Execution of the program may proceed in "ping-pong" fashion among the two or more FPGAs. For example, once a first portion of the hardware configuration file is received and deployed on a first FPGA, the configured first FPGA may execute, thereby performing a function encoded in the first portion of the hardware configuration file. While the first FPGA is executing the first portion of the hardware configuration file, a second portion of the hardware configuration file may be received and stored in the memory medium of the target device. The processor may then deploy this second portion of the hardware configuration program to a second FPGA on the target device 110. Once the second portion is deployed, the second FPGA may begin execution. In one embodiment, once the second portion is deployed to the second FPGA and the second FPGA begins execution, execution of the first FPGA may be halted, and a third portion of the hardware configuration program may be received, stored in memory, and deployed onto the first FPGA (now inactive). Thus, the FPGAs may be dynamically configured in an alternating manner. Of course, this approach may be extended to more than two FPGAs, where more sophisticated techniques may be applied to determine which FPGA to configure with each successive portion of the hardware configuration program, e.g., round robin, longest inactive, size-based, etc.

Various embodiments further include receiving or storing instructions and/or data implemented in accordance with the foregoing description upon a medium, e.g., a carrier medium. Suitable carrier media include a memory medium as described above, as well as signals such as electrical, electromagnetic, or digital signals, conveyed via a communication medium such as networks and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A compact modular embedded device, comprising,
a base module, comprising:
   a processor;
   a memory medium coupled to the processor;
   a bus coupled to the processor, wherein the bus comprises one or more digital lines which are software configurable to implement one or more communication buses comprised in the bus; and
   a power input coupled to the processor, the memory medium, and the bus, configured to receive power from a power source and to provide the received power to the processor, the memory medium, and the bus, wherein the power source comprises at least one battery, or an external alternating current source for charging the at least one battery;
wherein the base module is configured to couple to a host computer via a transmission medium, wherein the base module is further configured to:
   receive a program from the host computer; and
   store the program in the memory medium;
wherein the base module is configured to couple to one or more extension modules via the bus in a stacked fashion along an axis, and wherein the base module is configured to communicatively couple to the one or more extension modules without a backplane, wherein the base module and the one or more extension modules each comprise a respective planar circuit board, wherein, when stacked, the respective circuit boards of the base module and the one or more extension modules are substantially parallel and perpendicular to the axis, wherein each extension module provides respective functionality for the compact modular embedded device, and wherein at least one of the one or more extension modules comprises or couples to a compact sensor; and
wherein the base module is further configured to execute the program to perform a function in conjunction with the one or more extension modules.

2. The modular embedded device of claim 1, wherein, in receiving the program from the host computer, the base module is configured to receive an executable from the host computer.

3. The modular embedded device of claim 2, wherein the memory medium further stores a bootloader, configured to:
   boot-up the base module; and
   receive the executable from the host computer; and/or
   execute a previously loaded and stored executable.

4. The modular embedded device of claim 1, wherein the program includes an auto-detect portion, executable to detect the one or more extension modules when coupled to the base module.

5. The modular embedded device of claim 1, wherein the memory medium further stores a bootloader, wherein the base module is further configured to receive and store the bootloader prior to said receiving and storing the program.

6. The modular embedded device of claim 1,
wherein the base module and each of the one or more extension modules have a form factor between approximately 2 cm×2 cm and approximately 5 cm×5 cm; and
wherein a separation distance between adjacent modules is between approximately 3 mm and approximately 6 mm.

7. The modular embedded device of claim 1, wherein the one or more extension modules comprise one or more of:
a power module, configured to couple to the power source and provide power to the modular embedded device;
a memory module;
a programming/debugging module;
a serial communications module;
a multi-function I/O module;
a data acquisition (DAQ) module;
a digital signal processing (DSP) module;
a breadboard module;
a wireless communications module;
an analog I/O module;
a digital I/O module;
a sensor module;
a control module;
a liquid crystal display (LCD) module;
a keyboard module;
a modem telephone line module;
a modem Global System for Mobile Communications (GSM) module;
a gyroscope module;
a controller area network (CAN) module;
a MultiMedia Card (MMC) module;
a Compact Flash (CF) module;

a camera module;
a monitor interface module;
an audio module;
a speaker module; and
an actuator module.

8. The modular embedded device of claim 1, wherein the program comprises one or more of:
a graphical program;
a text-based program; and
an executable.

9. The modular embedded device of claim 8, wherein the graphical program comprises a data flow graphical program.

10. The modular embedded device of claim 8, wherein the text-based program is converted from a graphical program.

11. The modular embedded device of claim 1, wherein one or more digital lines which are software configurable to implement one or more communication buses comprised in the bus implement one or more of:
a serial bus;
an inter-integrated circuit (I2C) bus;
a Serial Peripheral Interface (SPI) bus;
a copy/paste I/O (CPIO) bus; and
a parallel bus.

12. The modular embedded device of claim 1, wherein the memory medium is comprised in the processor.

13. The modular embedded device of claim 12, wherein the memory medium comprises flash memory and/or RAM.

14. The modular embedded device of claim 1, wherein the base module further comprises a programmable hardware element coupled to the processor, and wherein the program comprises a hardware configuration program.

15. The modular embedded device of claim 1, wherein the power source comprises one or more of:
a battery pack;
an A/C adapter; and
a wireless power transmitter.

16. The modular embedded device of claim 1, wherein at least one of the extension modules is configured to couple to one or more sensors.

17. A method, comprising:
creating a program on a host computer system;
converting the program into a form suitable for deployment on a base module of a compact modular embedded device;
transmitting the converted program to the base module over a transmission medium; and
storing the converted program on a memory medium of the base module;
wherein the base module comprises:
a processor;
the memory medium, coupled to the processor;
a bus coupled to the processor, wherein the bus comprises one or more digital lines which are software configurable to implement one or more communication buses comprised in the bus; and
a power input coupled to the processor, the memory medium, and the bus, configured to receive power from a power source and to provide the received power to the processor, the memory medium, and the bus, wherein the power source comprises at least one battery, or an external alternating current source for charging the at least one battery;
wherein the base module is configured to couple to one or more extension modules via the bus in a stacked fashion along an axis, and wherein the base module is configured to communicatively couple to the one or more extension modules without a backplane, wherein the base module and the one or more extension modules each comprise a respective planar circuit board, wherein, when stacked, the respective circuit boards of the base module and the one or more extension modules are substantially parallel and perpendicular to the axis, wherein each extension module provides respective functionality for the compact modular embedded device, and wherein at least one of the one or more extension modules comprises or couples to a compact sensor; and
wherein the base module is further configured to execute the program to perform a function in conjunction with the one or more extension modules.

18. The method of claim 17, wherein the program includes an auto-detect portion, the method further comprising:
the auto-detect portion detecting the one or more extension modules when coupled to the base module.

19. The method of claim 17, wherein the memory medium further stores a bootloader, the method further comprising:
the base module receiving and storing the bootloader prior to said transmitting and said storing the converted program.

20. The method of claim 17,
wherein the base module and each of the one or more extension modules has a form factor between approximately 2 cm×2 cm and approximately 5 cm×5 cm; and
wherein a separation distance between adjacent modules is between approximately 3 mm and approximately 6 mm.

21. The method of claim 17, wherein the one or more extension modules comprise one or more of:
a power module, configured to couple to the power source and provide power to the modular embedded device;
a memory module;
a programming/debugging module;
a serial communications module;
a multi-function I/O module;
a data acquisition (DAQ) module;
a digital signal processing (DSP) module;
a breadboard module;
a wireless communications module;
an analog I/O module;
a digital I/O module;
a sensor module;
a control module;
a liquid crystal display (LCD) module;
a keyboard module;
a modem telephone line module;
a modem Global System for Mobile Communications (GSM) module;
a gyroscope module;
a controller area network (CAN) module;
a MultiMedia Card (MMC) module;
a Compact Flash (CF) module;
a camera module;
a monitor interface module;
an audio module;
a speaker module; and
an actuator module.

22. The method of claim 17, further comprising:
the base module executing the converted program to perform the function in conjunction with the one or more extension modules.

23. The method of claim 17, wherein the converted program includes configuration information specifying the one or more communication buses, the method further comprising:

the base module executing the converted program to configure at least one of the one or more digital lines to implement the one or more communication buses based on the configuration information.

24. The method of claim 17, wherein said converting the program comprises generating an executable from the program.

25. The method of claim 24, wherein the memory medium further stores a bootloader, the method further comprising:
the bootloader booting-up the base module;
the bootloader receiving the executable from the host computer; and/or
the bootloader executing a previously loaded and stored executable.

26. The modular embedded device of claim 16, wherein the modulator device comprises a compact sensor interface.

27. A compact modular embedded device, comprising,
a base module, comprising:
a processor;
a memory medium coupled to the processor;
a bus coupled to the processor, wherein the bus comprises one or more digital lines which are software configurable to implement one or more communication buses comprised in the bus; and
a power input coupled to the processor, the memory medium, and the bus, configured to receive power from a power source and to provide the received power to the processor, the memory medium, and the bus, wherein the power source comprises at least one battery, or an external alternating current source for charging the at least one battery;
wherein the base module is configured to couple to a host computer via a transmission medium, wherein the base module is further configured to:
receive an executable program from the host computer; and
store the program in the memory medium,
wherein the memory medium further stores a bootloader, wherein the bootloader is configured to:
boot-up the base module; and
receive the executable program from the host computer; and/or
execute a previously loaded and stored executable program;
wherein the base module is configured to couple to one or more extension modules via the bus in a stacked fashion along an axis, and wherein the base module is configured to communicatively couple to the one or more extension modules without a backplane, wherein the base module and the one or more extension modules each comprise a respective planar circuit board, wherein, when stacked, the respective circuit boards of the base module and the one or more extension modules are substantially parallel and perpendicular to the axis, wherein each extension module provides respective functionality for the compact modular embedded device, and wherein at least one of the one or more extension modules comprises or couples to a compact sensor; and
wherein the base module is further configured to execute the program to perform a function in conjunction with the one or more extension modules.

28. A compact modular embedded device, comprising,
a base module, comprising:
a processor;
a memory medium coupled to the processor;
a bus coupled to the processor, wherein the bus comprises one or more digital lines which are software configurable to implement one or more communication buses comprised in the bus; and
a power input coupled to the processor, the memory medium, and the bus, configured to receive power from a power source and to provide the received power to the processor, the memory medium, and the bus, wherein the power source comprises at least one battery, or an external alternating current source for charging the at least one battery;
wherein the base module is configured to couple to a host computer via a transmission medium, wherein the base module is further configured to:
receive a program from the host computer; and
store the program in the memory medium;
wherein the base module is configured to couple to one or more extension modules via the bus in a stacked fashion along an axis, and wherein the base module is configured to communicatively couple to the one or more extension modules without a backplane, wherein the base module and the one or more extension modules each comprise a respective planar circuit board, wherein, when stacked, the respective circuit boards of the base module and the one or more extension modules are substantially parallel and perpendicular to the axis, wherein each extension module provides respective functionality for the compact modular embedded device, and wherein at least one of the one or more extension modules comprises or couples to a compact sensor;
wherein the base module is further configured to execute the program to perform a function in conjunction with the one or more extension modules; and
wherein the program includes an auto-detect portion, executable to detect the one or more extension modules when coupled to the base module.

29. A compact modular embedded device, comprising,
a base module, comprising:
a processor;
a memory medium coupled to the processor;
a bus coupled to the processor, wherein the bus comprises one or more digital lines which are software configurable to implement one or more communication buses comprised in the bus; and
a power input coupled to the processor, the memory medium, and the bus, configured to receive power from a power source and to provide the received power to the processor, the memory medium, and the bus, wherein the power source comprises at least one battery, or an external alternating current source for charging the at least one battery;
wherein the base module is configured to couple to a host computer via a transmission medium, wherein the base module is further configured to:
receive a program from the host computer; and
store the program in the memory medium;
wherein the memory medium further stores a bootloader, wherein the base module is further configured to receive and store the bootloader prior to said receiving and storing the program;
wherein the base module is configured to couple to one or more extension modules via the bus in a stacked fashion along an axis, and wherein the base module is configured to communicatively couple to the one or more extension modules without a backplane, wherein the base module and the one or more extension modules each comprise a respective planar circuit board, wherein, when stacked, the respective circuit boards of the base module and the one or more extension modules are substantially parallel and perpendicular to the axis, wherein each extension module provides respective functionality for the compact modular embedded device, and wherein at least one of the one or more extension modules comprises or couples to a compact sensor; and wherein the base module is further configured to execute the program to perform a function in conjunction with the one or more extension modules.

30. A compact modular embedded device, comprising,
a base module, comprising:
   a processor;
   a memory medium coupled to the processor;
   a bus coupled to the processor, wherein the bus comprises one or more digital lines which are software configurable to implement one or more communication buses comprised in the bus; and
   a power input coupled to the processor, the memory medium, and the bus, configured to receive power from a power source and to provide the received power to the processor, the memory medium, and the bus, wherein the power source comprises at least one battery, or an external alternating current source for charging the at least one battery;
wherein the base module is configured to couple to a host computer via a transmission medium, wherein the base module is further configured to:
   receive a program from the host computer; and
   store the program in the memory medium;
wherein the base module is configured to couple to one or more extension modules via the bus in a stacked fashion along an axis, and wherein the base module is configured to communicatively couple to the one or more extension modules without a backplane, wherein the base module and the one or more extension modules each comprise a respective planar circuit board, wherein, when stacked, the respective circuit boards of the base module and the one or more extension modules are substantially parallel and perpendicular to the axis, wherein each extension module provides respective functionality for the compact modular embedded device, and wherein at least one of the one or more extension modules comprises or couples to a compact sensor;
wherein the base module is further configured to execute the program to perform a function in conjunction with the one or more extension modules;
wherein the base module and each of the one or more extension modules have a form factor between approximately 2 cm×2 cm and approximately 5 cm×5 cm; and
wherein a separation distance between adjacent modules is between approximately 3 mm and approximately 6 mm.

31. A compact modular embedded device, comprising,
a base module, comprising:
   a processor;
   a memory medium coupled to the processor;
   a bus coupled to the processor, wherein the bus comprises one or more digital lines which are software configurable to implement one or more communication buses comprised in the bus; and
   a power input coupled to the processor, the memory medium, and the bus, configured to receive power from a power source and to provide the received power to the processor, the memory medium, and the bus, wherein the power source comprises at least one battery, or an external alternating current source for charging the at least one battery;
wherein the base module is configured to couple to a host computer via a transmission medium, wherein the base module is further configured to:
   receive a program from the host computer, wherein the program comprises one or more of:
      a graphical program;
      a text-based program; or
      an executable; and
   store the program in the memory medium;
wherein the base module is configured to couple to one or more extension modules via the bus in a stacked fashion along an axis, and wherein the base module is configured to communicatively couple to the one or more extension modules without a backplane, wherein the base module and the one or more extension modules each comprise a respective planar circuit board, wherein, when stacked, the respective circuit boards of the base module and the one or more extension modules are substantially parallel and perpendicular to the axis, wherein each extension module provides respective functionality for the compact modular embedded device, and wherein at least one of the one or more extension modules comprises or couples to a compact sensor;
wherein the base module is further configured to execute the program to perform a function in conjunction with the one or more extension modules.

32. The modular embedded device of claim 31,
wherein the graphical program comprises a data flow graphical program.

33. The modular embedded device of claim 31,
wherein one or more digital lines which are software configurable to implement one or more communication buses comprised in the bus implement one or more of:
a serial bus;
an inter-integrated circuit (I2C) bus;
a Serial Peripheral Interface (SPI) bus;
a copy/paste I/O (CPIO) bus; and
a parallel bus.

34. A compact modular embedded device, comprising,
a base module, comprising:
   a programmable hardware element;
   a bus coupled to the programmable hardware element, wherein the bus comprises one or more digital lines which are software configurable to implement one or more communication buses comprised in the bus; and
   a power input coupled to the programmable hardware element and the bus, configured to receive power from a power source and to provide the received power to the programmable hardware element and the bus, wherein the power source comprises at least one battery, or an external alternating current source for charging the at least one battery;
wherein the base module is configured to couple to a host computer via a transmission medium, wherein the base module is further configured to:
   receive a hardware configuration program from the host computer; and
   configure the programmable hardware element with the hardware configuration program;
wherein the base module is configured to couple to one or more extension modules via the bus in a stacked fashion along an axis, and wherein the base module is configured to communicatively couple to the one or more extension modules without a backplane, wherein the base module and the one or more extension modules each comprise a respective planar circuit board, wherein, when stacked, the respective circuit boards of the base module and the one or more extension modules are substantially parallel and perpendicular to the axis, wherein each extension module provides respective functionality for the compact modular embedded device, and wherein at least one of the extension modules is configured to couple to one or more compact sensors; and wherein the base module is further configured to execute the program to perform a function in conjunction with the one or more extension modules.

35. A method, comprising:

creating a program on a host computer system;

converting the program into a form suitable for deployment on a base module of a compact modular embedded device;

transmitting the converted program to the base module over a transmission medium; and storing the converted program on a memory medium of the base module;

wherein the base module comprises:
- a processor;
- the memory medium, coupled to the processor;
- a bus coupled to the processor, wherein the bus comprises one or more digital lines which are software configurable to implement one or more communication buses comprised in the bus; and
- a power input coupled to the processor, the memory medium, and the bus, configured to receive power from a power source and to provide the received power to the processor, the memory medium, and the bus, wherein the power source comprises at least one battery, or an external alternating current source for charging the at least one battery;

wherein the base module is configured to couple to one or more extension modules via the bus in a stacked fashion along an axis, and wherein the base module is configured to communicatively couple to the one or more extension modules without a backplane, wherein the base module and the one or more extension modules each comprise a respective planar circuit board, wherein, when stacked, the respective circuit boards of the base module and the one or more extension modules are substantially parallel and perpendicular to the axis, wherein each extension module provides respective functionality for the compact modular embedded device, and wherein at least one of the one or more extension modules comprises or couples to a compact sensor; and wherein the base module is further configured to execute the program to perform a function in conjunction with the one or more extension modules;

wherein the base module and each of the one or more extension modules has a form factor between approximately 2 cm×2 cm and approximately 5 cm×5 cm; and wherein a separation distance between adjacent modules is between approximately 3 mm and approximately 6 mm.

* * * * *

UNITED STATES PATENT AND TRADEMARK OFFICE
CERTIFICATE OF CORRECTION

| | | |
|---|---|---|
| PATENT NO. | : 7,860,582 B2 | Page 1 of 1 |
| APPLICATION NO. | : 10/875054 | |
| DATED | : December 28, 2010 | |
| INVENTOR(S) | : Ghercioiu et al. | |

It is certified that error appears in the above-identified patent and that said Letters Patent is hereby corrected as shown below:

On the Title Page, Item (75)

In the Inventors Field:

Please delete "Silviu Folea, Cluj (RO)" and substitute -- Silviu Folea, Cluj-Napoca (RO) --.

Signed and Sealed this
First Day of March, 2011

David J. Kappos
*Director of the United States Patent and Trademark Office*